United States Patent [19]
Yoshikawa et al.

[11] Patent Number: 6,078,016
[45] Date of Patent: Jun. 20, 2000

[54] SEMICONDUCTOR ACCELEROMETER SWITCH

[75] Inventors: Eiji Yoshikawa; Masahiro Tsugai, both of Tokyo, Japan

[73] Assignee: Mitsubishi Denki Kabushiki Kaisha, Tokyo, Japan

[21] Appl. No.: 09/244,891

[22] Filed: Feb. 5, 1999

[30] Foreign Application Priority Data

Aug. 17, 1998 [JP] Japan .................................. 10-230777

[51] Int. Cl.[7] .................................................. H01H 57/00
[52] U.S. Cl. ........................ 200/181; 200/415; 200/417; 73/514.01
[58] Field of Search .................................. 257/415, 417, 257/418, 420; 73/514.01

[56] References Cited

U.S. PATENT DOCUMENTS

| 5,231,879 | 8/1993 | Yamamoto | 73/517 R |
| 5,243,861 | 9/1993 | Kloeck et al. | 73/517 R |
| 5,415,043 | 5/1995 | Zabler et al. | 732/517 |
| 5,828,138 | 10/1998 | McIver et al. | 307/10.1 |
| 5,889,311 | 3/1999 | Shinogi et al. | 257/417 |

FOREIGN PATENT DOCUMENTS

| 0 526 923 | 2/1993 | European Pat. Off. . | |
| 0 567 938 | 11/1993 | European Pat. Off. . | |
| 41 26 107 | 2/1993 | Germany . | |

OTHER PUBLICATIONS

Noetzel et al., "Quasianalog Accelerometer Using Microswitch Array", The 8th International Conference on Solid–State Sensors and Actuators, and Eurosensors IX, Stockholm, Sweden, Jun. 25–29, 1995, pp. 671–674.

Sun et al., "A Surface Micromachined Latching Accelerometer", 1997 International Conference on Solid–State Sensors and Actuators, Chicago, Jun. 16–19, 1997, pp. 1189–1192.

Primary Examiner—Michael L. Gellner
Assistant Examiner—Nhung Nguyen
Attorney, Agent, or Firm—Leydig, Voit & Mayer, Ltd.

[57] ABSTRACT

A semiconductor accelerometer switch having a fixed portion including a first control electrode and a movable portion including a movable body. By applying a voltage between the first control electrode and an electrode on the movable body, electrostatic attraction holds the movable body in an initial position. The movable body is displaced when acceleration having a magnitude in a direction acts on the switch. The threshold of acceleration to be detected and general-purpose properties of the accelerometer switch are easily adjusted.

18 Claims, 34 Drawing Sheets

F I G. 14
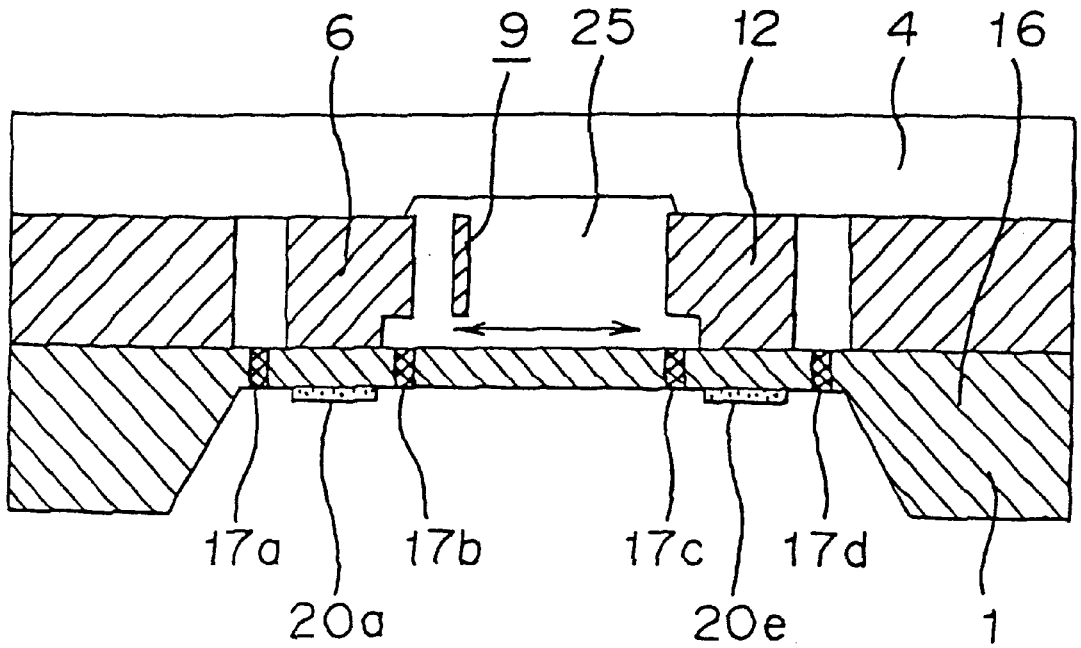
F I G. 15
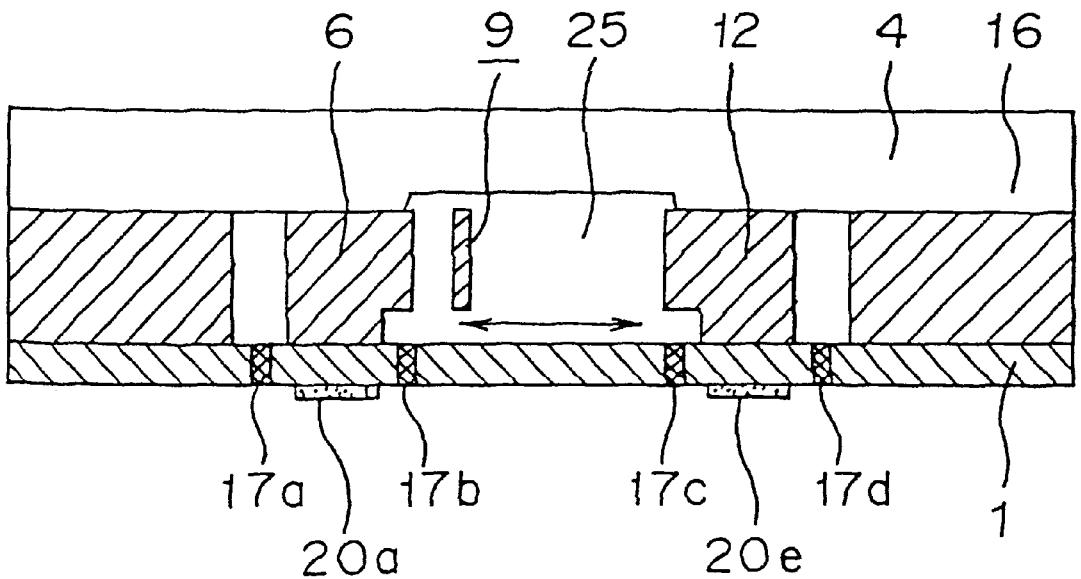

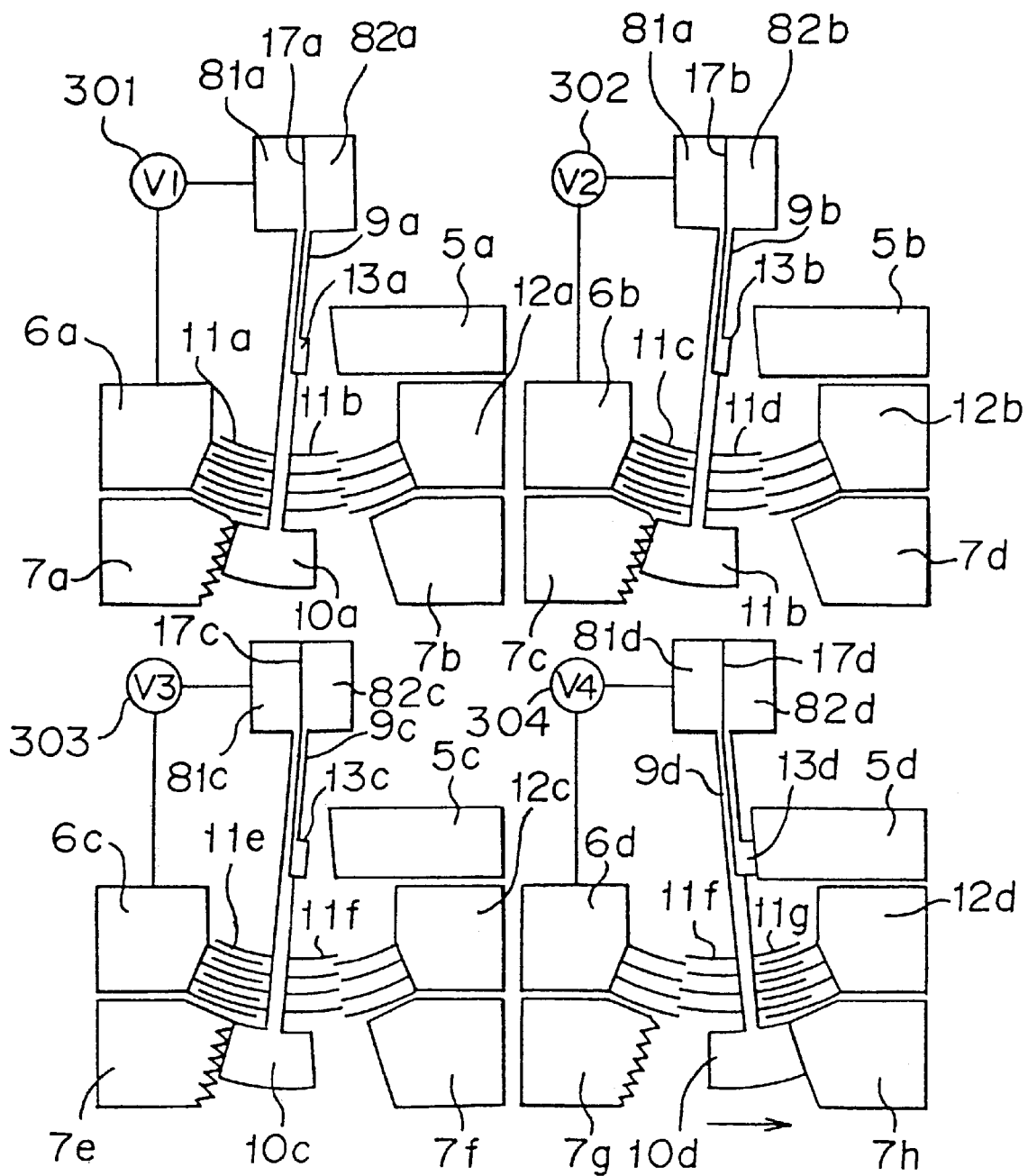
F I G. 25

17a  17b  17c  17d

SEMICONDUCTOR ACCELEROMETER SWITCH

BACKGROUND OF THE INVENTION

1. Field of the Invention

The present invention relates to semiconductor accelerometer switch for detecting acceleration affecting a device, in particular to a semiconductor accelerometer switch which can arbitrarily adjust the magnitude of acceleration to be detected.

2. Discussion of Background

Generally, when operation of an air bag system for an automobile is determined, acceleration is detected or measured in order to judge a collision.

Since high reliability is required for such a judgement, various countermeasures for safety have to be prepared against erroneous operation of an electronic circuit such as by electromagnetic interference (EMI), in case of emergency.

As an acceleration detecting apparatus for detecting acceleration of a moving object, various accelerometer sensors and various accelerometer switches were developed in the background of development of semiconductor micromachining technologies.

One type of the accelerometer sensors developed in the background of development in semiconductor micromachining technologies is a capacitance detection type.

FIGS. 39a and 39b are views for explaining a conventional accelerometer sensor disclosed in JP-A-7-120496, which explains a conventional accelerometer sensor of a capacitance-detection-type in detail.

FIG. 39a is a front view of the conventional accelerometer sensor; and FIG. 39b is a cross-sectional view of the conventional accelerometer sensor taken along a line 39b—39b in FIG. 39a.

In the Figures, numerical reference 1 designates a lower glass sheet; numerical reference 4 designates an upper glass sheet; numerical reference 9 designates a beam; numerical reference 10 designates a movable electrode; and numerical reference 15 designates a silicon substrate. The beam 9 and the movable electrode 10 are integrally formed by etching the silicon substrate 15.

Numerical reference 32 designates an upper fixed electrode; numerical reference 33 designates a lower fixed electrode; numerical reference 34 designates filler; and numerical reference 35 designates a connection terminal.

The accelerometer sensor in FIGS. 39a and 39b is formed such that the silicon substrate 15 is interposed between the lower glass sheet 1 and the upper glass sheet 4.

The silicon substrate 15 is thus interposed so that the movable electrode 10 is positioned between the upper fixed electrode 32 and the lower fixed electrode 33.

By such a structure, a first capacitor having a capacitance of C1 is composed of the upper fixed electrode 32 and the movable electrode 10 and a second capacitor having a capacitance of C2 is composed of the lower fixed electrode 33 and the movable electrode 10.

The movable electrode 10 is held by the beam 9 of a cantilever form, wherein when acceleration acts on the direction of the thickness of the silicon substrate 15 (the upward and downward directions in FIG. 39b), the movable electrode 10 is displaced by an inertial force. At this time, the direction of displacement depends on the direction of acceleration and the magnitude of displacement depends on the magnitude of acceleration.

By the displacement of the movable electrode 10, the capacitance C1 of the first capacitor and the capacitance C2 of the second capacitor are changed. Because the changes of the capacitance C1 of the first capacitor and the capacitance C2 of the second capacitor depend on the magnitude of displacement of the movable electrode 10, the acceleration acting on a device can be detected by detecting such changes of the capacitances.

However, the accelerometer sensor shown in FIGS. 39a and 39b generally had problems that a parasitic capacitance is difficult to reduce and EMI durability is low.

Air bag systems for automobiles are in a critical situation because EMI is generally used even though high reliability is required for the systems in consideration of a purpose of the systems.

Therefore, as a countermeasure for safety in consideration of erroneous operation of an electronic circuit, a mechanical accelerometer sensor for judging a collision is ordinarily provided in a front portion of an automobile in addition to the above-mentioned accelerometer sensor.

FIG. 40 is a view for explaining an example of the conventional accelerometer switch. In FIG. 40, numerical reference 28 designates a spherical weight; numerical reference 29 designates a magnet; and numerical references 30a and 30b designate contact points. When acceleration is not acting upon the device, the contact points 30a and 30b are opened. Further, under a condition that acceleration does not act on the device, the weight 28 is held by magnetic force of the magnet 29.

This accelerometer switch is operated by a principle for detecting when an inertia force acts on the weight 28. When an acceleration acting upon the weight is larger than force for holding the weight 28 by the magnet 29, the contacts 30a, 30b are pushed to mechanically close as a result of movement of the weight 28 in the direction of an arrow in FIG. 40.

FIG. 41 is an explanatory view for showing a structure of a conventional accelerometer switch in which a cross-sectional view thereof is shown.

A principle for detecting is the same as that in FIG. 40, wherein a weight moves in the direction of an arrow when acceleration is acted thereupon and touches both of a contact 30a and a contact 30b to there by electrically connect these.

A characteristic of this example is that mercury 31 is used as the weight, wherein this example is different from the case of FIG. 40 at a point that the weight is held by the gravity instead of by the magnet.

A conventional accelerometer sensor required an accelerometer switch generally located in a front portion of a vehicle and a collision was comprehensively judged by a signal from the accelerometer switch and a signal from the accelerometer sensor. However, although the conventional accelerometer switch shown in FIG. 40 had a simple structure, the magnet is used for holding a weight. Further, although the conventional accelerometer switch shown in FIG. 41 had a structure simpler than that of FIG. 40 and a cost thereof could be reduced, it is not preferable under a present situation of an environment impact which is seriously considered day by day because mercury is used as the weight.

Further, the conventional accelerometer switches shown in FIGS. 40 and 41 were not suitable for a cost reduction because these were manufactured by so-called machine-processing and the size of these was as large as several centimeters.

Further, in the conventional accelerometer switches shown in FIGS. 40 and 41, it was necessary to change the mass of weight in order to change a threshold of acceleration to be detected. Accordingly, there were problems not only that a design had to be changed in correspondence with the threshold of acceleration to be detected but also that general-purpose properties of accelerometer switch were closely limited.

Further, the conventional accelerometer switch shown in FIGS. 40 and 41 did not have a structure for maintaining a condition that the contacts 30 are connected. Therefore, there were problems that chattering was apt to occur; therefore the condition of the contacts was unstable; and an erroneous judgement by a whole system was apt to be caused lowering reliability of the accelerometer switch.

SUMMARY OF THE INVENTION

It is an object of the present invention to solve the above-mentioned problems inherent in the conventional acceleration detecting device and to provide a semiconductor accelerometer switch having good general-purpose properties, stable operation, and high reliability.

According to a first aspect of the present invention, there is provided a semiconductor accelerometer switch comprising; a base, a fixed portion having a first control electrode fixed to the base, a supporting portion fixed to the base, a movable portion of which position is displaced in correspondence with effecting acceleration and which includes a movable body partially provided with an electrode, wherein by applying an electric voltage between the first control electrode and the electrode formed in the movable body to apply electrostatic attraction to the movable body; and the movable body is displaced when acceleration having a predetermined magnitude in a predetermined direction is effected thereon.

According to a second aspect of the present invention, there is provided a semiconductor accelerometer switch comprising: a fixed portion fixed to a base, which fixed portion has a fixed electrode provided at a position opposite to a first control electrode, and a movable body supported by a supporting portion at one end, which movable body includes a beam positioned between the first control electrode and the fixed electrode, a mass provided at the other end of the beam, a first movable electrode provided on a first side surface of the beam, and a second movable electrode provided on a second side surface of the beam opposite to the first side surface, wherein electrostatic attraction is applied to the movable body by applying an electric voltage between the first control electrode and the first movable electrode; and the movable body is displaced so that the second movable electrode is in contact with the fixed electrode when acceleration having a predetermined magnitude in a predetermined magnitude is effected thereon.

According to a third aspect of the present invention, there is provided a semiconductor accelerometer switch, wherein the fixed portion is fixed to the base and includes a second control electrode provided in a position opposite to the first control electrode; and the movable body includes a third movable electrode provided in the second side surface of the beam to apply an electric voltage between the second control electrode and the third movable electrode.

According to a fourth aspect of the present invention, there is provided a semiconductor accelerometer switch, wherein the first control electrode and the first movable electrode are a finlike electrode; and the first control electrode and the first movable electrode overlap each other.

According to a fifth aspect of the present invention, there is provided a semiconductor accelerometer switch, wherein the second control electrode and the third movable electrode are a finlike electrode; and the second control electrode and the third movable electrode overlap each other.

According to a sixth aspect of the present invention, there is provided a semiconductor accelerometer switch, wherein a mass is provided in an inside of the beam.

According to a seventh aspect of the present invention, there is provided a semiconductor accelerometer switch, further comprising: a stopper for regulating displacement of the mass, wherein a surface of the stopper in contact with the mass is made uneven.

According to an eighth aspect of the present invention, there is provided a semiconductor accelerometer switch, wherein a metallic film having high malleability or high ductility is provided in at least one of a surface of the second movable electrode or a surface of the fixed electrode.

According to a ninth aspect of the present invention, there is provided a semiconductor accelerometer switch, wherein a part of the beam is bent.

According to a tenth aspect of the present invention, there is provided a semiconductor accelerometer switch, wherein the mass is supported by at least two beams.

According to an eleventh aspect of the present invention, there is provided a semiconductor accelerometer switch, comprising: a fixed portion having a finlike first control electrode and a first fixed terminal fixed to a base, and a movable body having a beam supported by a supporting portion at its one end, a finlike first movable electrode supported by the beam, a second movable electrode, and an insulating film provided between the first movable electrode and the second movable electrode, wherein the first movable electrode and the first control electrode overlap each other; electrostatic attraction is applied to the movable body by applying an electric voltage between the first control electrode and the first movable electrode; and the movable body is displaced so that the second movable electrode is in contact with a first fixed terminal when acceleration having a predetermined magnitude in a predetermined direction is effected thereon.

According to a twelfth aspect of the present invention, there is provided a semiconductor accelerometer switch, comprising: a fixed portion having a finlike first control electrode fixed to a base, a first fixed terminal fixed to the base, and a second fixed terminal fixed to the base in a position opposite to the first fixed terminal, and a movable body having a beam supported by a supporting portion at its one end, a finlike first movable electrode supported by a beam, a second movable electrode, and an insulating film provide between the first movable electrode and the second movable electrode, wherein the first movable electrode and the first control electrode overlap each other; electrostatic attraction is applied to the movable body by applying an electric voltage between the first control electrode and the first movable electrode; and the movable body is displaced so that the second movable electrode is in contact with the second fixed terminal when acceleration having a predetermined magnitude in a predetermined direction is effected thereon.

According to a thirteenth aspect of the present invention, there is provided a semiconductor accelerometer switch, wherein a metallic film having high malleability or high ductility is provided in at least one of a surface of the second movable electrode and a surface of the second fixed terminal.

According to a fourteenth aspect of the present invention, there is provided a semiconductor accelerometer switch, wherein the magnitude of electrostatic attraction is variable.

According to a fifteenth aspect of the present invention, there is provided a semiconductor accelerometer switch, wherein the finlike first control electrode and the finlike first movable electrode are arranged so that distances therebetween are non-uniform.

According to a sixteenth aspect of the present invention, there is provided a semiconductor accelerometer switch, wherein the base is an insulator.

According to a seventeenth aspect of the present invention, there is provided a semiconductor accelerometer switch, wherein the base is a silicon substrate having a low resistance.

According to an eighteenth aspect of the present invention, there is provided a semiconductor accelerometer switch, further comprising: a plurality of movable bodies, wherein the plurality of movable bodies are arranged so that the directions of displacement of the movable bodies are different each other.

According to a nineteenth aspect of the present invention, there is provided a semiconductor accelerometer switch, comprising: a plurality of semiconductor accelerometer switches according to any one of the first through the eighteenth aspects of the invention, wherein the semiconductor accelerometer switches are arranged so that directions of displacement of movable bodies in movable portions of the semiconductor accelerometer switches are the same; and the values of electric voltages respectively applied between the first control electrodes in the fixed portions of the semiconductor accelerometer switches and electrodes formed in the movable bodies corresponding thereto are different each other.

According to a twentieth aspect of the present invention, there is provided a semiconductor accelerometer switch, further comprising: a movable electrode of which position is displaced depending on the magnitude of effecting acceleration, and a capacitor-type accelerometer sensor for detecting an electrostatic capacitance changeable by the displacement of the movable electrode and the magnitude of acceleration from the change of the detected electrostatic capacitance.

According to a twenty-first aspect of the present invention, there is provided a method of producing a semiconductor accelerometer switch comprising:

(a) A step of forming a groove in a silicon substrate having a low resistance, (b) A step of forming an insulating film in a surface of the silicon substrate formed with the groove and also in the groove, (c) A step of thinning the silicon substrate from a side of the surface of the silicon substrate formed with the groove and exposing the insulating film formed in a bottom portion of the groove, (d) A step of joining the silicon substrate to a base, and (e) A step of integrally forming a fixed portion and a movable portion by etching the silicon substrate.

According to a twenty-second aspect of the present invention, there is provided a method of producing a semiconductor accelerometer switch comprising:

(a) A step of forming a groove in a first silicon substrate having a low resistance, (b) A step of forming an insulating film in a surface of the first silicon substrate formed with the groove and also in the groove, (c) A step of thinning the first silicon substrate from a surface side of the first silicon substrate formed with the groove and exposing the insulating film formed in the bottom portion of the groove, (d) A step of forming a groove in a second silicon substrate having a low resistance, (e) A step of forming an insulating film in a surface of the second silicon substrate formed with the groove and also in the groove, (e) A step of joining the first silicon substrate to the second silicon substrate, (g) A step of integrally forming a fixed portion and a movable portion by etching the first silicon substrate, and (h) A step of thinning the second silicon substrate from a surface side of the second silicon substrate formed with the groove and exposing the insulating film formed in the bottom portion of the groove.

According to a twenty-third aspect of the present invention, there is provided a method of producing a semiconductor accelerometer switch comprising:

(a) A step of forming a groove in a silicon substrate having a low resistance, (b) A step of forming an insulating film in a surface of the silicon substrate formed with the groove and also in the groove, (c) A step of thinning the silicon substrate from a surface side of the silicon substrate formed with the groove and exposing the insulating film formed in the bottom portion of the groove, (d) A step of forming a sacrifice layer in the silicon substrate and shaping this into a predetermined shape, (e) A step of forming a structural film on the silicon substrate and the sacrifice layer, (f) A step of shaping the structural film into a predetermined shape, (g) A step of forming a groove penetrating the structural film, (h) A step of forming an insulating film in the structural film and shaping it into a predetermined shape, (i) A step of integrally forming a fixed portion and a movable portion by etching the structural film, and (j) A step of removing the sacrifice layer by etching.

According to a twenty-fourth aspect of the present invention, there is provided a semiconductor accelerometer switch comprising:

(a) A step of thinning a part of a back surface of silicon substrate having a low resistance, (b) A step of joining the back surface of the silicon substrate to a base, (c) A step of integrally forming a fixed portion and a movable portion by etching the silicon substrate, (d) A step of forming an insulating film on surfaces of the fixed portion and the movable portion, (e) A step of forming an opening portion in a surface of the insulating film, and (f) A step of forming a metallic film in a part of the surface of the insulating film and also in the opening portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein:

FIG. 14 is a side view in section for schematically showing a semiconductor accelerometer switch according to Embodiment 6 of the present invention;

FIG. 15 is a side view in section for schematically showing a semiconductor accelerometer switch according to Embodiment 6 of the present invention;

FIG. 25 is a partially omitted plan view for schematically showing a semiconductor accelerometer switch according to Embodiment 11 of the present invention;

FIGS. 26a through 33b are side views in section for explaining a method of producing a semiconductor accelerometer switch of the present invention;

FIGS. 37a through 38c are side views for explaining a method of producing a semiconductor accelerometer switch of the present invention;

DETAILED DESCRIPTION OF THE PREFERRED EMBODIMENTS

A detailed explanation will be given of preferred embodiments of the present invention in reference to FIGS. 1 through 38c as follows, wherein the same references are used for the same or the similar portions and repeated description of these portions is omitted.

Embodiment 1

Figure 1:
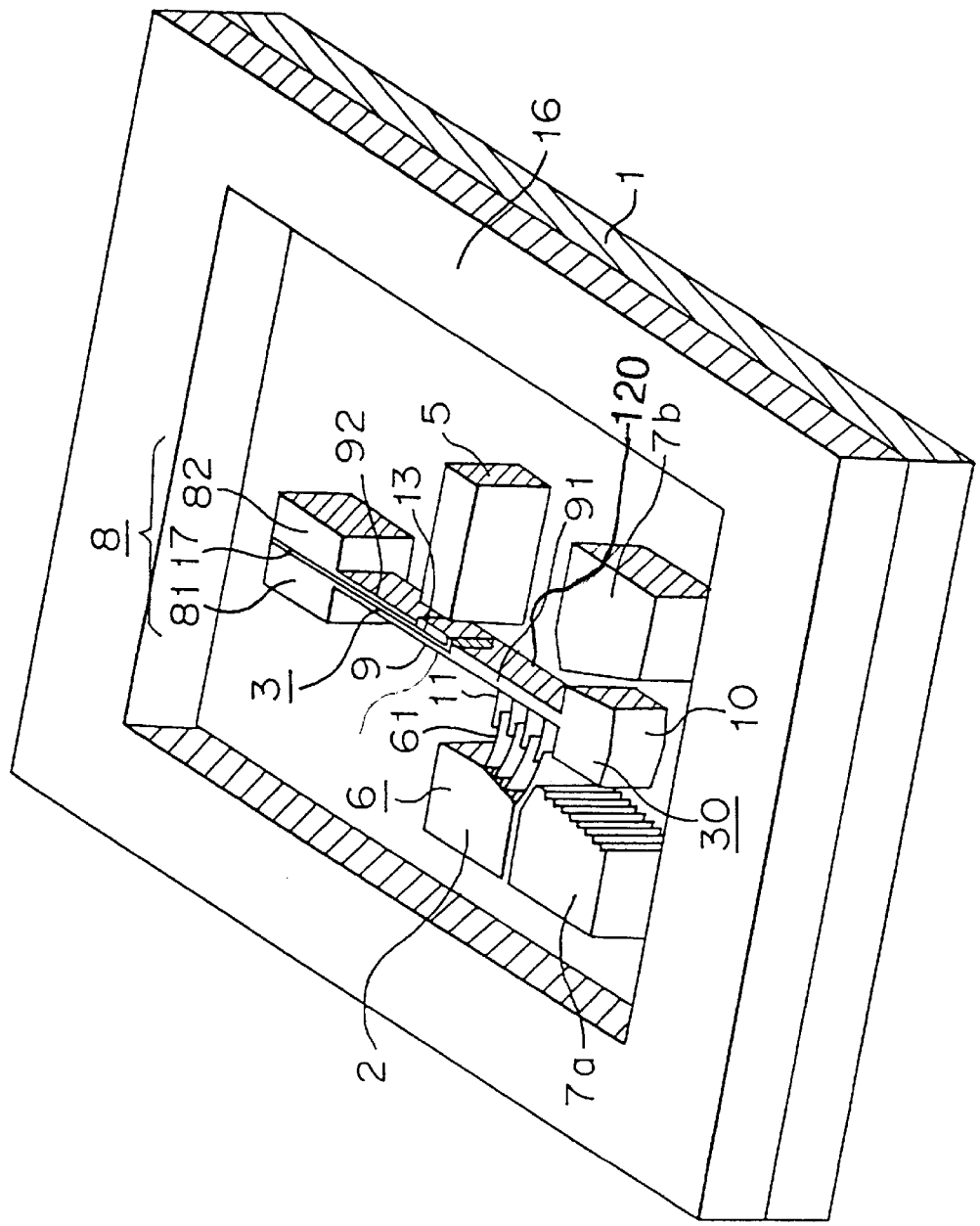
FIG. 1 is a perspective view schematically showing a semiconductor accelerometer switch according to Embodiment 1.

FIG. 1 is a perspective view schematically showing a semiconductor accelerometer switch 100 according to Embodiment 1.

In FIG. 1, numerical reference 1 designates a base. Numerical reference 16 designates a frame containing silicon. The base 1 has insulating properties and is made of a material having substantially the same expansion coefficient as that of silicon and having a low resistance. As a material of the frame 16, such as pyrex glass is used. The frame 16 is fixed on the base 1.

Numerical reference 2 designates a fixed portion fixed to the base 1. Numerical reference 3 designates a movable portion including a supporting portion 8 fixed to the base and a movable body 30 which is displaced by an inertial force in correspondence with acceleration acting on the semiconductor accelerometer switch. The frame 16 is formed so as to surround the outer periphery of sides of the fixed portion 2 and the movable portion 3. Further, a sealing base (not shown) is attached to an upper portion of the frame 16 to closely pack the fixed portion 2 and the movable portion 3 therein.

The fixed portion 2 includes a fixed electrode 5 fixed to the base 1, a control electrode 6 fixed to the base 1 as a first electrode, a stopper 7a fixed to the base as a first stopper, and a stopper 7b fixed to the base as a second stopper.

The movable portion 3 includes the supporting portion 8 fixed to the base and the movable body 30, a part of which is supported by the supporting portion 8. The supporting portion 8 includes terminals 81, 82 fixed to the base and an insulating film 17 for electrically insulating the terminals 81 and 82.

The movable body 30 includes a beam 91 as a first beam one end of which is supported by the terminal 81, a mass 10 attached to the other end of the beam 91, a beam 92 as a second beam one end of which is supported by the terminal 82, a finlike movable electrode 11 as a first movable electrode provided in a side surface of the beam 91, a movable electrode 13 as a second movable electrode attached to the other end of the beam 92, the insulating film 17 for electrically insulating the beam 92 and movable electrode 13 respectively from the beam 91. The fixed portion 2, the movable portion 3, and the frame 16 excluding the insulating film 17 are simultaneously formed by etching a single material, for example, a silicon substrate having a low resistance in this case.

The beam 9 is composed of the beam 91, the beam 92, and the insulating film 17 provided between the beam 91 and the movable electrode 13 and between the beam 92 and the movable electrode 13. The beam 9 is positioned between the fixed electrode 5 and the control electrode 6; and the mass 10 is positioned between the stopper 7a and the stopper 7b. The movable electrode 11a is provided in a side surface of the beam corresponding to a first side surface 110 of the beam 9 facing the control electrode 6 and the movable electrode 13 is provided in a second side surface 120 of the beam 9 opposite to the first side surface, specifically on the side surface of the beam 91 facing the fixed electrode 5.

Because one end of the beam 9 is supported by the supporting portion 8, the beam 8 is bent in response to acceleration effecting on the semiconductor accelerometer switch. The bending direction of the beam 9 is within a plane of the silicon substrate used for forming the fixed portion 2, the movable portion 3, and the frame 16 and is perpendicular or substantially perpendicular to the longitudinal direction of beam 9. Further, by adjusting the thicknesses of the beams 9a and 9b to increase elasticity thereof, sensitivity to acceleration to be detected becomes high. The stoppers 7a and 7b are provided to prevent the beam 9 from bending more than required by regulating the displacement of the mass 10. When the movable electrode 13 is in contact with the fixed electrode 5, the terminal 82 and the fixed electrode 5 are electrically connected.

On a side surface of the control electrode 6, a finlike electrode 61 is formed. By applying an electric voltage between the control electrode 6 and the terminal 81 electrostatic attraction acts between the movable electrode 11 and the control electrode 6, whereby the beam 9 bends on the side of the control electrode 6; the mass 10 moves on the side of the control electrode 6 or the side of the stopper 7a; the mass 10 is stopped in a state that the mass 10 is in contact with the stopper 7a; and the movable body 30 is kept in this position.

At this time, the finlike movable electrode 11 formed on the side surface of the beam 9 and the finlike electrode 61 formed in the control electrode 6 overlap each other. Because the movable electrode 11 and the electrode 61 are made to have a finlike shape, it is possible to increase electrostatic attraction to be generated even though an electric voltage applied therebetween is small. Further, the magnitude of electrostatic attraction varies in correspondence with the electric voltage applied between the movable electrode 11 and the electrode 61 or between the control electrode 6 and the terminal 81.

When acceleration effects on the bending direction of the beam 9, inertia force having a direction opposite to the direction of this acceleration acts on the semiconductor accelerometer switch. When the magnitude of acceleration exceeds a predetermined threshold, the inertia force effecting on the movable body 30 becomes larger than the electrostatic attraction, whereby the movable body 30 displaces on the side of the fixed electrode 5; the beam bends on the side of the fixed electrode 5; the movable electrode 13 is in contact with the fixed electrode 5; and the movable body 30 is stopped in a state that the mass 10 is in contact with the stopper 7b. At this time, it can be judged whether or not the fixed electrode 5 is in contact with the movable electrode 13 by detecting whether or not the fixed electrode 5 is electrically connected to the terminal 82 connected to the movable electrode 13.

Accordingly, when an electrical connection between the fixed electrode 5 and the terminal 82 is detected, it is judged that acceleration having more than the predetermined magnitude in the predetermined direction effects on the semiconductor accelerometer switch. Further, the magnitude of acceleration to be detected can be changed depending on the magnitude of electrostatic attraction holding the movable body 30. The magnitude of electrostatic attraction holding the movable body 30 is changed by the electric potential applied between the control electrode 6 and the terminal 81. Accordingly, by adjusting the voltage applied between the control electrode 6 and the terminal 81, it is possible to change the magnitude of inertia force at a time of displacement of the movable body 30, whereby a threshold of the acceleration to be detected can be arbitrarily set.

Operation of semiconductor accelerometer switch according to Embodiment 1 will be specifically described.

FIGS. 2 through 6 are views for explaining operation of semiconductor accelerometer switch according to Embodiment 1.

Figure 2:
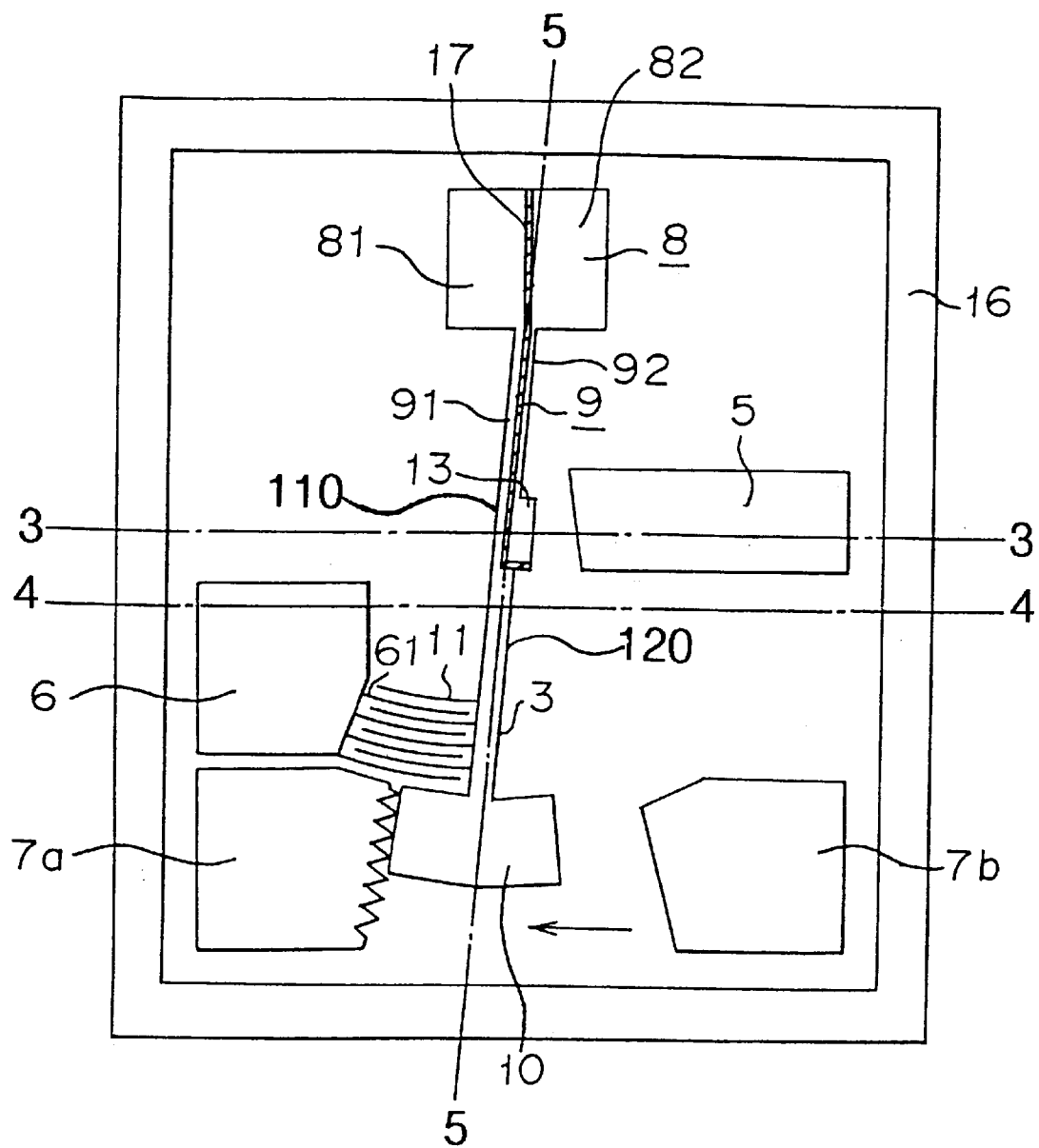
FIG. 2 is a plan view for schematically showing a semiconductor accelerometer switch according to Embodiment 1 of the present invention.
Figure 3:
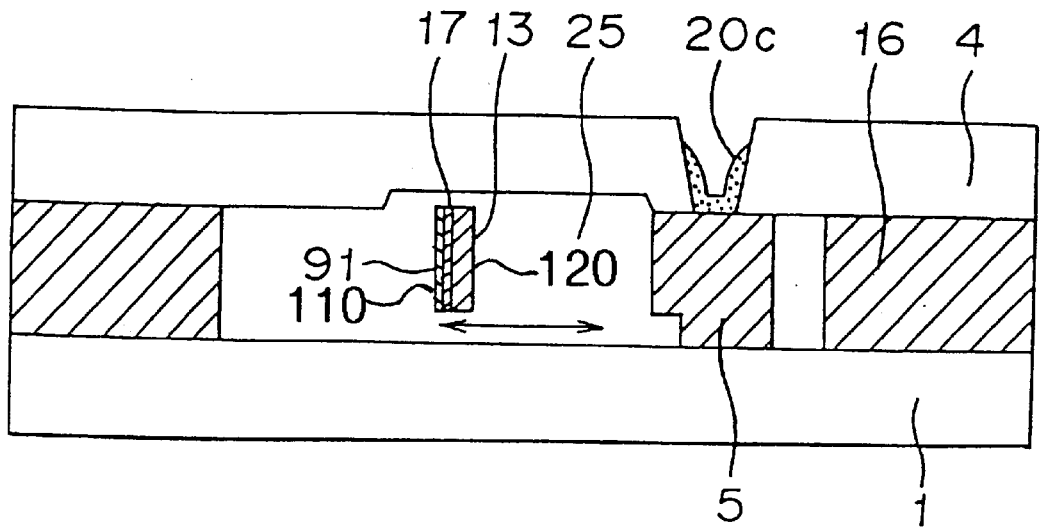
FIG. 3 is a side view in section for schematically showing a semiconductor accelerometer switch according to Embodiment 1 of the present invention.
Figure 4:
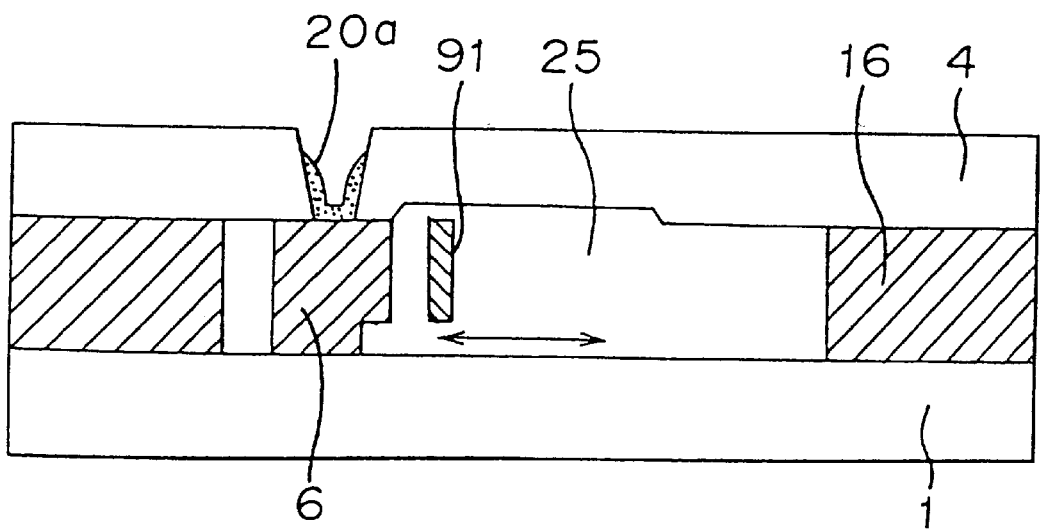
FIG. 4 is a side view in section for schematically showing a semiconductor accelerometer switch according to Embodiment 1 of the present invention.
Figure 5:
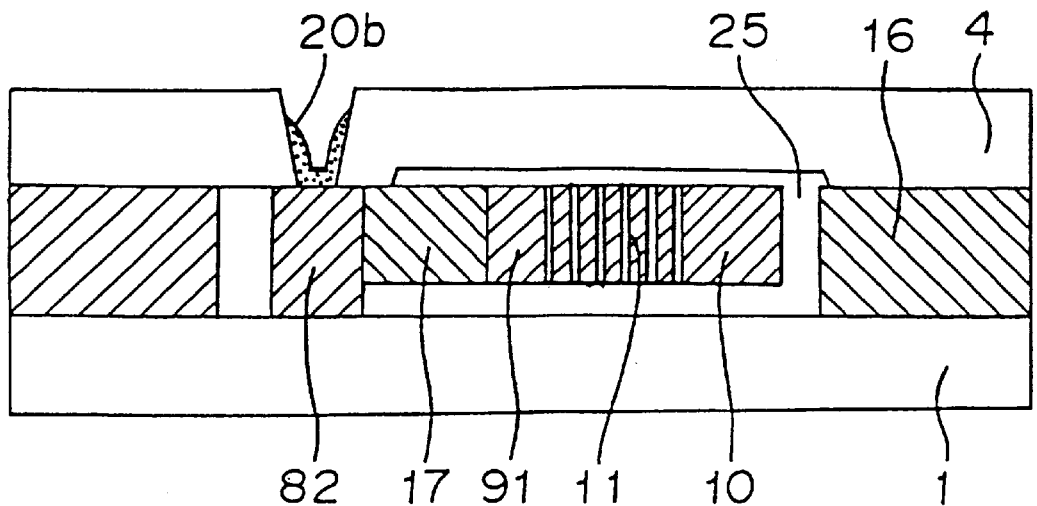
FIG. 5 is side view in section for schematically showing a semiconductor accelerometer switch according to Embodiment 1 of the present invention.

FIG. 2 is a plan view of the semiconductor accelerometer switch, specifically that for showing a state that a voltage is applied between the control electrode 6 and the terminal 81 and thereby the movable body 30 is held; FIG. 3 is a cross-sectional view of the semiconductor accelerometer switch taken along a line 3—3 of FIG. 2; FIG. 4 is a cross-sectional view of the semiconductor accelerometer switch taken along a line 4—4 of FIG. 2; and FIG. 5 is a cross-sectional view of the semiconductor accelerometer switch taken along a line 5–5 of FIG. 2.

In the Figures, the portions having the same references as those in FIG. 1 designate the same or the similar portions.

In the Figures, numerical reference 4 designates a sealing-substrate 4, in which portions corresponding to the fixed electrode 5, the control electrode 6, the terminal 81, and the terminal 82 are provide with holes. In these holes, portions for drawing out electrodes having a metallic film such as Cr/Au is formed, from which portions for drawing out electrodes, an electric potential is given. In FIGS. 3 through 5, a portion for drawing out an electrode 20c of the fixed electrode 5, a portion for drawing out an electrode 20a of the control electrode 6, and a portion for drawing out an electrode 20b of the terminal 82 are respectively shown. Further, a numerical reference 25 designates a gap.

The stopper 7a is provided at a position around which movement of the mass 10 is stopped before the control terminal 6 is in contact with the movable electrode 11. When a voltage is applied between the control electrode 6 and the terminal 19, electrostatic attraction effects between the movable electrode 11 and the electrode 61, whereby the mass 10 is moved on the side of the stopper 7a to be finally in contact with the stopper 7a and the movable body 30 is held in the position. Further, since the terminal 81 is in contact with the stopper 7a, these becomes the same electric potential. When the stopper 7a is grounded, the terminal 81 is also grounded.

Because a surface of the stopper 7a in contact with the mass 10 is unevenly formed, a contact area between the stopper 7a and the mass 10 is made small to thereby prevent the stopper 7a from adhering to the mass 10. Under a state shown in FIG. 2, the terminal 82 is not connected to the fixed electrode 5 because the movable electrode 13 is not connected to the fixed electrode 5.

Figure 6:
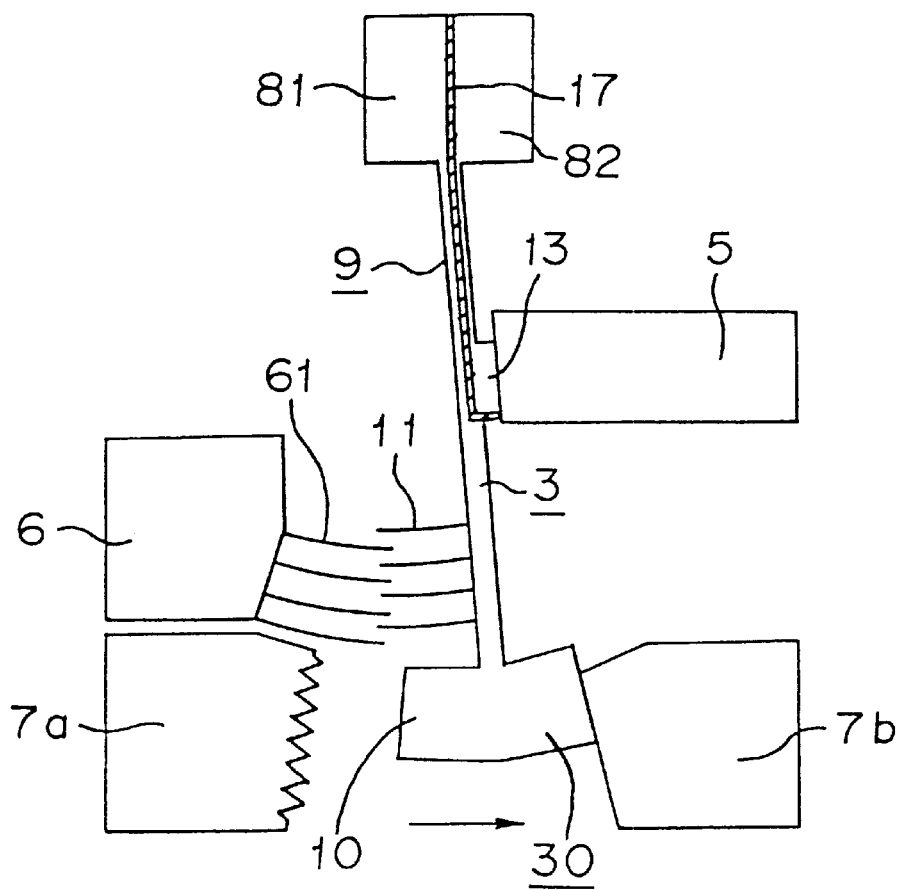
FIG. 6 is a partial plan view for schematically showing a semiconductor accelerometer switch according to Embodiment 1 of the present invention.

FIG. 6 is a view for explaining operation of the semiconductor accelerometer switch according to Embodiment 1, specifically for showing important portions the semiconductor accelerometer switch in a state that acceleration exceeding a certain threshold effects thereon to make the movable electrode 13 in contact with the fixed electrode 5.

The semiconductor accelerometer switch shown in FIG. 6 is effected by inertia force in the direction of an arrow when acceleration effects thereon in the inverse direction (i.e. the leftward direction on the Figure). When the magnitude of the inertia force is smaller than the electrostatic attraction, the movable body 30 is not moved. When the magnitude of acceleration exceeds a predetermined threshold, the inertia force effecting on the movable body 30 becomes larger than the electrostatic attraction, whereby the movable body 30 starts to be displaced; the mass 10 moves on the side of the stopper 7b; and beam 9 bends on the side of the fixed electrode 5 so that the second movable electrode 13 is in contact with the fixed electrode 5 and the mass 10 is stopped in a state that the mass 10 is in contact with the stopper 7b. The stopper 7b is provided to prevent the beam 9 from being destroyed as a result of unnecessary bending of the beam 9 caused by restricting the displacement of the mass 10.

When the movable electrode 13 is in contact with the fixed electrode 5, the movable electrode 13 is electrically connected to the fixed electrode 5. Accordingly, the terminal 82 connected to the movable electrode 13 is connected to the fixed electrode 5. Accordingly, by detecting a state between the terminal 82 and the fixed electrode 5 whether or not these are connected, namely a short or an open, it is detected whether or not the movable electrode 13 and the fixed electrode 5 are in contact, whereby it is detected whether or not acceleration in a predetermined direction effecting on the semiconductor accelerometer switch is larger than a predetermined magnitude.

According to the semiconductor accelerometer switch described in Embodiment 1, it is possible to detect acceleration in the predetermined direction, the bending direction of the beam 9 here, by adjusting the magnitude of an electric voltage applied between the control electrode 6 and the movable electrode 11 for adjusting a magnitude of the electrostatic attraction generated therebetween. Further, it is possible to obtain the semiconductor accelerometer switch having high general-purpose properties because the magnitude of acceleration to be detected can be properly adjusted without changing mass of weight of the mass 10. Further, because the movable body 30 is held by the electrostatic attraction, the semiconductor accelerometer switch scarcely affected by outer disturbance and having stability and high reliability is obtainable because the switch does not react to acceleration smaller than the electrostatic attraction holding the movable body 30.

Further, it is possible to prevent the beam 9 from being destroyed by unnecessary bending because displacement of the mass moved by electrostatic attraction is restricted by the stopper 7a. Further, because the surface of the stopper 7a on the side of contacting the mass 10 is made uneven, it is possible to prevent the stopper 7a from adhering to the mass 10, whereby the movable body 30 is free from lock-in caused by the adhesion of the stopper 7a to the mass 10. Thus, the semiconductor accelerometer switch having high sensitivity is obtainable.

Further, when a surface of the stopper 7b on the side of contacting the mass 10 is made uneven, an effect similar to those described above is obtainable.

Further, because the fixed electrode 5, the movable electrode 13, and the terminal 82 electrically connected to the movable electrode 13 are electrically insulated from the control electrode 6, the stopper 7a, and the terminal 81, each of the fixed electrode 5 and the terminal 82 can be easily connected to an outer circuit (not shown) and a signal of electric voltage between the fixed electrode 5 and the terminal 82 can be utilized as an input signal to a logic circuit for judging a threshold of acceleration (not shown) and so on.

In Embodiment 1, acceleration is detectable by detecting electrical connection or disconnection between the terminal 82 and the fixed electrode 5. However, the present invention is not limited to such a constitution. When acceleration exceeding a threshold effects on the semiconductor accelerometer switch, the mass 10 is connected to the stopper, wherein the mass 10 and the stopper 7b are electrically connected. At this time, the terminal 81 connected to the mass 10 is connected to the stopper 7b. Accordingly, the semiconductor accelerometer switch may be constituted such that whether or not acceleration having a predetermined magnitude in a predetermined direction effects on the semiconductor accelerometer switch is detected by detecting connection or disconnection between the terminal 81 and the stopper 7 so as to detect contact or non-contact therebetween.

Further, it may be constituted such that whether or not acceleration having a predetermined magnitude in a predetermined direction effects on the semiconductor accelerometer switch is detected by checking a variation of a voltage of the terminal 81. In other words, any constitution can be adopted as long as it is detected whether or not the movable body 30 held by electrostatic attraction is displaced.

Further, in Embodiment 1, the structure that the elasticity of the beam 9 is increased and the beam 9 is bent and held by the electrostatic attraction when a voltage is applied between the control electrode 6 and the movable electrode 11. However, the present invention is not limited to such a structure. For example, a structure that the elasticity of the beam 9 is decreased by increasing the thickness or the rigidity of the beam 9; and the beam 9 is scarcely bent or bent a little and held by electrostatic attraction when a voltage is applied between the control electrode 6 and the movable electrode 11. In other words, any structure can be adopted as long as electrostatic attraction is given to the movable body 30 to thereby hold the movable body 30.

Further, the structure may be such that an insulating film (not shown) is formed on surfaces of the terminal 82, the beam 92, and the movable electrode 13 and a metallic film is formed on the insulating film. In this case, in addition to the above-mentioned effects, the insulating film 17 is unnecessitated and the beam 91 and the beam 92 are not estranged from each other.

In an air bag system for automobile, judgement of collision is generally conducted by measuring acceleration. In order to attain high reliability in such an air bag system, the accelerometer switch according to Embodiment 1 of the present invention is preferable as a sensor for safety since various countermeasures for safety are provided against unpredictable malfunctions of an electronic circuit using electromagnetic interference (EMI) and so on.

Embodiment 2

In the semiconductor accelerometer switch according to Embodiment 1 of the present invention, chattering occurs when acceleration having a predetermined magnitude in a predetermined direction effects on the switch because the movable body 30 oscillates like a swinging pendulum and the fixed electrode 5 and the movable electrode 13 are repeatedly in contact and non-contact with each other within a short interval of time. When a semiconductor accelerometer switch is used as a switch for activating an air bag for an automobile, it is desirable that an output signal from the semiconductor accelerometer switch is maintained to output for a certain period when acceleration is detected. A semiconductor accelerometer switch according to Embodiment 2 of the present invention is characterized by that an output signal corresponding to a state that a fixed electrode 5 and a movable electrode 13 are in contact is maintained to output for a certain period by keeping such a state.

Figure 7:
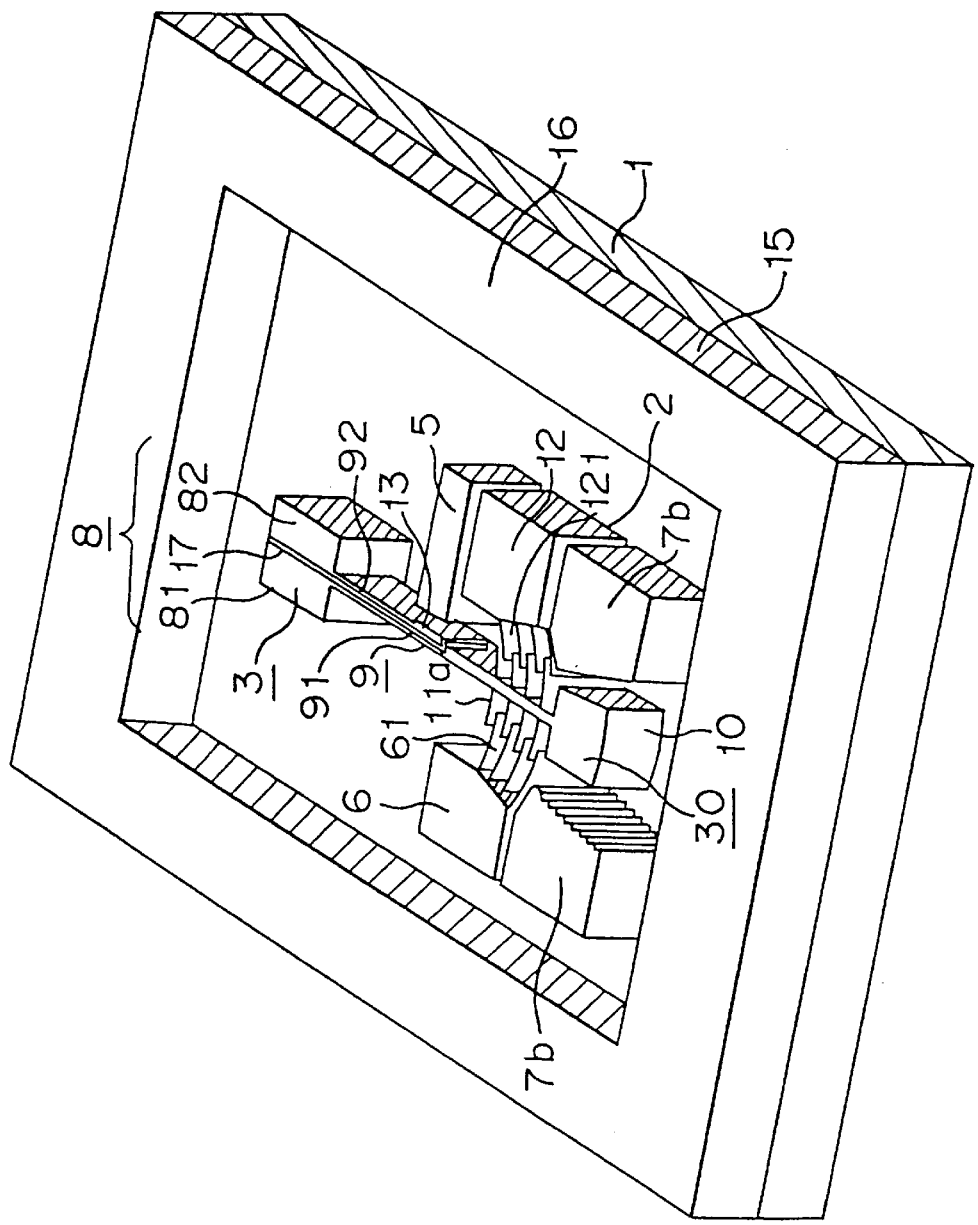
FIG. 7 is a perspective view for schematically showing a semiconductor accelerometer switch according to Embodiment 2 of the present invention.
Figure 8:
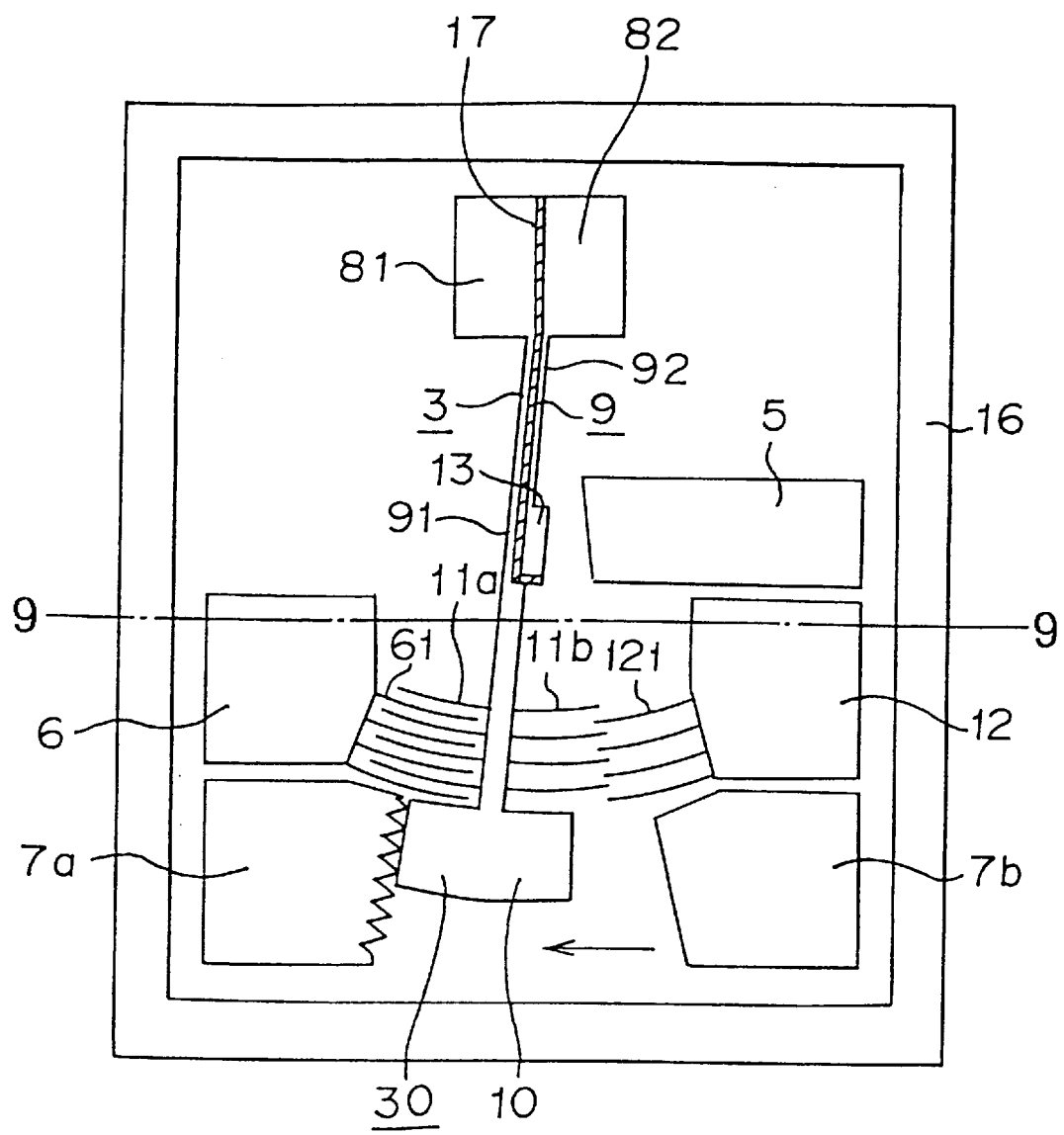
FIG. 8 is a plan view for schematically showing a semiconductor accelerometer switch according to Embodiment 2 of the present invention.
Figure 9:
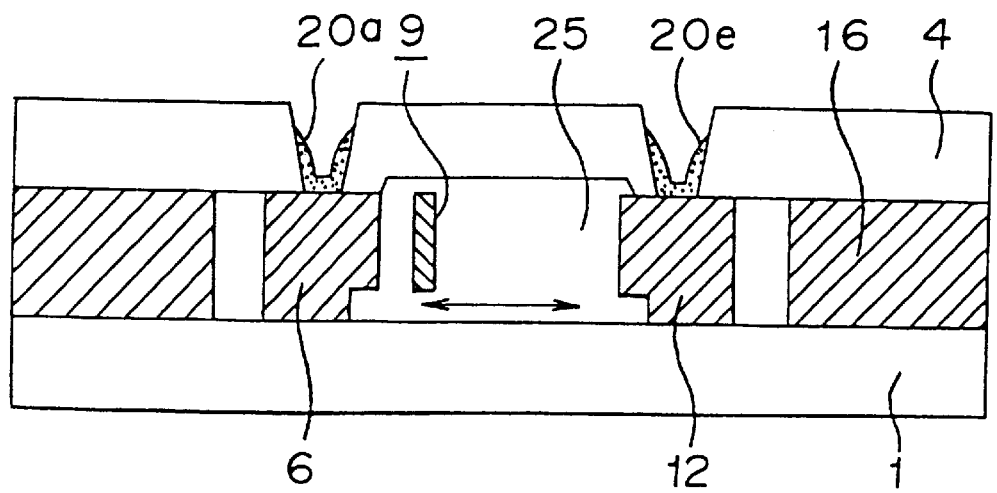
FIG. 9 is a side view in section for schematically showing a semiconductor accelerometer switch according to Embodiment 2 of the present invention.
Figure 10:
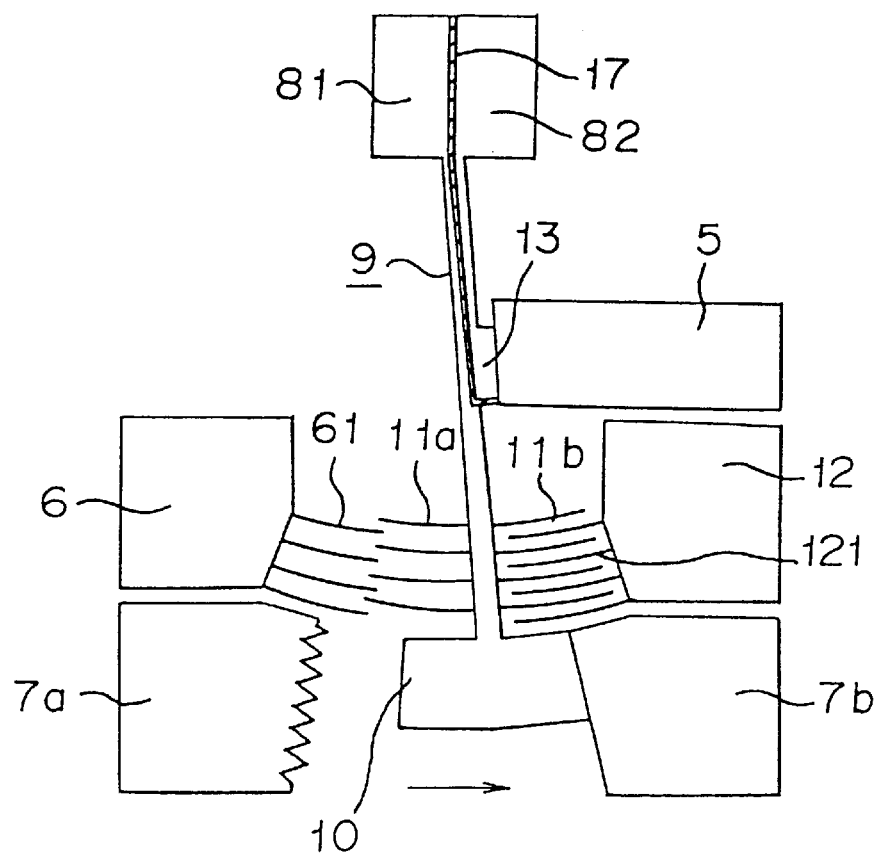
FIG. 10 is a partial plan view for schematically showing a semiconductor accelerometer switch according to Embodiment 2 of the present invention.

FIG. 7 shows important portions of the semiconductor accelerometer switch according to Embodiment 2. FIG. 8 is a view for explaining operation of the semiconductor accelerometer switch, specifically a state that the movable body is held. FIG. 9 is a cross-sectional view taken along a line 9—9 of FIG. 8.

In the Figures, the same references as those in FIGS. 1 through 6 designate the same or the similar portions. Numerical reference 11a designates a movable electrode as the first movable electrode; and numerical reference 11b designates a finlike movable electrode as a third movable electrode. The movable electrode 11a is provided in the side surface of the beam 9 as the first side surface opposite to the control electrode 6. The movable electrode 11b is provided on the side surface of the beam 9 as the second surface opposite to the fixed electrode 5. The first side surface and the second side surface in the beam are opposite to each other.

The fixed portion 2 has a control electrode 12 as a the second control electrode, wherein the control electrode 12 is fixed to the base 1. Numerical reference 121 designates a finlike electrode provided in the control electrode 12.

In a sealing substrate 4, a hole is formed in a portion corresponding to the control electrode 12, in which a portion for drawing out electrode 20e is formed to enable an electric voltage to be externally applied to the control electrode 12.

When a voltage is applied between portions for drawing out electrodes of the terminal 81 and the fixed electrode 12, electrostatic attraction is generated between the movable electrode 11b and the electrode 121. When the magnitude of acceleration exceeds a certain threshold, the movable body 30 starts to be displaced; the beam 9 bends on the side of the fixed electrode 5; the mass 10 moves on the side of stopper 7b; and the movable electrode 13 is in contact with the fixed electrode 5 to electrically connect the terminal 82 with the fixed electrode 5, by inertia force effecting on the movable body 30 and the electrostatic attraction generated between the movable electrode 11b and the electrode 121.

At this time, because the movable body 30 is held by the electrostatic attraction generated between the movable electrode 11b and the electrode 121, it is possible to prevent the mass 10 from oscillating like a swinging pendulum.

Further, under a state that the movable body 30 is held by the electrostatic attraction generated between the movable electrode 11b and the electrode 121, the finlike electrode formed on the second surface of the beam 9 and the finlike electrode formed on the control electrode 12 overlap each other. Accordingly, the occurrence of chattering caused by repeated contact or non-contact of the movable electrode 13 with the fixed electrode 5 in a short interval of time can be prevented. Further, even though a voltage applied between the movable electrode 11b and the electrode 121 is made small, large electrostatic attraction can be generated because the movable electrode 11b and the electrode 121 are formed like fins.

Therefore, an output signal of detecting acceleration can be outputted for a predetermined time period by the semiconductor accelerometer switch. A detecting circuit (not shown) for detecting acceleration by receiving this output signal as an input signal can detect a variation of the output signal from the semiconductor accelerometer switch more easily. Accordingly, it is possible to make the semiconductor accelerometer switch more preferable as a switch for actuating an air bag for automobile.

Further, by applying an electric voltage between the movable electrode 11b and the control electrode 12 without applying a voltage between the movable electrode 11a and the control electrode 6, the movable body 30 displaces on the side of the fixed electrode 5 by electrostatic attraction generated between the movable electrode 11b and the electrode 121; the movable electrode 13 is in contact with the fixed electrode 5; and the fixed electrode 5 is electrically connected to the terminal 18 connected to the movable electrode 13.

In other words, by appropriately adjusting the voltage to be applied between the movable electrode 11a and the control electrode 6 and the voltage to be applied between the movable electrode 11b and the control electrode 12, it is possible to make the movable electrode 13 and the fixed electrode 5 in contact or non-contact with each other, whereby a simulation whether or not a normal output is obtainable under the above state can be conducted. Accordingly, it is possible to examine a function of semiconductor accelerometer switch without actually applying acceleration and detect a defective semiconductor accelerometer switch more easily.

Embodiment 3

Figure 11:
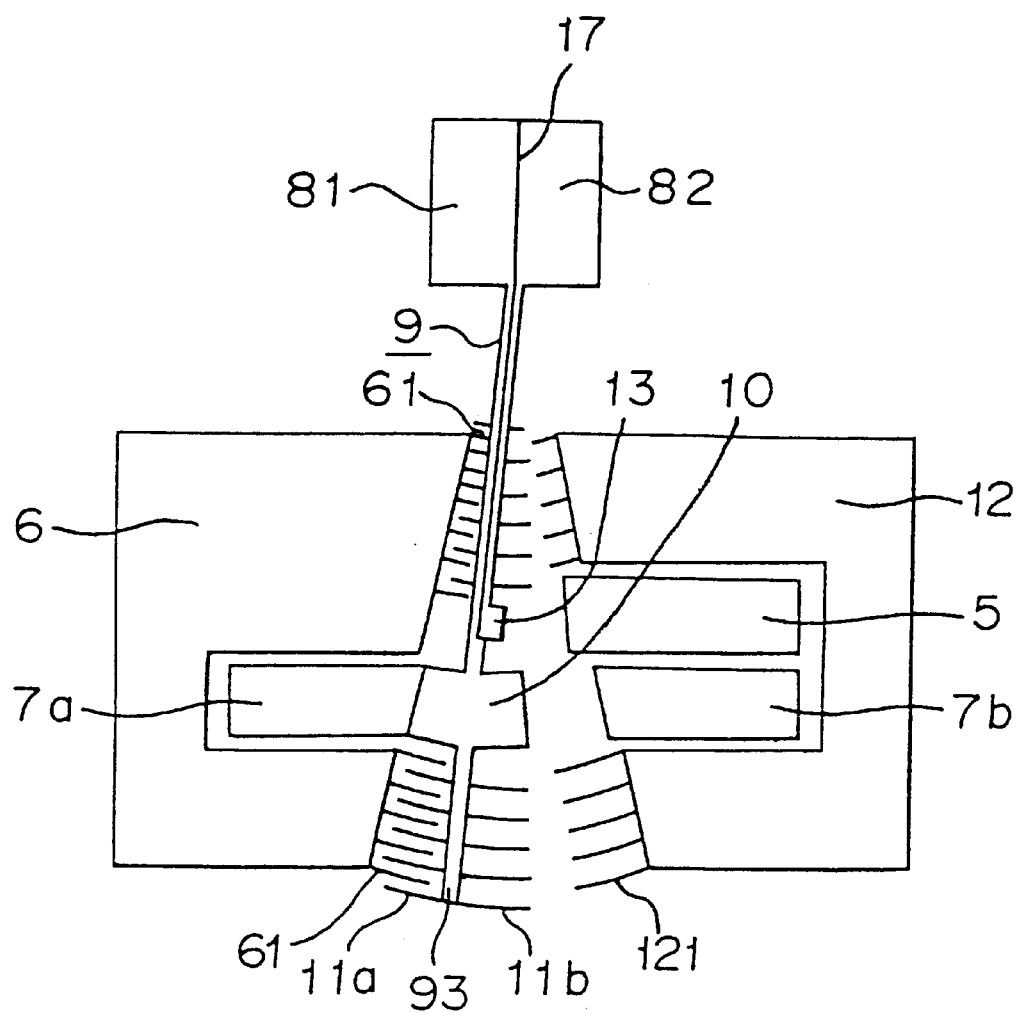
FIG. 11 is a partial plan view for schematically showing a semiconductor accelerometer switch according to Embodiment 3 of the present invention.

A semiconductor accelerometer switch according to Embodiment 3 of the present invention is characterized by that a mass is provided in the inside of a beam. FIG. 11 is a view for showing important portions of the semiconductor accelerometer switch according to Embodiment 3. In the Figure, the same references as those in FIGS. 1 through 10 designate the same or the similar portions. Numerical reference 93 designates a beam, one end of which is supported by a mass 10 and the other end of which is free. The beam 9 and the beam 93 are arranged in a substantially linear line and the mass 10 is interposed between the beam 9 and the beam 93. By constructing as such, the mass 10 can be provided in a middle of the beam.

In a side surface of the beam 9 facing a control electrode 6, a finlike movable electrode 11a is provided. In a side surface of the beam 93 facing the control electrode 6, a finlike movable electrode 11a is formed. In a side surface of the beam 9 facing a fixed electrode 5, a finlike movable electrode 11b is formed. In a side surface of the beam 93 facing the fixed electrode 5, a finlike movable electrode 11b is formed.

The shape of the control electrode 6 has a recess, in which a stopper 7a is provided. Both sides of the recess are formed with a finlike electrode 61. The shape of the control electrode 12 has a recess, in which a fixed electrode 5 and a stopper 7b are provided. Both sides of the recess are formed with a finlike electrode 121. The number of fins of the finlike electrode 61 is larger than that of fins of the finlike electrode 121.

In the semiconductor accelerometer switch according to Embodiment 3, the beam 93 is provided; the electrode 11a is provided in the side surface of the beam 93 facing the control electrode 6; the mass 10 is provided in an inside of the beam; and a larger number of electrodes is provided in the side surface of the movable body 30 facing the control electrode 6 than that in the other side surface. As a result, an area of electrode facing the finlike electrode formed in the control electrode 6 is made larger than that on the opposite side. Accordingly, provided that the magnitude of voltage to be applied between the control electrode 6 and the terminal 19 is the same level as that in Embodiment 1, the magnitude of electrostatic attraction can be made larger than that in Embodiment 1.

On the other hand, provided that the magnitude of electrostatic attraction is the same level as that in Embodiment 1, the magnitude of voltage to be applied between the control electrode 6 and the terminal 19 can be made smaller than that in Embodiment 1 and thereby the movable electrode 13 can be in contact with the fixed electrode 5 in a further stable manner.

In addition, when the number of fins of the finlike electrode 61 provided in the control electrode 6 is larger that that of the finlike electrode 121 provided in the control electrode 12, in a case that a voltage applied between the control electrode 6 and the terminal 19 is the same as a voltage applied between the control electrode 12 and the terminal 18, it is possible to constantly bend the beam 9 on the side of the control electrode 6, whereby the movable body 30 can be securely held on the side of the control electrode 6.

Therefore, it is possible to securely set the semiconductor accelerometer switch in a state before the magnitude of effecting acceleration exceeds a certain threshold.

Embodiment 4

Figure 12:
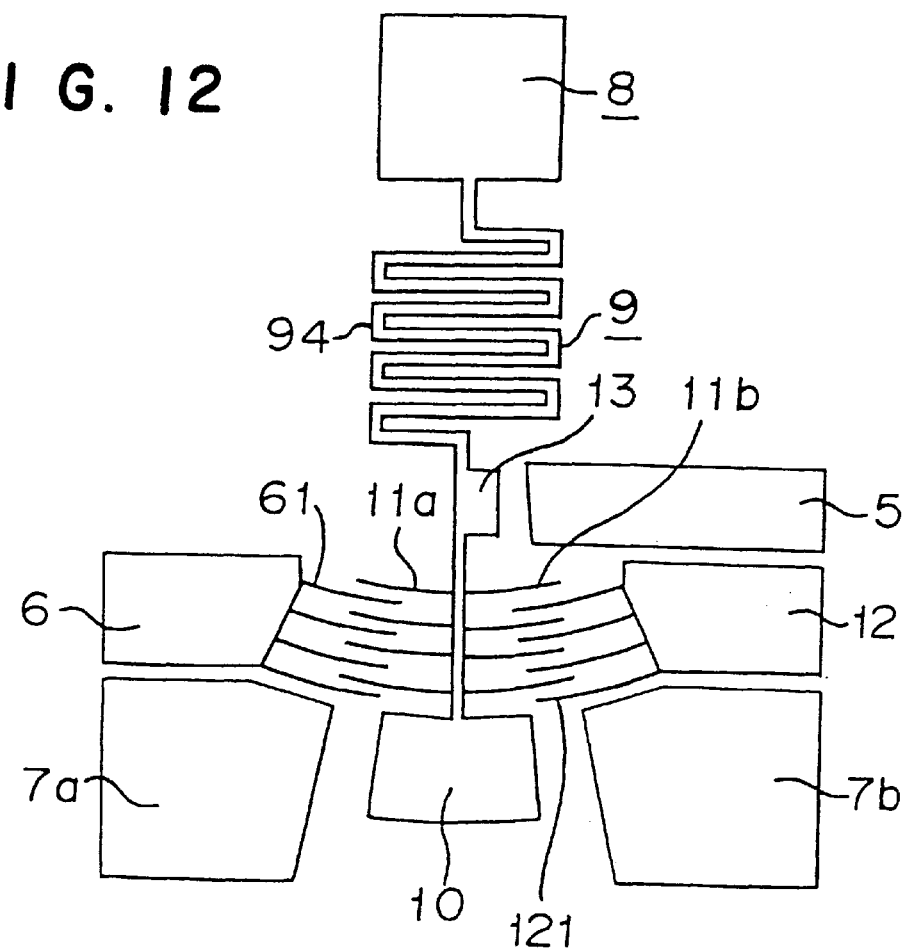
FIG. 12 is a partial plan view for schematically showing a semiconductor accelerometer switch according to Embodiment 4 of the present invention.

FIG. 12 is a view for explaining important portions of a semiconductor accelerometer switch according to Embodiment 4 of the present invention. The same references as those in FIGS. 1 through 11 designate the same or the similar portions.

A beam 9 is characterized in that a part of the beam 9 has a winding portion 94 which meanders in a parallel plane to a silicon substrate used for forming the beam 9. The winding portion 94 is provided between a supporting portion 8 and a movable electrode 13. By such a structure, the elasticity of the beam 9 can be made high, whereby the sensitivity of the beam 9 is improved and it becomes more easy to control a threshold of acceleration by a voltage to be applied between a control electrode 6 and a terminal 81.

Embodiment 5

Figure 13:
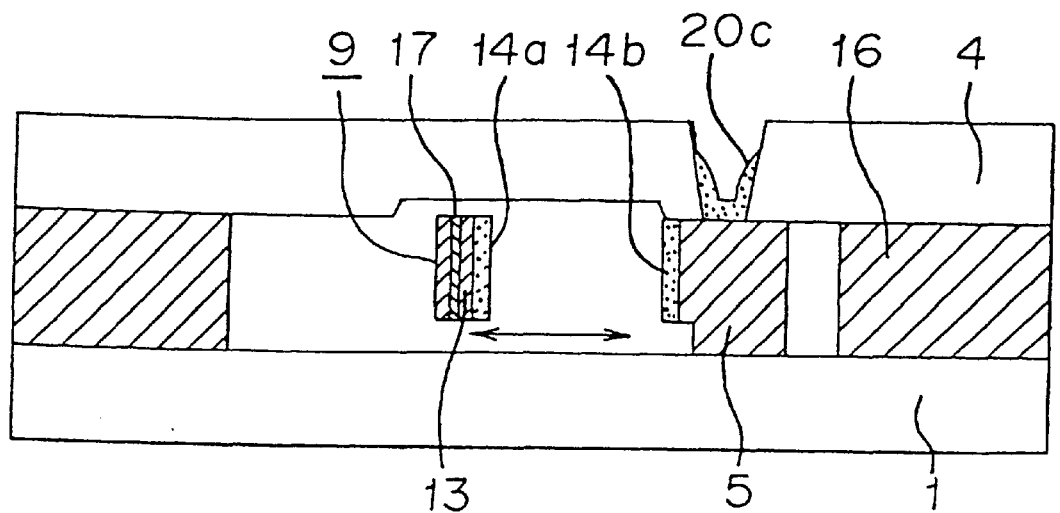
FIG. 13 is a side view in section for schematically showing a semiconductor accelerometer switch according to Embodiment 5 of the present invention.

FIG. 13 is a cross-sectional view of a semiconductor accelerometer switch according to Embodiment 5 of the present invention. In the Figure, the same references as those in FIGS. 1 through 12 designate the same or the similar portions. Numerical reference 14a designates a buffer member provided in a movable electrode 13 and numerical reference 14b designates a buffer member provided in a fixed electrode 5. It is preferable to make the buffer members 14a and 14b by, for example, a soft metallic film having high amalleability and high ductility. As a metal used for the metallic film is preferably, for example, gold, silver, copper, and/or platinum.

In FIG. 13, when the magnitude of acceleration exceeds a predetermined threshold, a mass 10 moves on a side of a stopper 7b and the buffer member 14a is in contact with the buffer member 14b; and a terminal 82 is electrically connected to a fixed electrode.

Further, since the buffer members are in contact with each other, impact force applied to a beam 9 and the movable electrode 13 occurred by the contact can be relaxed and thereby the movable body 30, especially the beam 9, is hard to be destroyed, whereby the semiconductor accelerometer switch having high durability to failures is obtainable.

In Embodiment 5, an example that the buffer member 14a is provided in the movable electrode 13 and the buffer member 14b is provided in the fixed electrode 5 is described. However, the present invention is not limited to such an example and the above-mentioned effects are obtainable if a buffer member is provided in at least one of the movable electrode 13 and the fixed electrode 5.

Embodiment 6

FIG. 14 is a cross-sectional view of a semiconductor accelerometer switch according to Embodiment 6 of the present invention. In the Figure, the same references as those in FIGS. 1 through 13 designate the same or the similar portions.

A base 1 is a silicon substrate having a low resistance. In the base 1, portions corresponding to a fixed electrode 5, a fixed electrode 6, a terminal 81, and a terminal 82 are formed with a hole, in which holes portions for drawing out electrode having a metallic film such as Cr/Au are respectively formed. An insulating film is formed along with the direction of the thickness of the base 1 in the periphery of a portion of the base 1 around the portions for drawing out electrode in order to electrically insulate.

In FIG. 14, a portion for drawing out electrode 20a is formed on a surface of the base 1 beneath a control electrode 6 and a portion for drawing out electrode 20e is formed on a surface of the base 1 beneath a control electrode 12. Further, because insulating films 17a, 17b, 17c, and 17d are formed along with the thickness direction of the base in the vicinity of the portions for drawing out electrode 20a and 20e in the base 1, parts of the base 1 in the vicinity of the portions for drawing out electrode 20a and 20e are electrically insulated from the other parts of the base 1. By constituting as such, it is possible to apply a voltage from the side of the base 1 to electrodes and terminals of a fixed portion 2 and a movable portion 3 respectively.

Although an example that the thickness of the base 1 is made thin by wet anisotropic etching at around a part provided with the portions for drawing out electrode and a voltage drop caused by the base 1 is reduced, the whole surface of the back surface of the base 1 may be made thin by abrasion or the like as shown in FIG. 15.

Embodiment 7

When the thickness of a beam 9 is made thin, the elasticity of the beam 9 becomes large and thereby the beam 9 is apt to bend even by small electrostatic attraction. Therefore, it is possible to further reduce a voltage applied to a control electrode 6 and a control electrode 12, whereby it becomes further easy to control displacement of a movable body 30 by means of electrostatic attraction.

However, when the thickness of the beam 9 is reduced, the beam 9 is apt to bend in the direction of the gravity and therefore there is a danger that a mass 10 is in contact with a base 1 or a sealing substrate 4. In such a case, there are problems that the sensitivity of the beam 9 is lowered; the detecting accuracy by a semiconductor accelerometer switch is spoiled; and the reliability is lowered, because frictional force occurs between the base 1 and the mass 10 or between the sealing substrate 4 and the mass 10.

The semiconductor accelerometer switch according to Embodiment 7 of the present invention is provided to solve the above-mentioned problems and an object thereof is to obtain a semiconductor accelerometer switch having high detecting accuracy and high reliability.

Figure 16:
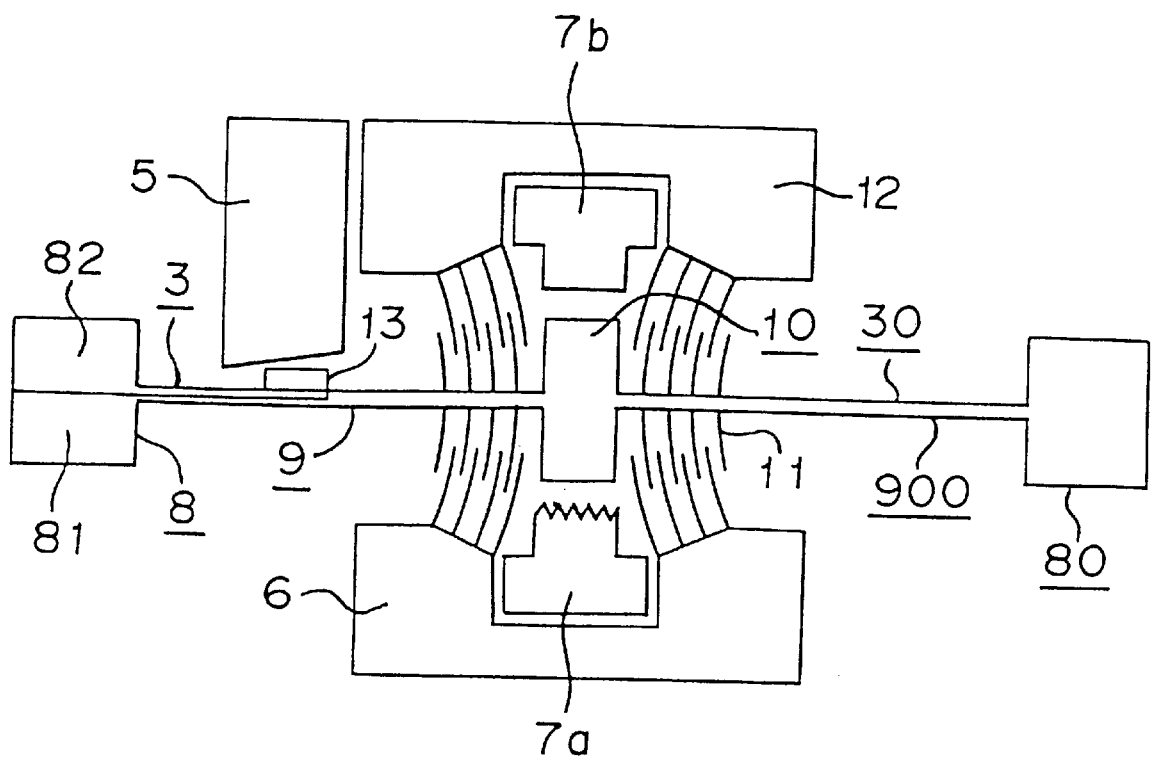
FIG. 16 is a partial plan view for schematically showing a semiconductor accelerometer switch according to Embodiment 7 of the present invention.

FIG. 16 is a view for showing important portions of the semiconductor accelerometer switch according to Embodiment 7 of the present invention. In the Figure, the same references as those in FIGS. 1 through 15 designate the same or the similar portions.

The semiconductor accelerometer switch is characterized in that the mass 10 of the semiconductor accelerometer switch is supported by at least two beams. FIG. 16 shows a state that the sealing substrate 4 and a frame 16 are omitted for the purpose of the readiness.

Numerical reference 80 designates a supporting portion fixed to the base 1; and numerical reference 900 designates a beam, one end of which is supported by the supporting portion 80 and the other end is attached to the mass 10. The beam 9 and the beam 900 are arranged in a linear line. The thickness of the beam 900 is adjusted to make the elasticity thereof large. Further, a fixed electrode 5 is provided in an outside of a control electrode 12.

Since, in the semiconductor accelerometer switch according to Embodiment 7, the mass 10 is supported by at least two beams 9 and 900 on the both sides of the mass 10, even though the thickness of the beam 9 is made thin and the elasticity of the beam 9 is made large, bending of the beam 9 in the direction of the gravity can be restrained and the mass 10 is not in contact with the base 1 and the sealing substrate 4, whereby the sensitivity of the beam 9 is improved and a semiconductor accelerometer switch having high detecting accuracy and high reliability is obtainable.

Embodiment 8

Figure 17:
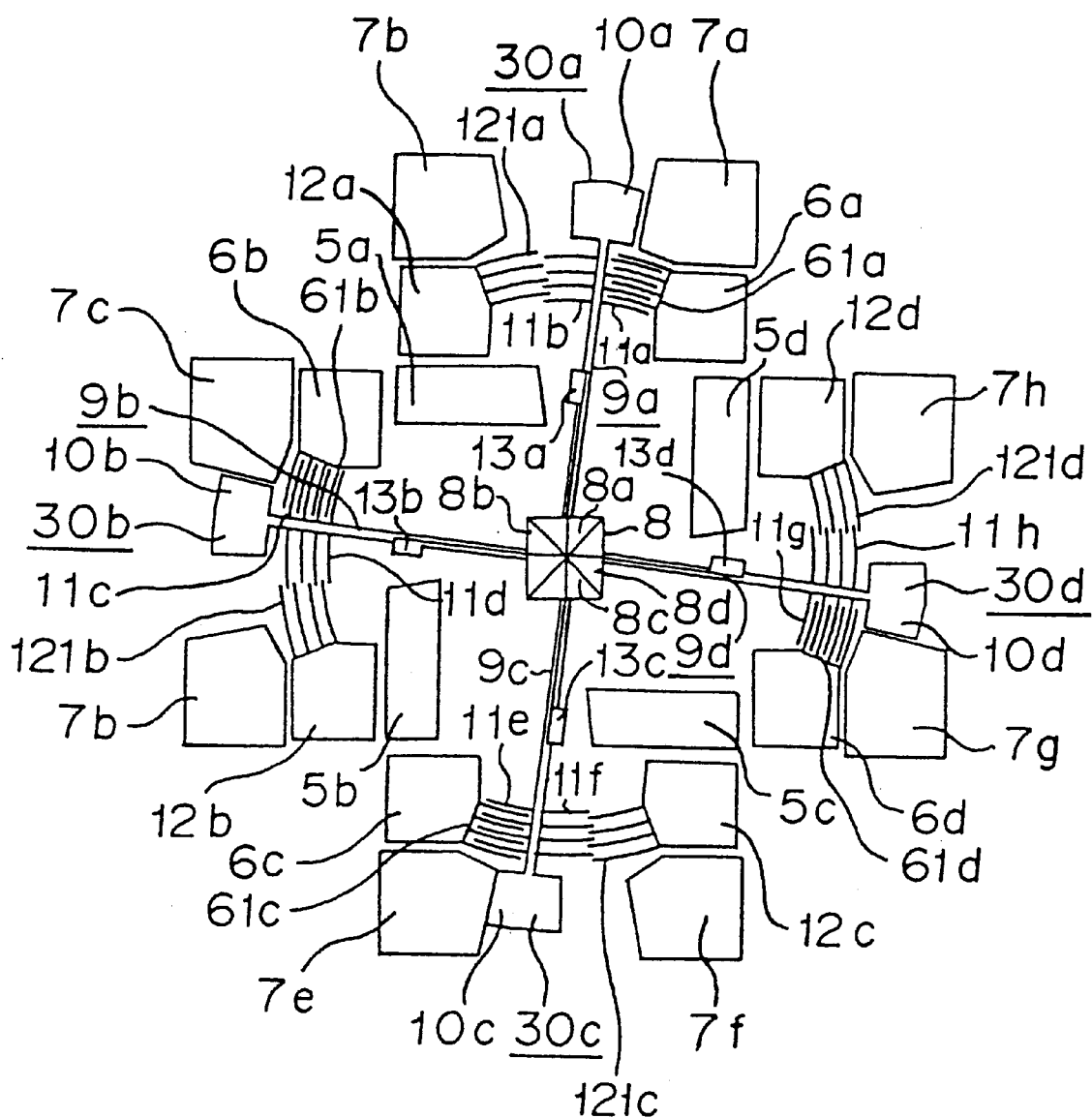
FIG. 17 is a partial plan view for schematically showing a semiconductor accelerometer switch according to Embodiment 8 of the present invention.

A semiconductor accelerometer switch according to Embodiment 8 of the present invention is characterized in that acceleration in various directions is detectable. FIG. 17 is a view for showing important portions of the semiconductor accelerometer switch according to Embodiment 8, specifically a plan view of the semiconductor accelerometer switch. In the Figure, the same references as those in FIGS. 1 through 16 designate the same or the similar portions. In FIG. 17, a sealing substrate 4 and a frame 16 are omitted.

In FIG. 17, a supporting portion 8 includes supporting arms 8a through 8d which are electrically insulated each other. Numerical reference 30a designates a movable body a part of which is supported by the supporting arm 8a; numerical reference 30b designates a movable body a part of which is supported by the supporting arm 8b; numerical reference 30c designates a movable body a part of which is supported by the supporting arm 8c; and numerical reference 30d designates a movable body a part of which is supported by the supporting arm 8d.

In the other ends of the beams 9a through 9d extending in four directions from the supporting arms 8a through 8d, masses 10a through 10d are respectively formed. On both sides respectively of the movable bodies 30a through 30d, control electrodes 6a through 6d as the first control electrode and control electrodes 12a through 12d as the second control electrode are provide. A movable electrode 11a is provided on a first side surface of the movable body 30a; a movable electrode 11b is provided on a second surface thereof; and these electrodes are a finlike electrode. A movable electrode 11c is provided on a first side surface of the movable body 30b; a movable electrode 11d is formed on a second surface thereof; and these electrodes are a finlike electrode.

A movable electrode 11e is formed on a first side surface of the movable body 30c; a movable electrode 11f is formed on a second side surface thereof; and these electrodes are a finlike electrode. A movable electrode 11g is formed on a first side surface of the movable body 30d; a movable electrode 11h is formed on a second side surface thereof; and these electrodes are a finlike electrode.

On the sides of the first control electrodes of the movable bodies 30a through 30d, stoppers 7a, 7c, 7e, and 7g as the first stopper are respectively formed. Fixed electrodes 5a through 5d are formed on the sides opposite to the control electrodes 6a through 6d. Stoppers 7b, 7d, 7f, and 7h are respectively formed on the sides of the fixed electrodes 5a through 5d of the movable bodies 30a through 30d. Electrodes 61a through 61d are formed respectively on the control electrodes 6a through 6d, wherein the electrodes 61a through 61d are formed like fins. Electrodes 121a through 121d are respectively formed on the control electrodes 12a through 12d, wherein the electrodes 121a through 121d are formed like fins.

When voltages are applied between the control electrode 6a and the electrode 11a, between the control electrode 6b and the electrode 11c, between the control electrode 6c and the electrode 11e, and between the control electrode 6d and the electrode 11g, the movable bodies 30a through 30d respectively displace on the sides of the corresponding control electrode 6a through 6d. Because the directions of the beams 9a through 9d of bending by electrostatic attraction are different, directions of acceleration to be detected are different. By such a structure, it is possible to detect acceleration in various directions, in this case, the four directions of the upward, the downward, the leftward, and the rightward directions in FIG. 17, using a single semiconductor accelerometer switch.

Embodiment 9

Figure 18:
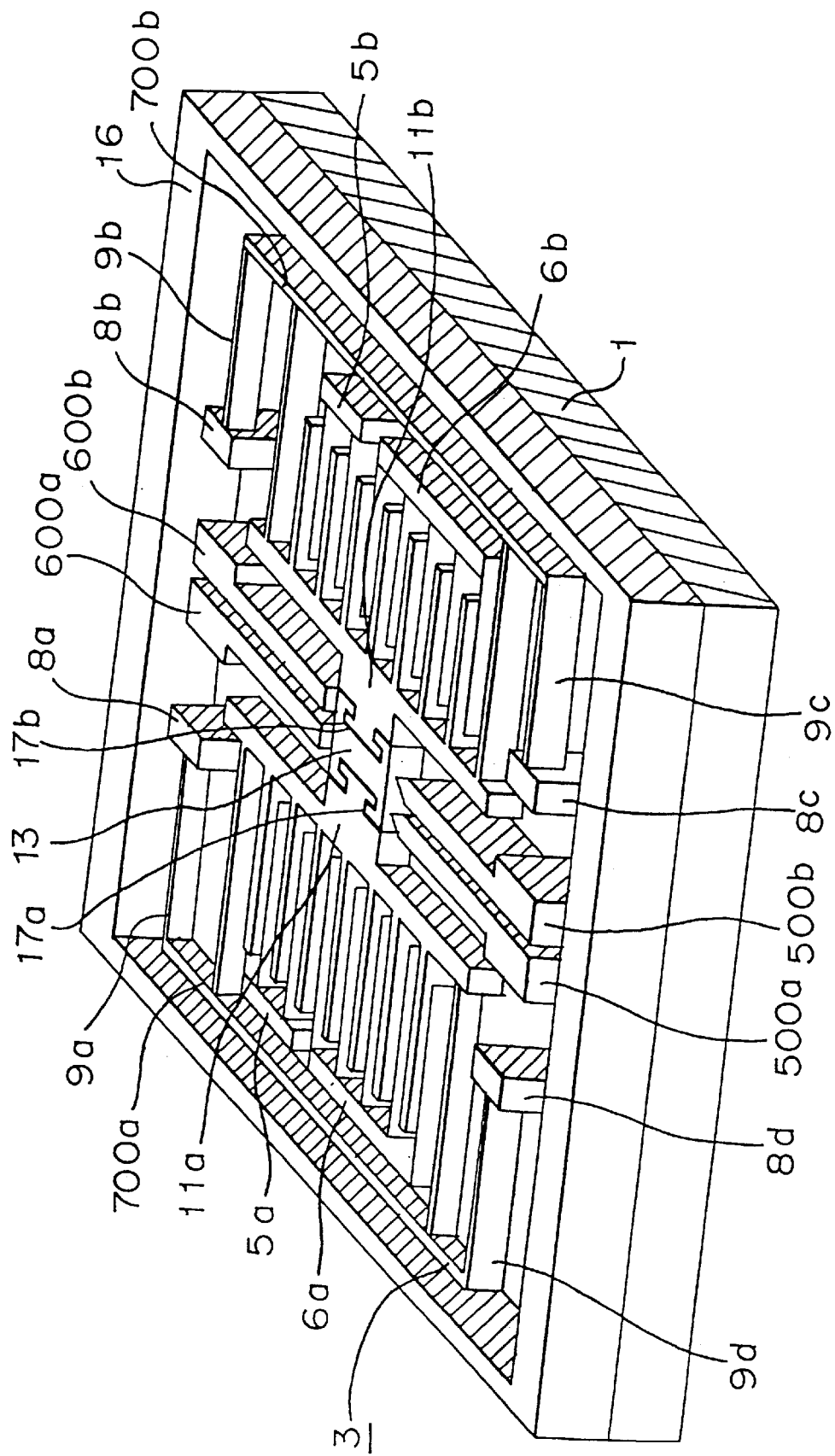
FIG. 18 is a perspective view for schematically showing a semiconductor accelerometer switch according to Embodiment 9 of the present invention.

FIG. 18 is a view for explaining a semiconductor accelerometer switch according to Embodiment 9 of the present invention. In the Figure, the same references as those in FIGS. 1 through 17 designate the same or the similar portions. FIG. 18 is a perspective view of the semiconductor accelerometer switch according to Embodiment 9, wherein a sealing substrate 4 is omitted.

A base 1 has insulating properties and is made of a material, for example, pyrex glass, having a coefficient of thermal expansion substantially the same as that of silicon. A fixed portion fixed on the base 1 includes two fixed electrodes 5a and 5b having a finlike shape, finlike control electrodes 6a and 6b as the first control electrode, terminals 500a and 500b as the first fixed terminal fixed to the base 1, and terminals 600a and 600b as the second fixed terminal fixed to the base 1.

A movable portion 3 includes four supporting portions 8a through 8d, a beam 9a one end of which is supported by the supporting portion 8a, a beam 9b one end of which is supported by the supporting portion 8b, a beam 9c one end of which is supported by the supporting portion 8c, a beam 9d one end of which is supported by the supporting portion 8d, finlike movable electrodes 11a and 11b as the first movable electrode, and a movable electrode 13 provided between the movable electrode 11a and the movable electrode 11b through insulating films 17a and 17b, which movable electrodes correspond to the second movable electrode.

Further, the movable portion 3 includes a connecting member 700a for connecting the beam 9a, the beam 9b, and the movable electrode 11a, and a connecting member 700b for connecting the beam 9c, the beam 9d, and the movable electrode 11*b*. A movable body 30 includes the beams 9*a* through 9*d*, the movable electrode 11*a* and 11*b*, the insulating films 17*a* and 17*b*, the movable electrode 13, and the connecting members 700*a* and 700*b*. The beams 9*a* through 9*d* support the movable electrode 11*a* and 11*b*, the movable electrode 13, and the insulating films 17*a* and 17*b* through the connecting members 700*a* and 700*b*.

In the fixed portion 2, the movable portion 3, and a frame 16, parts excluding the insulating films 17*a* and 17*b* can be simultaneously formed by etching a single material, in this case a silicon substrate having a low resistance is used. The finlike fixed electrode 5*a* and the finlike control electrode 6*a* are arranged such that these overlap the finlike movable electrode 11*a* each other and intervals of overlapping become uneven. The finlike fixed electrode 5*b* and the finlike control electrode 6*b* are arranged such that these overlap the finlike movable electrode 11*b* and intervals of overlapping become uneven.

In other words, fins of the movable electrode 11*a* are arranged so as to deviate toward any one of a pair of fins of the fixed electrode 5*a* and the control electrode 6*a* adjacent to each fin of the movable electrode 11*a*. Fins of the movable electrode 11*b* are arranges so as to deviate toward any one of a pair of fins of the fixed electrode 5*b* and the control electrode 6*b* adjacent to each fin of the movable electrode 11*b*.

In this, an example that the movable electrode 11*a* is arranged so as to deviate toward the fins on the side of the terminals 500*a* and 500*b* with respect to the fins of the fixed electrode 5*a* and the control electrode 6*a* adjacent to the fins of the movable electrode 11*a*, and the movable electrode 11*b* is arranged so as to deviate toward the fins on the side of the terminals 500*a* and 500*b* with respect to the fins of the fixed electrode 5*b* and the control electrode 6*b* adjacent to the fins of the movable electrode 11*b*, will be explained.

Provided that intervals between a fin of the movable electrode 11*a* and fins of the control electrode 6*a* adjacent thereto are respectively d1 and d2 under a state that a voltage is not applied between the movable electrode 11*a* and the control electrode 6*a* and that intervals between a fin of the movable electrode 11*b* and fins of the control electrode 6*b* adjacent thereto are respectively d1 and d2 under a state that a voltage is not applied between the movable electrode 11*b* and the control electrode 6*b*, there is a relationship of d1<d2.

The thicknesses of the beams 9*a* through 9*d* are adjusted to increase elasticity. Therefore, the beams are bent in response to the magnitude of acceleration. Accordingly, the movable electrode 11*a* supported by the beams 9*a* and 9*b* through the connecting member 700*a*, the movable electrode 11*b* supported by the beams 9*c* and 9*d* through the connecting member 700*b*, and the movable electrode 13 provided between the movable electrode 11*a* and the movable electrode 11*b* displace in response to the amount of bending of the beams 9*a* through 9*d*.

The fixed electrodes 5*a* and 5*b* are electrically connected in the outside. The control electrodes 6*a* and 6*b* are electrically connected in the outside. The movable electrode 13 is positioned between terminals 500*a* and 500*b* as the first fixed terminal and terminals 600*a* and 600*b* as the second fixed terminal. The tip portions of the terminals 500*a* and 500*b* are made sharp so as to be in contact with the movable electrode 13. Therefore, adhesion of the terminals 500*a* and 500*b* to the movable electrode 13 can be prevented.

The terminal 500*a* and the terminal 500*b* are electrically insulated. A constant voltage is applied to the terminal 500*a* and the terminal 500*b* is grounded. When the movable electrode 13 is in contact with the terminals 500*a* and 500*b*, the terminal 500*a* is electrically connected to the terminal 500*b*.

The terminals 600*a* and 600*b* are electrically insulated. A constant voltage is applied to the terminal 600*a* and the terminal 600*b* is grounded. When the movable electrode 13 is in contact with the terminals 600*a* and 600*b*, the terminal 600*a* is electrically connected to the terminal 600*b*.

Under a state that voltages are not respectively applied between the movable electrodes 11*a*, 11*b* and the control electrodes 6*a*, 6*b*, provided that a distance between the movable electrode 13 and the terminals 500*a*, 500*b* is d3 and a distance between the movable electrode 13 and the terminals 600*a*, 600*b* is d4, there are relationships of d1>d3, and d2>d4.

Therefore, when the movable electrode 13 is in contact with the terminals 500*a* and 500*b*, the movable electrode 11*a* is not in contact with the control electrode 6*a* and the movable electrode 11*b* is not in contact with the control electrode 6*b*.

Further, when the movable electrode 13 is in contact with the terminals 600*a* and 600*b*, the movable electrode 11*a* is not in contact with the control electrode 6*a* and the movable electrode 11*b* is not in contact with the control electrode 6*b*.

Figure 19:
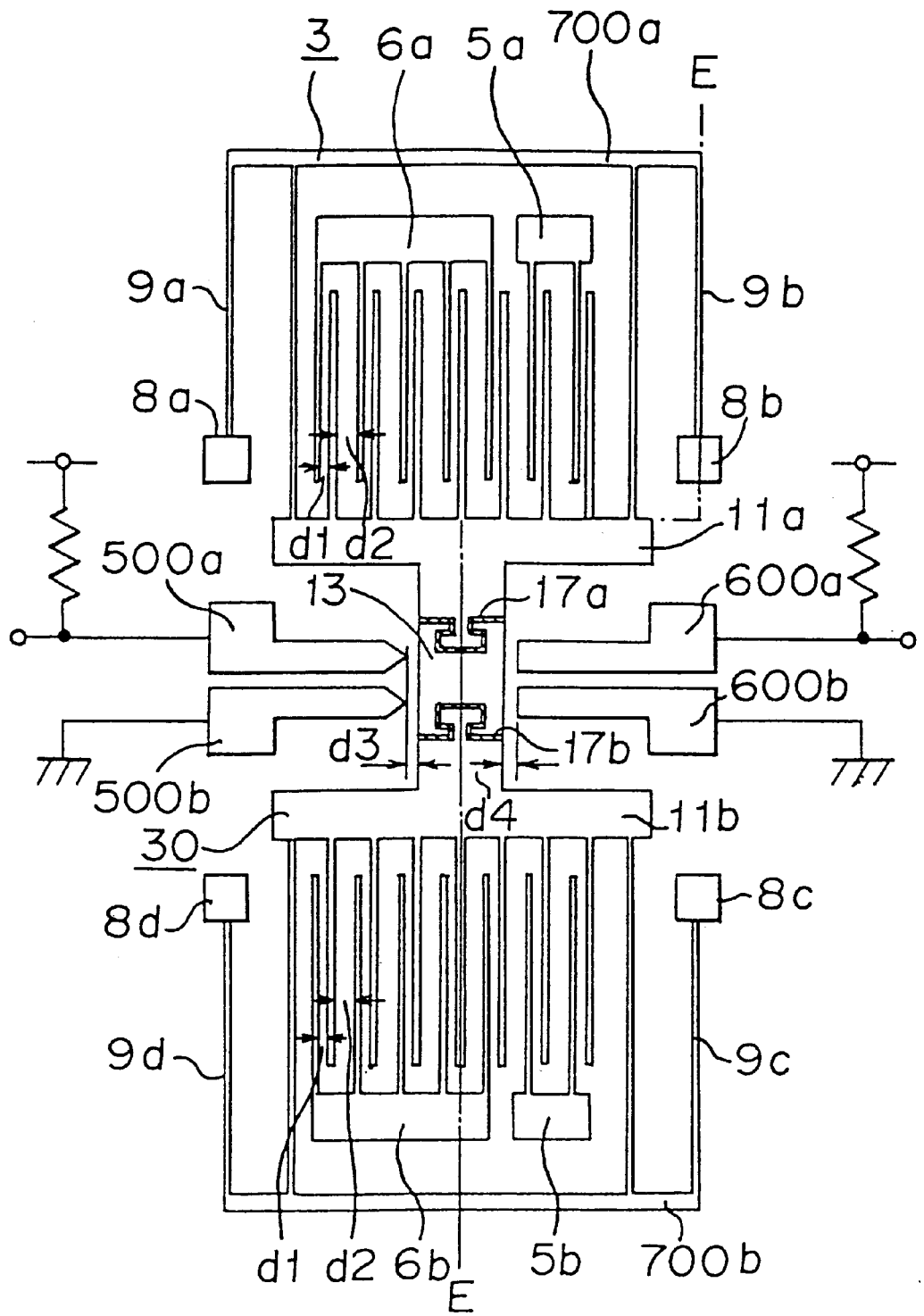
FIG. 19 is a partial plan view for schematically showing a semiconductor accelerometer switch according to Embodiment 9 of the present invention.
Figure 20:
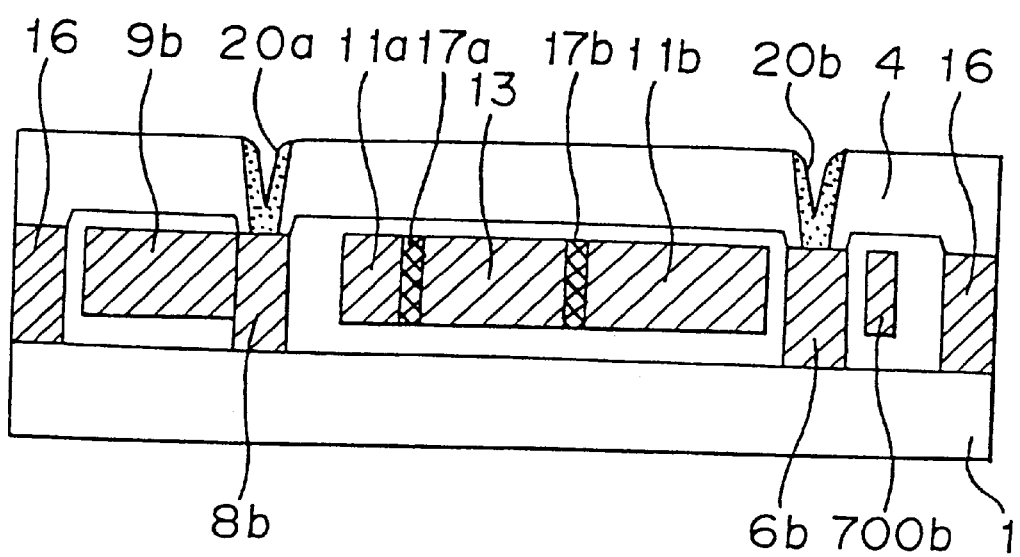
FIG. 20 is a side view in section for schematically showing a semiconductor accelerometer switch according to Embodiment 9 of the present invention.

FIGS. 19 and 20 are views for explaining operation of the semiconductor accelerometer switch. FIG. 19 is a view for showing important portions of the semiconductor accelerometer switch under a state that voltages are not applied between the movable electrodes 11*a*, 11*b* and the control electrodes 6*a*, 6*b* or that a power source is turned off. FIG. 20 is a cross-sectional view taken along a line E—E of FIG. 20.

In FIG. 20, numerical reference 20*a* designates a portion for drawing out electrode of the supporting portion 8*b* and numerical reference 20*b* designates a portion for drawing out electrode of the control electrode 6*b*. The movable electrodes 11*a* and 11*b* are electrically connected in the outside. Hereinbelow, an example that the movable electrodes 11*a* and 11*b* are grounded will be explained. The fixed electrodes 5*a* and 5*b* are electrically connected in the outside. The control electrodes 6*a* and 6*b* are electrically connected in the outside. By a switching circuit (not shown) provided in the outside, connection between the fixed electrodes 5*a*, 5*b* and the control electrodes 6*a*, 6*b* can be switched over. Hereinbelow, an example that the fixed electrodes 5*a*, 5*b* are electrically connected to the control electrodes 6*a*, 6*b* in the outside will be explained.

Figure 21:
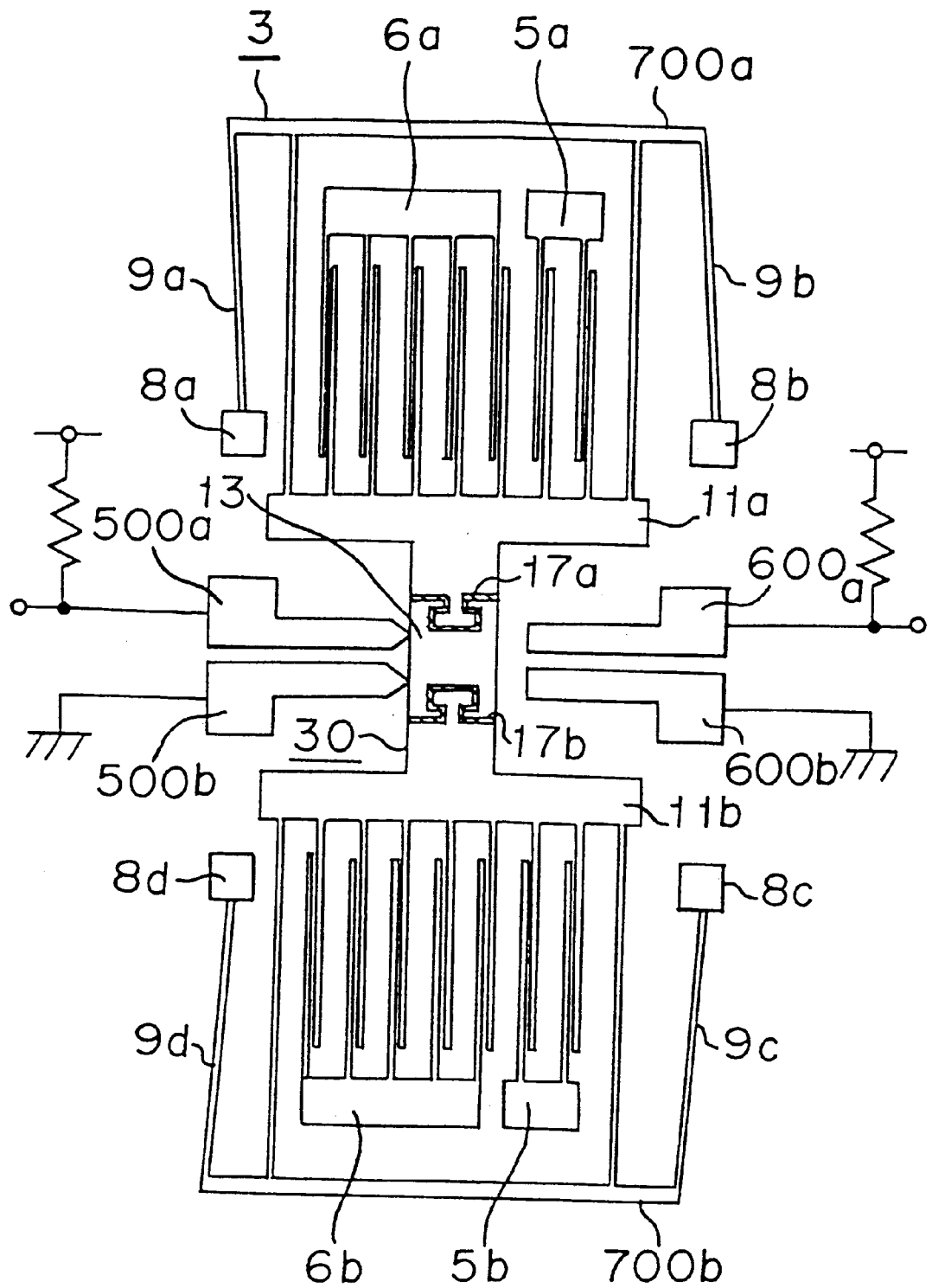
FIG. 21 is a partial plan view for schematically showing a semiconductor accelerometer switch according to Embodiment 9 of the present invention.

FIG. 21 is a view for explaining operation of the semiconductor accelerometer switch, specifically a view for showing a state that the movable electrode 13 is in contact with the terminals 500*a* and 500*b* by applying voltages between the movable electrodes 11*a*, 11*b* and the control electrodes 6*a* and 6*b* or turning the power source on.

In FIG. 21, when voltages are applied between the movable electrodes 11*a*, 11*b* and the control electrodes 6*a*, 6*b*, electrostatic attraction is generated between the movable electrode 11*a* and the control electrode 6*a* and between the movable electrode 11*a* and the fixed electrode 5*a*, and simultaneously electrostatic attraction is generated between the movable electrode 11*b* and the control electrode 6*b* and between the movable electrode 11*b* and the fixed electrode 5*b*. Accordingly, the movable body 30 moves on the side of the terminals 500*a* and 500*b* so that the movable electrode 13 is in contact with the terminals 500*a* and 500*b*. As a result, the movable body 30 starts to be displaced in the direction of further reducing the distance between electrode d1 and further increasing the distance between electrodes d2, namely, on the side of the terminals 500*a* and 500*b*. Thereafter, the movable electrode 13 is in contact with the terminals 500*a* and 500*b* and the movable body 30 is held in this position.

The terminals 500a and 500b work as a stopper for preventing the beams 9a through 9d from being destroyed by the displacement of the movable electrodes 11a and 11b to the extent of more than necessary. Since a constant voltage is applied to the terminal 500a and the terminal 500b is grounded, when the movable electrode 13 is in contact with the terminals 500a and 500b, the terminal 500a is shorted to the terminal 500b and the electric potential of the terminal 500a becomes low.

Since the terminal 600a is applied with a constant voltage and the terminal 600b is grounded, the movable electrode 13 is not in contact with the terminals 600a and 600b and the terminal 600a is opened from the terminal 600b under a state that the movable electrode 13 is in contact with the terminals 500a and 500b, wherein the electric potential of the terminal 600a becomes high.

Further, the tip portions of the terminals 500a and 500b to be in contact with the movable electrode 13 are made sharp, it is possible to prevent the movable electrode 13 from adhering to the terminals 500a and 500b.

In the semiconductor accelerometer switch under such an initial state, namely a state shown in FIG. 21, when acceleration exceeding a predetermined threshold in the leftward direction in the Figure effects on the semiconductor accelerometer switch, inertia force acts on the switch. When the magnitude of inertial force effecting on the movable body 30 is smaller than that of the electrostatic attraction, the movable body 30 is not displaced, wherein the movable electrode 13 remains being in contact with the terminals 500a and 500b.

However, when acceleration effecting on the semiconductor accelerometer switch exceeds a certain threshold and thereby inertia force effecting on the movable body 30 becomes larger than the electrostatic attraction, the movable body 30 displaces on the side of the terminals 600a and 600b and stops under a state that the movable electrode 13 is in contact with the terminals 600a and 600b. The terminals 600a and 600b also work as a stopper for preventing the beams 9a through 9d from being destroyed by the displacement of the movable electrodes 11a, 11b to the extent of more than necessary.

Figure 22:
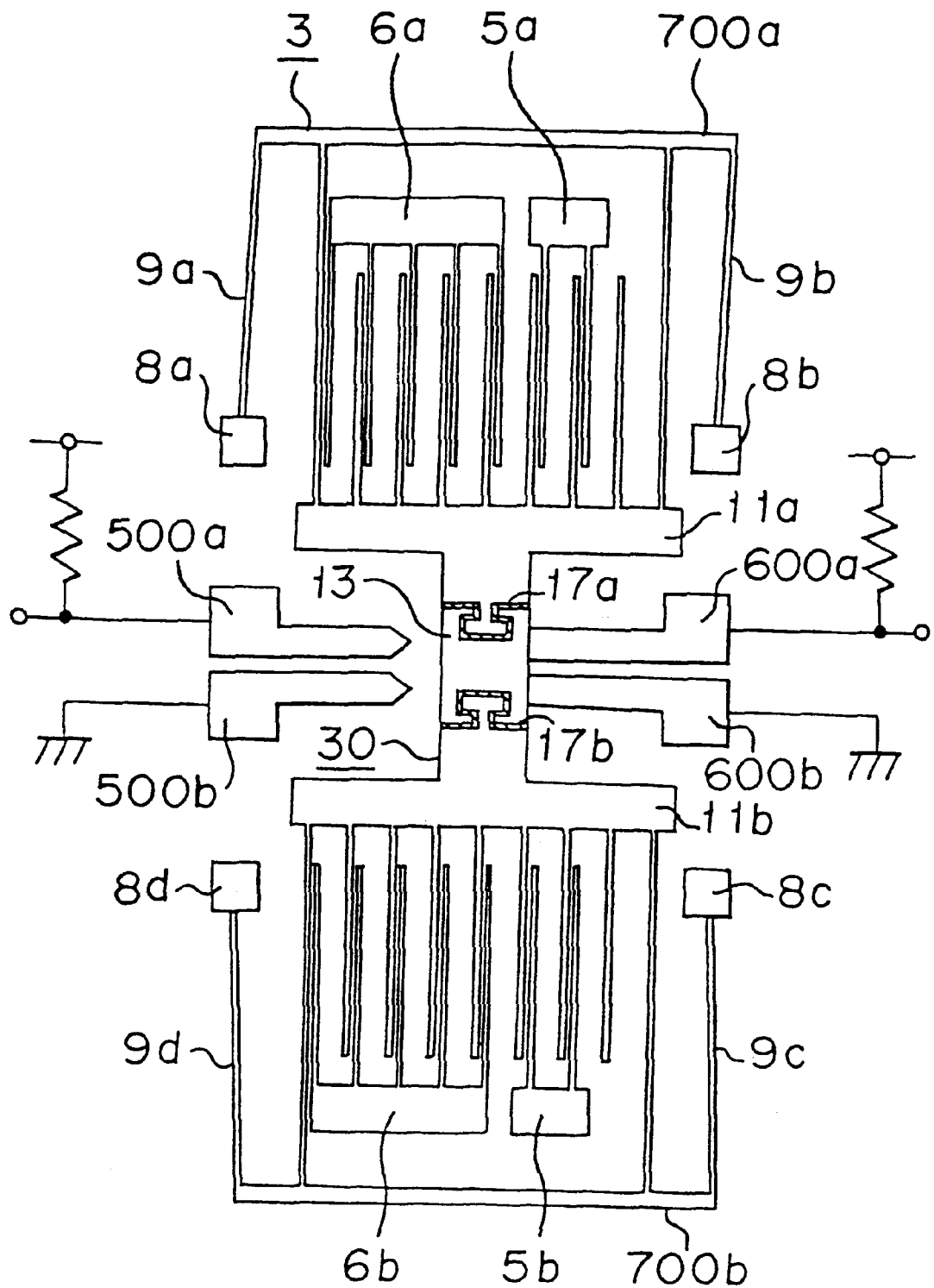
FIG. 22 is a partial plan view for schematically showing a semiconductor accelerometer switch according to Embodiment 9 of the present invention.

FIG. 22 is a view for explaining operation of the semiconductor accelerometer switch, specifically a view for showing a state that the movable electrode 13 is in contact with the terminals 600a and 600b by acceleration exceeding a certain threshold effected the semiconductor accelerometer switch. As shown, when the movable electrode 13 is in contact with the terminals 600a and 600b, the terminal 600a is shorted to the terminal 600b, wherein the electric potential of the terminal 600a becomes low. On the other hand, the terminal 500a is opened from the terminal 500b, wherein the electric potential of the terminal 500a becomes high. Accordingly, by detecting the electric potentials of the terminal 500a and the terminal 600a, it is possible to detect whether or not acceleration exceeding a predetermined threshold in a predetermined direction is effected thereon.

In the semiconductor accelerometer switch according to Embodiment 9, it is possible to change the magnitude of electrostatic attraction by changing voltages applied between the movable electrodes 11a, 11b and the control electrodes 6a, 6b. Therefore, the magnitude of inertia force effecting on and causing displacement of the movable body 30 can be set. Accordingly, it is possible to obtain the semiconductor accelerometer switch having wide general-purpose properties without changing mass of the movable body 30, especially mass of the movable electrodes 11a, 11b and the movable electrode 13.

Further, since the movable body 30 is held by electrostatic attraction, it does not react to acceleration smaller than the electrostatic attraction, whereby the semiconductor accelerometer switch which is scarcely affected by an outer disturbance, is stable, and has high reliability is obtainable.

Further, since the tip portions of the terminals 500a and 500b to be in contact with the movable electrode 13 are made sharp, it is possible to prevent the movable electrode 13 from adhering to the terminals 500a and 500b. Although an example that the tip portions of the terminals 500a and 500b has been described above, it is not limited to this example and the above-mentioned effects are obtainable by forming the tip portions of the terminals 500a and 500b to be in contact with the movable electrode 13 so as to be uneven.

Because each of the finlike fixed electrode 5a and the finlike control electrode 6a overlaps the finlike movable electrode 11a each other and the intervals of the overlaps are arranged to be ununiform, further since each of the finlike fixed electrode 5b and the finlike control electrode 6b overlaps the finlike movable electrode 11b each other and the intervals of the overlaps are arranged to be ununiform, when an electric voltage is applied between the movable electrodes 11a, 11b and the control electrodes 6a, 6b, the movable body 30 is always displaced in a predetermined direction. In the above case, the movable body 30 displaces in the direction of the terminals 500a and 500b.

Further, if the movable electrodes 5a, 5b are electrically connected to the control electrodes 6a, 6b in the outside, it is possible to further increase electrostatic attraction to be generated between the movable electrodes 11a, 11b and the control electrodes 6a, 6b when voltages are applied therebetween.

Further, it is possible to let the semiconductor accelerometer switch diagnose by itself using the control electrodes 6a, 6b and the fixed electrodes 5a, 5b. In the semiconductor accelerometer switch under the state shown in FIG. 21, when electrical connections between the fixed electrodes 5a, 5b and the control electrodes 6a, 6b are instantaneously cut by means a switching circuit (not shown) for controlling the electric connections between the fixed electrodes 5a, 5b and the control electrode 6a, 6b, electrostatic attraction becomes small, whereby the movable electrodes 11a and 11b and the movable electrode 13 are drawn back a little in the direction of the terminals 600a and 600b by elasticity of the beams 9a through 9d; the terminal 500a is opened from the terminal 500b; an the terminal 600a is opened from the terminal 600b. At this time, the electric potential of the terminal 500a and the electric potential of the terminal 600a become high.

Further, in the above-mentioned switching circuit, when the fixed electrodes 5a, 5b are electrically connected to the control electrodes 6a, 6b, the movable electrode 13 is again in contact with the terminals 500a and 500b by electrostatic attraction, wherein the terminal 500a is shorted to the terminal 500b and therefore the electric potential of the terminal 500a becomes low.

Accordingly, by controlling the switching circuit, the magnitude of electrostatic attraction is adjusted to control contact or non-contact between the movable electrode 13 and the terminals 500a, 500b, whereby a self-diagnostic function for checking whether or not an output of the terminal 500a is normal can be realized.

Heretofore, an example that electrostatic attraction to be given to the movable body 30 is controlled by the switching circuit has been described. However, the present invention is not limited thereto. For example, by adjusting voltages to be applied between the control electrodes 6a, 6b and the movable electrodes 11a, 11b, the magnitude of electrostatic attraction is adjusted to control a state of contact between the movable electrode 13 and the terminals 500a, 500b, whereby it is also possible to check whether or not the output of the terminal 500a is normal.

In other words, any structure can be adopted as long as the magnitude of electrostatic attraction given to the movable body 30 can be adjusted to control a state of contact between the movable electrode 13 and the terminals 500a, 500b and it is possible to check whether or not the output of the terminal 500a is normal.

Although the base 1 is insulated, if the base 1 is made of silicon having a low resistance, it is possible to apply a voltage from the side of the base 1.

Further, it is possible to abolish the insulating films 17a and 17b, integrate the movable electrodes 11a, 11b with the movable electrode 13, form an insulating film (not shown) on a surface of the movable electrode 13, and form a metallic film (not shown) on the insulating film as a movable electrode corresponding to the second movable electrode. In this case, since the insulating films 17a and 17b become unnecessary, there is no danger that the movable electrode 13 is estranged.

Further, by providing a metallic film having high malleability and high ductility such as gold, silver, copper and/or platinum on at least one of the faces in which the movable electrode 13 is in contact with each of the terminals 600a and 600b, a movable portion becomes hard to be destroyed and durability to failures of the semiconductor accelerometer switch is improved because impact force occurs at a time of the contact between the movable electrode 13 and the terminals 600a and 600b is relaxed.

Embodiment 10

Figure 23:
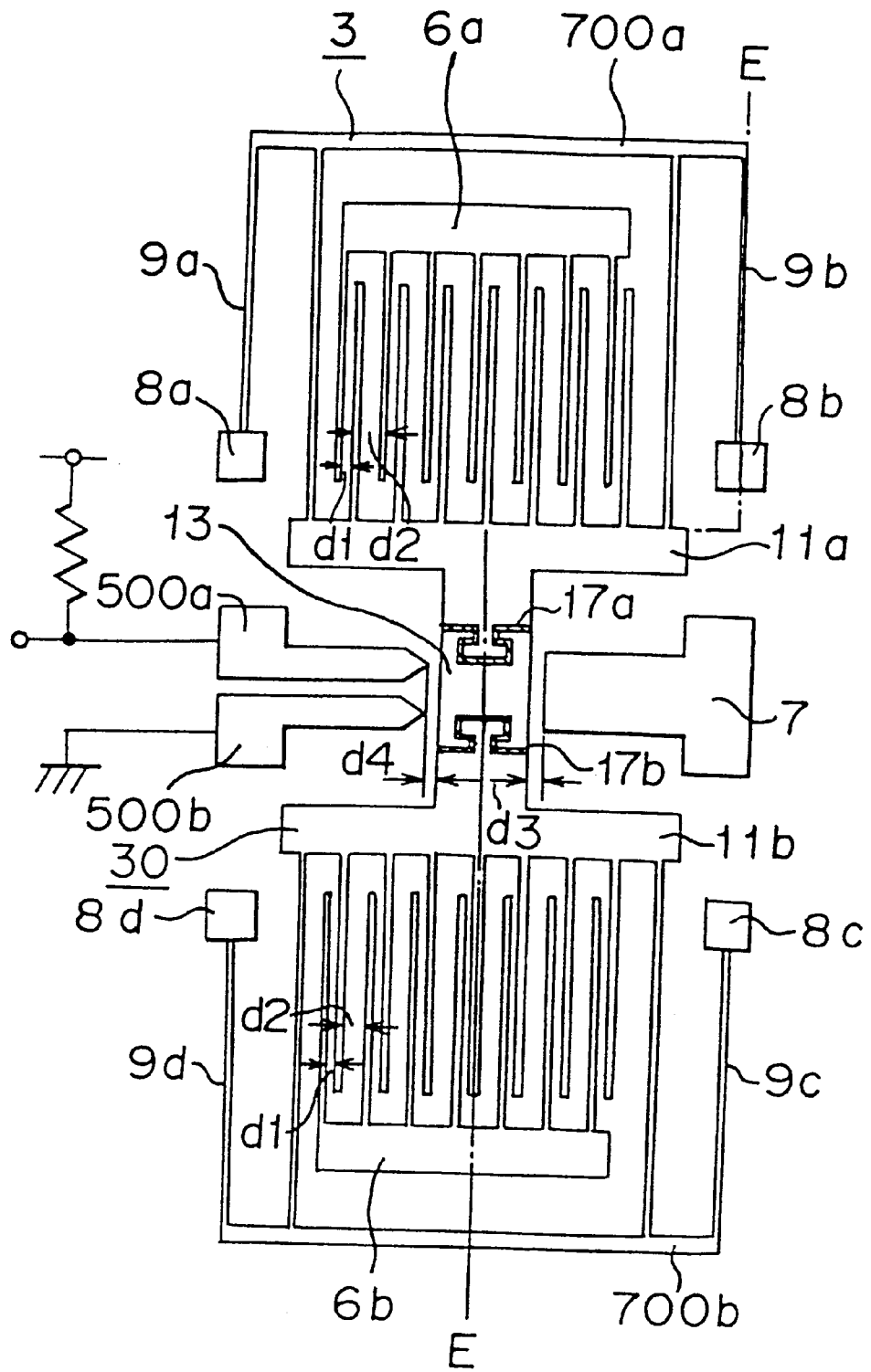
FIG. 23 is a partial plan view for schematically showing a semiconductor accelerometer switch according to Embodiment 10 of the present invention.

FIG. 23 is a view for explaining important portions of a semiconductor accelerometer switch according to Embodiment 10 of the present invention. In the Figure, the same references as those in FIGS. 18 through 22 designate the same or the similar portions.

Numerical reference 7 designates a stopper for restraining displacement of a movable electrode 13. Beams 9a through 9d have small elasticity or high rigidity. Provided that a distance between the movable electrode 13 and terminals 500a, 500b is d4 and a distance between the movable electrode 13 and the stopper 7 is d3 under a state that voltages are not applied between the movable electrodes 11a, 11b and control electrodes 6a, 6b, there are relationships of d1>d4 and d2>d3, among d1, d2, d3, and d4.

In FIG. 23, when voltages are applied between the movable electrodes 11a, 11b and the control electrodes 6a, 6b, electrostatic attraction is generated between the movable electrode 11a and each of the control electrode 6a and a fixed electrode 5a and also electrostatic attraction is generated between the movable electrode 11b and each of the control electrode 6b and a fixed electrode 5b, whereby, although a movable body 30 displaces on the side of the terminals 500a and 500b, the movable body 30 is held in a position where the movable electrode 13 is not in contact with the terminals 500a and 500b because the elasticity of the beams 9a through 9d is small. FIG. 23 shows a state that the movable body 30 is held by the beams 9a through 9d scarcely bent by the small elasticity of these.

At this time, the terminals 500a and 500b as the first fixed terminal are opened and therefore the electric potential of the terminal 500a is high. When acceleration effecting on the semiconductor accelerometer switch exceeds a certain threshold, the sum of inertia force and electrostatic attraction both effecting on the movable body 30 becomes larger than the elastic force of the beams 9a through 9d; the beams 9a through 9d bend; and the movable body 30 displaces on the side of terminals 500a and 500b and stops in a state that the movable electrode 13 is in contact with the terminals 500a and 500b. When the movable electrode 13 is in contact with the terminals 500a, 500b, the terminal 500a is shorted to the terminal 500b and therefore the electric potential of the terminal 500a becomes low.

Accordingly, by checking the potential of the terminal 500a, it is possible to detect whether or not acceleration having a predetermined magnitude in a predetermined direction effects on the semiconductor accelerometer switch.

Embodiment 11

Figure 24:
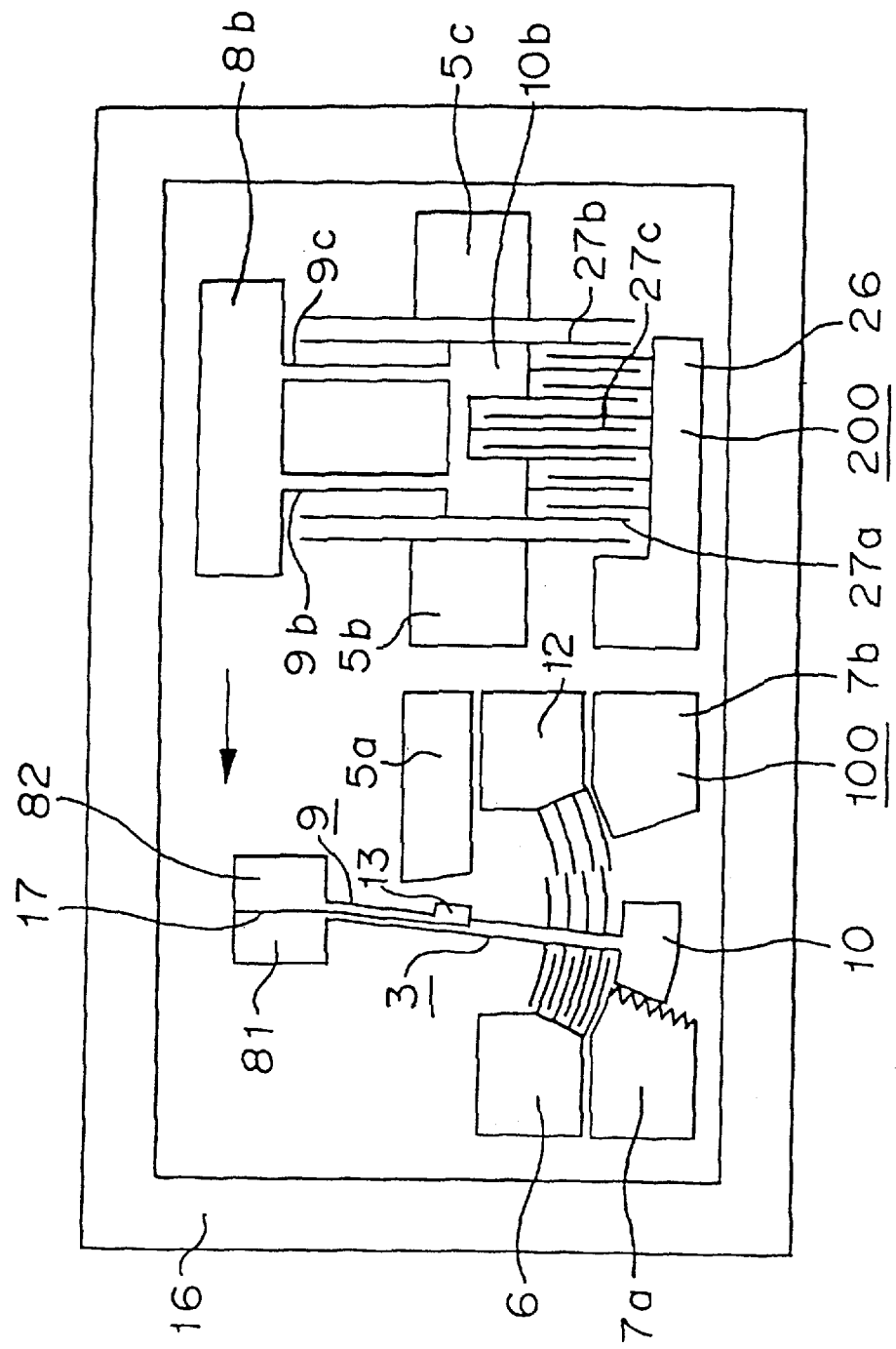
FIG. 24 is a plan view for schematically showing a semiconductor accelerometer switch according to Embodiment 11 of the present invention.
Figure 26:
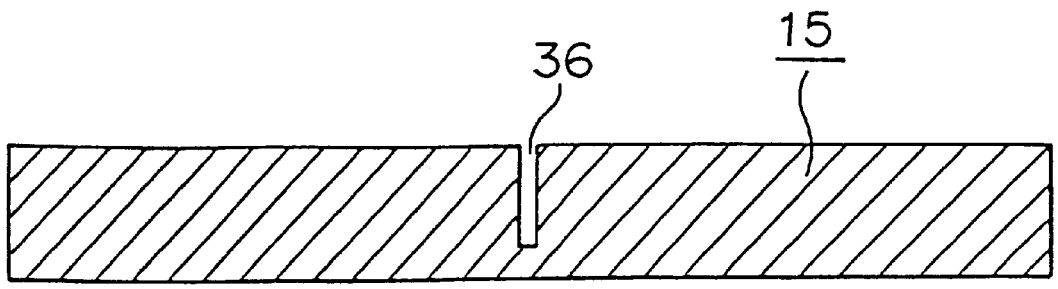
Figure 26:
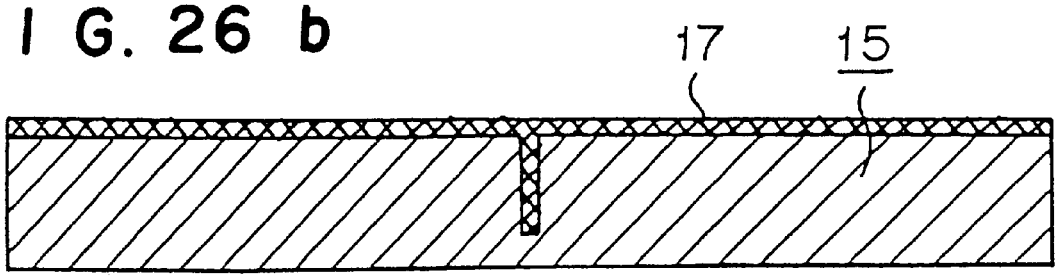
Figure 26:
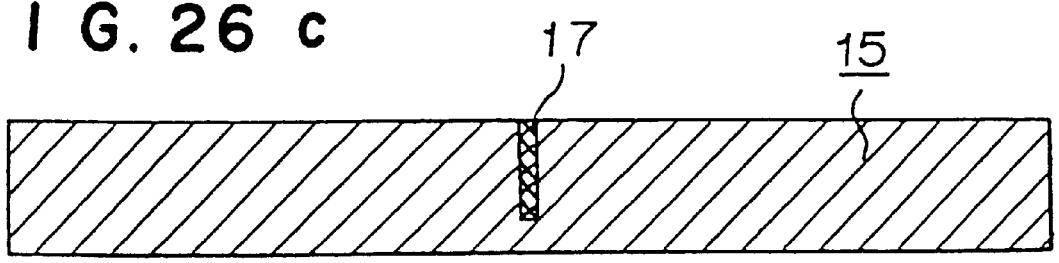
Figure 26:
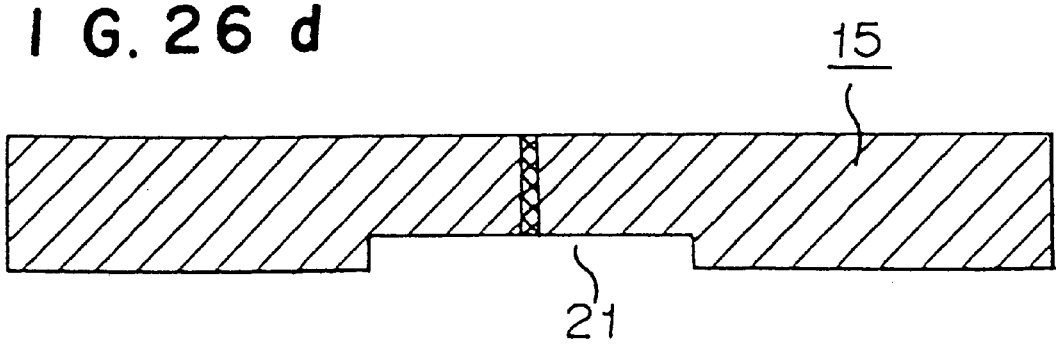

FIG. 24 is a view for explaining a semiconductor accelerometer switch according to Embodiment 11 of the present invention, specifically a plan view of important portions of the semiconductor accelerometer switch. In the FIG. 24, a sealing substrate is omitted from the semiconductor accelerometer switch. The same references as those in FIGS. 1 through 23 designate the same or the similar portions.

Numerical reference 100 designates the semiconductor accelerometer switch; and numerical reference 200 designates an accelerometer sensor of a capacitor-type. The semiconductor accelerometer switch for detecting acceleration in the direction of an arrow in the Figure and the capacitor-type accelerometer sensor are sealed in one chip. In FIG. 24, the semiconductor accelerometer switch 100 is arranged on the left side and the capacitor-type accelerometer sensor 200 is arranged on the right side. The capacitor-type accelerometer sensor 200 is to detect the magnitude of acceleration from an electrostatic capacitance which changes in response to the acceleration. Detailed descriptions of the semiconductor accelerometer switch is omitted because these have been described in the above Embodiments, and the capacitor-type accelerometer sensor 200 will be described hereinbelow.

Numerical references 5b and 5c are fixed electrodes, which are fixed to a base 1. Numerical references 27a, 27b, and 27c are intermediate electrodes which are integrally formed with a mass 10b supported by beams 9b and 9c extending from a supporting portion 8b and constructed so as to swing in the same direction as that of acceleration to be detected by the semiconductor accelerometer switch. Numerical reference 26 is an electrode for self-diagnosis, which is fixed to the base 1. A capacitor C1 is composed of the fixed electrode and the intermediate electrode 27a, and a capacitor C2 is composed of the intermediate electrode 27b and the fixed electrode 5c. When acceleration effects on the switch, the intermediate electrodes 27a and 27b displace; the capacitors C1 and C2 change; and therefore the magnitude of acceleration can be measured by detecting changes of the capacitors C1 and C2.

Further, by applying an electric voltage between the electrode for self-diagnosis 26 and the intermediate electrode 27c, the mass 10b is swung to conduct the self-diagnosis for checking whether or not the capacitor-type accelerometer sensor 200 normally functions.

According to the semiconductor accelerometer switch described in Embodiment 11, it is possible to miniaturize and reduce a cost because the semiconductor accelerometer switch 100 and the capacitor-type accelerometer sensor 200 are integrated into one chip. Further, intelligent processes can be treated by this chip because a plurality of pieces of information concerning acceleration can be drawn out of the chip. Further, similar effects thereto are obtainable by using the semiconductor accelerometer switch described in Embodiment 9 or Embodiment 10 instead of the semiconductor accelerometer switch 100 of Embodiment 11.

Embodiment 12

A semiconductor accelerometer switch according to Embodiment 12 is constituted such that a plurality of the semiconductor accelerometer switches described in the above described Embodiments are arranged so that directions to be detected by the semiconductor accelerometer switches are in agreement with each other and voltages to be applied between each control electrode 6 and each movable electrode 11 are different in each of the semiconductor accelerometer switches.

FIG. 25 is a view for explaining a structure of the semiconductor accelerometer switch according to Embodiment 12. The same references as those in FIGS. 1 through 24 designate the same or the similar portions. In FIG. 25, a sealing substrate 4 and a frame 16 are omitted.

Numerical reference 301 designates a power source for supplying an electric voltage between a terminal 81a and a control electrode 6a, the magnitude of the voltage is V1. Numerical reference 302 designates a power source for supplying a voltage between a terminal 81b and a control electrode 6b, wherein the magnitude of the voltage is V2.

Numerical reference 303 designates a power source for supplying a voltage between a terminal 81c and a control electrode 6c, wherein the magnitude of the voltage is V3. Numerical reference 304 designates a power source for supplying a voltage between a terminal 81d and a control electrode 6d, wherein the magnitude of the voltage is V4.

Among V1, V2, V3, and V4, there is a relationship of V1>V2>V3>V4. Further, since the magnitudes of the voltages of the power sources 301 through 304 are 66 different, the magnitudes of electrostatic attraction for holding movable bodies 30 are different in response thereto.

Because the plurality of the semiconductor accelerometer switches are arranged so that the bending directions of beams 9a through 9d are in agreement with each other, it is possible to get the magnitude of acceleration effecting on the semiconductor accelerometer switch step-by-step and to obtain the semiconductor accelerometer switch which can detect various types of acceleration having different thresholds. Further, similar effects thereto are obtainable using the semiconductor accelerometer switch described in Embodiment 9 or Embodiment 10 instead of the semiconductor accelerometer switch in Embodiment 12.

Embodiment 13

FIGS. 26a through 26d and FIG. 27a through 27d are views for explaining a method of producing a semiconductor accelerometer switch, specifically a method of producing the semiconductor accelerometer switch according to Embodiment 1 of the present invention.

In order to electrically insulate a movable electrode 11 from a movable electrode 13, both of which will be formed in later steps, a narrow and deep groove 36 is formed on a silicon substrate 15 as shown in FIG. 26a.

The depth of the groove 36 is determined by the thickness of a mass 10 to be formed in a later step. In other words, the depth is designed depending on acceleration to be detected and is in a range of about 50 μm through 200 μm. Further, the width of the groove 36 is, for example, in a range of several thousands A through several μm. As a method of processing the groove 36, drill machining utilizing a hollow drill, laser machining, reactive ion etching (RIE), deep reactive ion etching (D-RIE), advanced silicon etching (ASE) and so on can be utilized, wherein D-RIE and ASE are suitable in consideration of points that there is no restriction in a pattern and machining accuracy is good.

In the next, an insulating film 17 is formed on a surface of the silicon substrate 15 which surface is formed with the groove 36 shown in FIG. 26b. A portion of the insulating film 17 except the groove 36 is removed as shown in FIG. 26c.

As the insulating film 17, for example, spin-on glass formed by rotary coating, a thermal oxidation film, or a film of polysilicon is used.

Succeedingly, a surface opposite to the surface of the silicon substrate 15 formed with the groove 36, hereinbelow referred to as a back surface of the silicon substrate, is etched until the bottom of the groove 36 is exposed and a recessed portion 21 is formed in the back surface of the silicon substrate 15 as shown in FIG. 26d. In this step, it is desirable to adopt a method such as RIE, D-RIE and ASE.

The recessed portion 21 makes a clearance between the mass 10 and the base 1, both of which will be formed in later steps. In the next, the back surface of the silicon substrate 15 is joined with the base 1 as in FIG. 27a. Thereafter a fixed portion 2, a movable portion 3, and a frame 16 are simultaneously formed by etching as in FIG. 27b. A method such as D-RIE and ASE is desirable for this step. For example, pyrex glass is desirable as the base 1. Because the pyrex glass has substantially the same expansion coefficient as that of silicon, there are advantages that an extremely stable junction is obtained and it is joined to the silicon substrate by anode coupling.

Figure 27A:
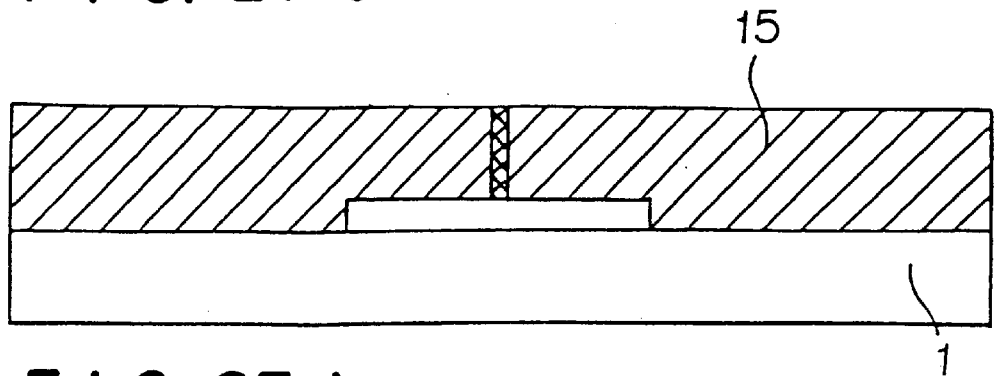
Figure 27B:
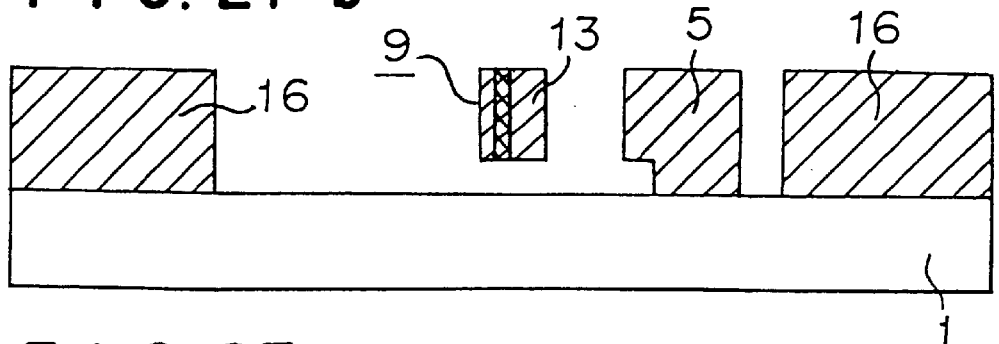
Figure 27C:
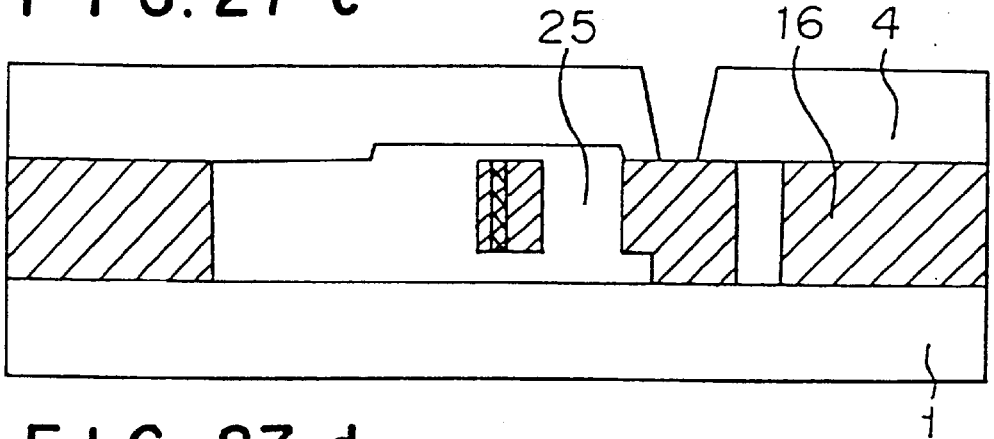
Figure 27D:
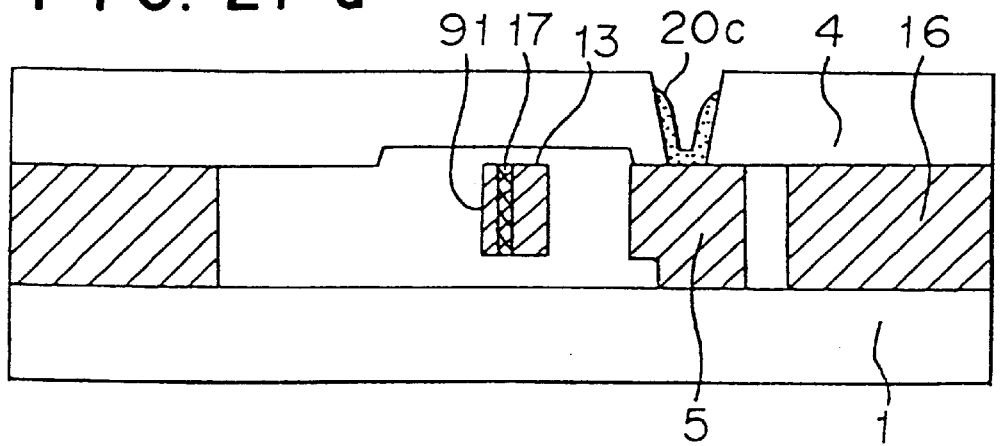

In the next, a sealing base previously formed with a through hole for drawing out electrode is joined to the surface of the silicon substrate 15 to prevent the inside of the semiconductor accelerometer switch from being contaminated by invasion of moisture and extraneous matters from the outside as in FIG. 27c. As the sealing substrate 4, it is desirable to use, for example, pyrex glass. An inert gas is preferably sealed in a gap 25 and the gap 25 is subjected to damping. Finally, by forming a metallic film such as Cr/Au is formed in the through hole of the sealing substrate 4, a portion for drawing out electrode is formed as shown in FIG. 27d corresponding to FIG. 3.

According to the method of producing the semiconductor accelerometer switch described in Embodiment 13, it is possible to produce the switch by a process of producing semiconductor without machining and to miniaturize the size of the switch to be obtained. Further, because etching is conducted along with the thickness direction of the silicon substrate, parts of the fixed portion 2, the movable portion 3, and the frame 16 excluding the insulating film 17 can be simultaneously made from a single silicon substrate.

Embodiment 14

Figure 28:
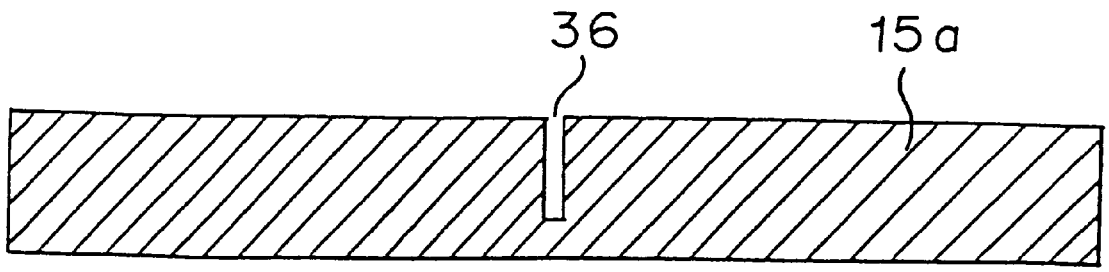
Figure 28:
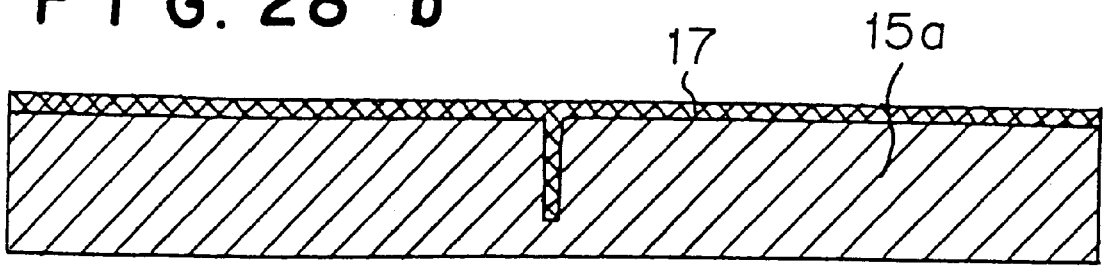
Figure 28:
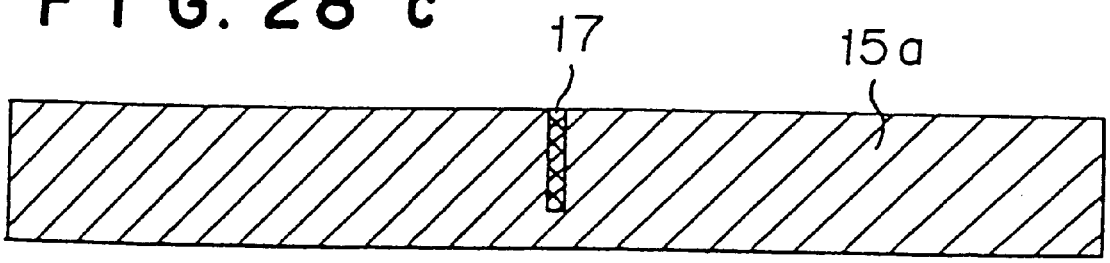
Figure 28:
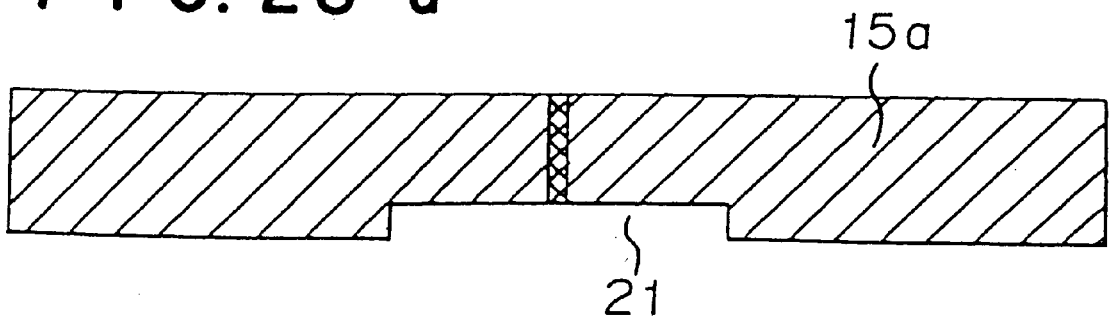
Figure 29:
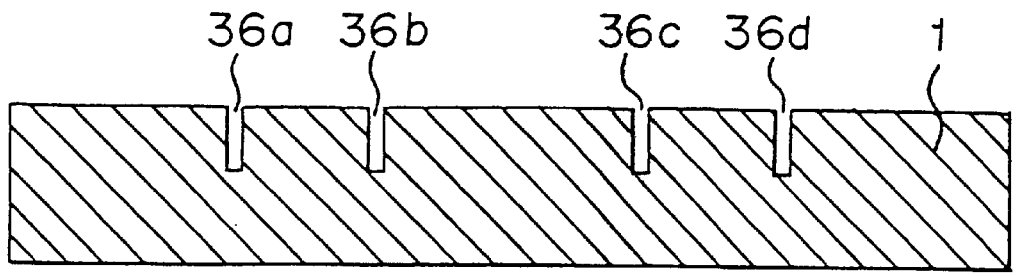
Figure 29:
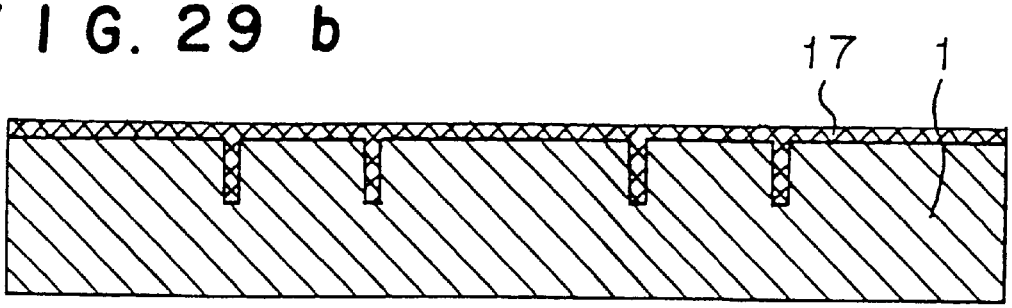
Figure 29:
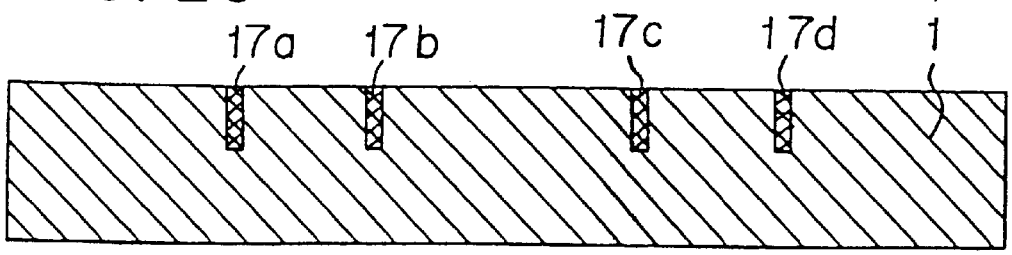
Figure 29:
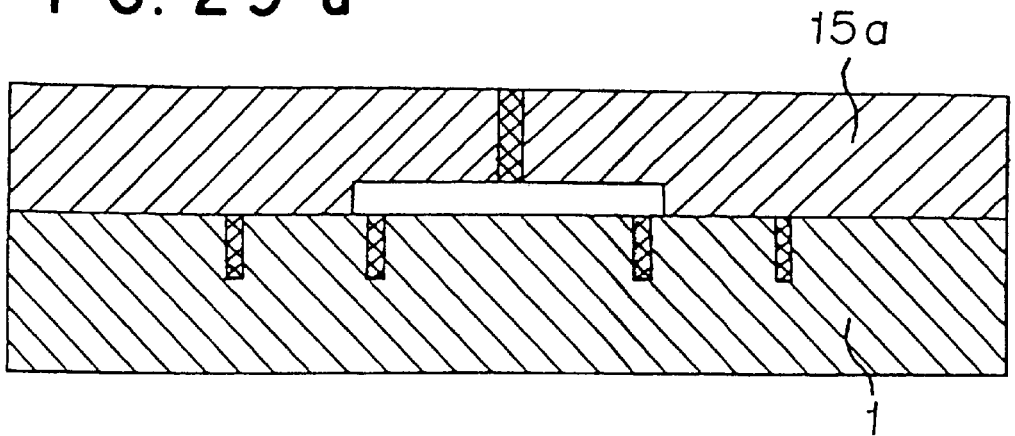

FIGS. 28a through 30c are views for explaining a method of producing a semiconductor accelerometer switch. A deep and narrow groove 36 is formed on a silicon substrate 15a in order to electrically insulate a movable electrode 11 from a movable electrode 13, which movable electrodes will be formed in later steps, as shown in FIG. 28a.

The depth of the groove 36 is determined by the thickness of a mass 10 to be formed later. In other words, the depth is designed depending on acceleration to be detected and is in a range of about 50 μm through 200 μm. The width of the groove 36 is, for example, in a range of several thousands A through several μm. As a method of processing the groove 36, drill machining utilizing a hollow drill, laser machining, reactive ion etching (RIE), deep reactive ion etching (D-RIE), advanced silicon etching (ASE) and so on can be used. D-RIE and ASE are suitable in consideration of points that there is no restriction in a pattern and machining accuracy is good.

In the next, an insulating film 17 is formed on a surface of the silicon substrate 15a, in which surface the groove 36 is formed as shown in FIG. 28b. Parts of the insulating film 17 formed on the surface of the substrate excluding the groove 36 are removed as shown in FIG. 28c.

As the insulating film, spin-on glass (SOG) for example formed by rotary coating, a thermal oxidation film, or a film of polysilicon is used. Succeedingly, the back surface of the silicon substrate 15a is etched until the bottom of the groove 36 is exposed and a recessed portion 21 is formed on the back side surface as shown in FIG. 28d. For example, RIE or the like is desirably used in this step.

The recessed portion 21 becomes the mass 10 and the base 1, both of which will be formed later. Further, portions of the base 1 being a silicon substrate having a low resistance are formed with the grooves 36a through 36d as shown in FIG. 29a. In the next, an insulating film is formed on a surface of the base 1 formed with the grooves 36a through 36d as shown in FIG. 28b. Thereafter, a part of the insulating film 17 formed on the surface of the base 1 is removed as shown in FIG. 28c.

Figure 30A:
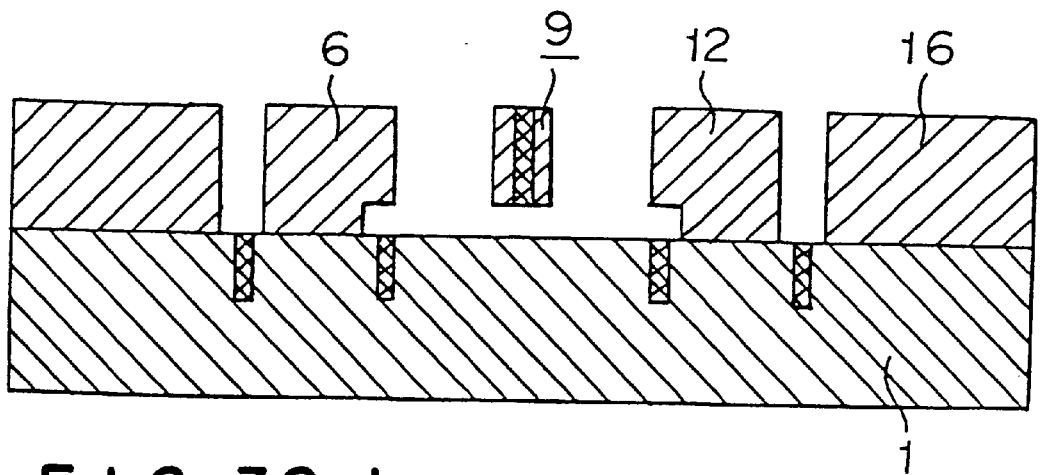
Figure 30B:
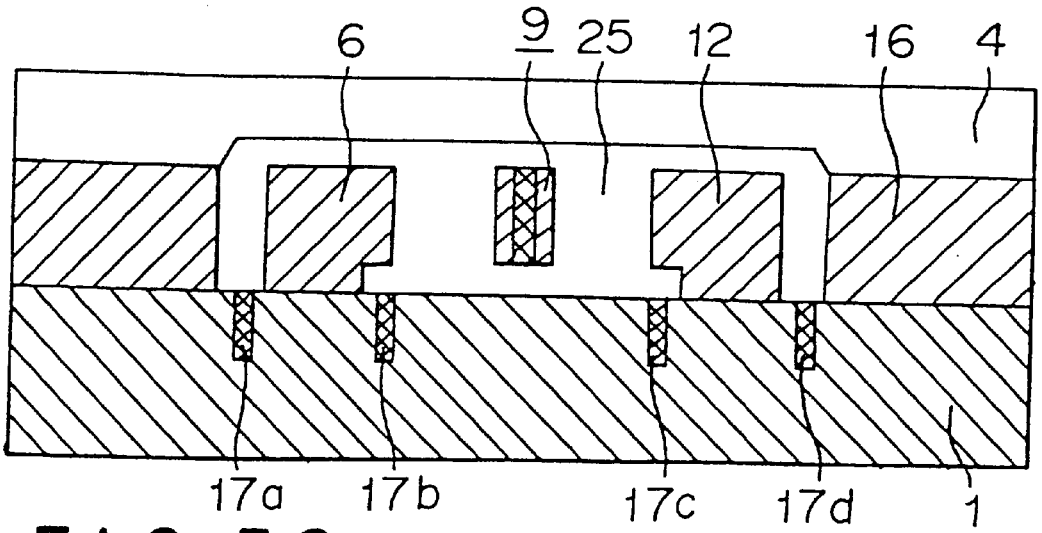

Thereafter, the surface of the silicon substrate 15a formed with the recessed portion 21 is joined to the surface of the base 1 formed with the grooves 36a through 36d as shown in FIG. 29d. Succeedingly, the silicon substrate 15a is etched by a method such as D-RIE and ASE to simultaneously form a fixed portion 2, a movable portion 3, and a frame 16 as shown in FIG. 30a. Thereafter, the frame 16 is joined to the sealing substrate 4 as shown in FIG. 30b. At this time, a gas, preferably an inert gas, is sealed in a gap 25 and the gap 25 is subjected to damping.

Figure 30C:
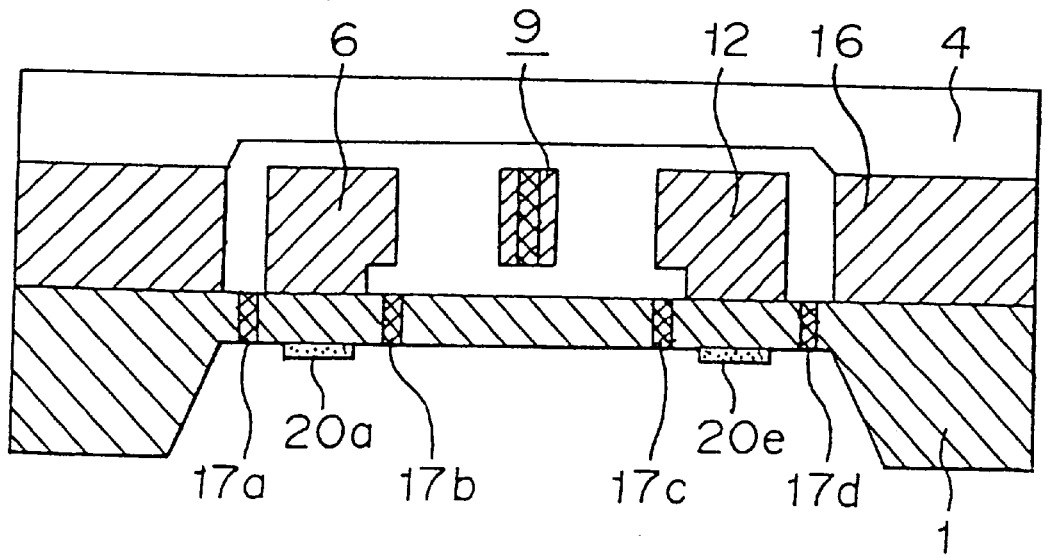

Thereafter, a portion of the back surface of the base 1 being a silicon substrate having a low resistance, namely an opposite surface to that formed with the grooves 36a through 36d in this example, in the vicinity of the insulating film 17 is subjected to wet anisotropic etching until the insulating film 17 is exposed and a metallic film such as Cr/Au is formed as a portion for drawing out electrode as shown in FIG. 30c.

Although, in this method of producing, an example that the insulating film 17 is exposed by wet anisotropic etching, the semiconductor accelerometer switch shown in FIG. 15 is obtainable by abrading the back surface of the base 1. Further, since the portion for drawing out electrode is provided on the side of the base 1, it is possible to use pyrex glass or a silicon substrate having a high resistance as the sealing substrate 4.

By the method of producing the semiconductor accelerometer switch according to Embodiment 14, it is possible to produce by a process of producing semiconductor without machining and miniaturize the size of the semiconductor accelerometer switch to be obtained. Further, since etching is conducted along with the thickness direction of the silicon substrate, parts of the fixed portion 2, the movable portion 3 and the frame 16 excluding the insulating film 17 can be simultaneously formed from a single silicon substrate.

Embodiment 15

Figure 34:
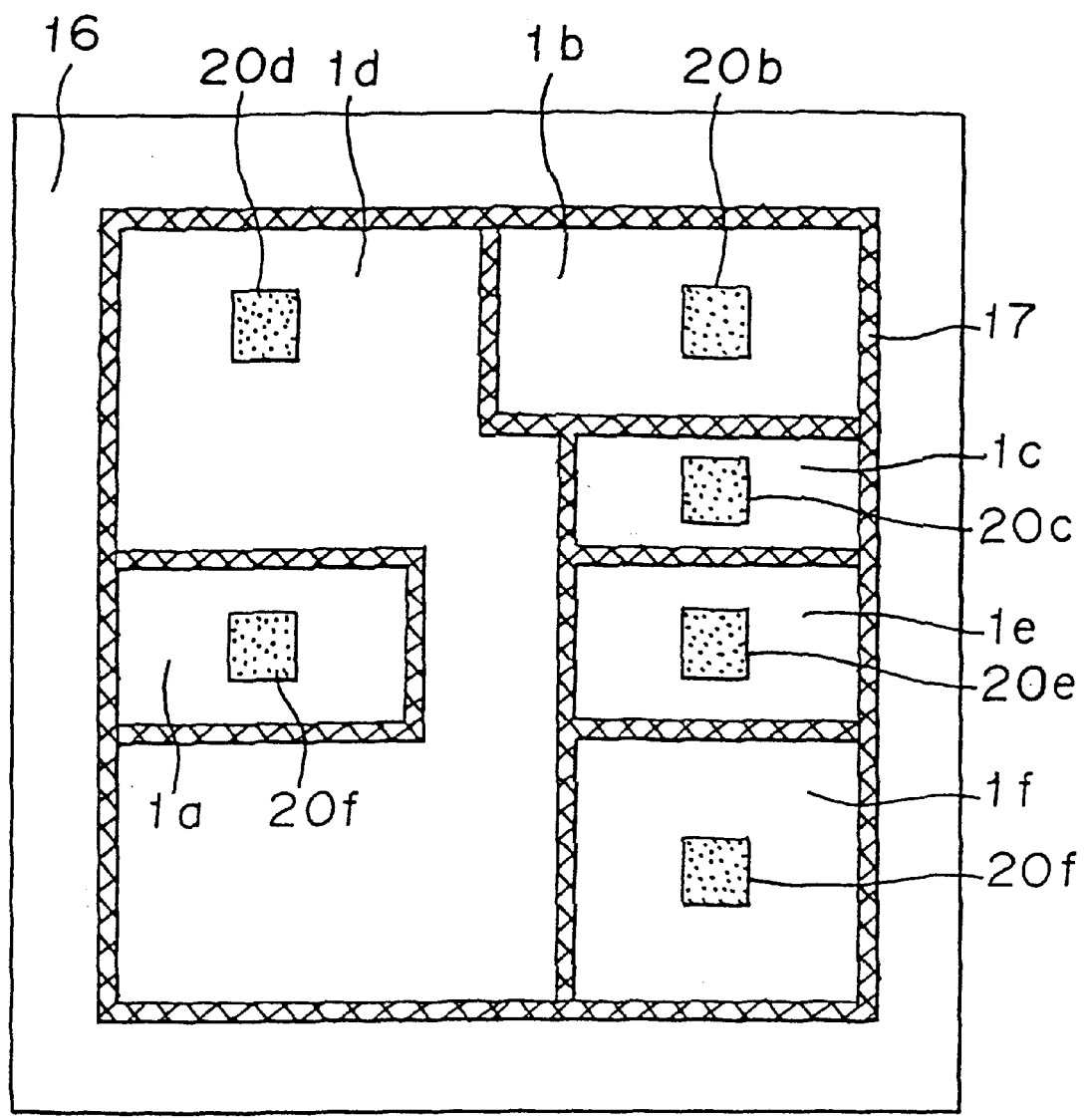
FIG. 34 is a plan view for schematically showing a semiconductor accelerometer switch of the present invention.

FIGS. 31a through 33b are views for explaining a method of producing a semiconductor accelerometer switch using a silicon substrate having a low resistance as a base 1. FIG. 34 is a view for explaining a semiconductor accelerometer sensor, specifically a plan view viewed from the side of the base 1. A difference from the method of producing described in Embodiment 14 is that structural members such as a fixed portion 2 and a movable portion 3 are formed by processing a thin film formed on the base 1 of a silicon substrate having a low resistance.

Figure 31A:
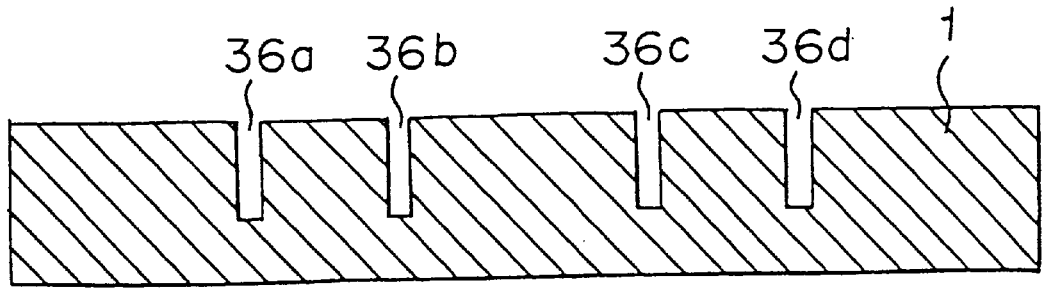

At first, deep and narrow grooves 36a through 36d are formed on the base 1 made of silicon substrate having a low resistance as shown in FIG. 31a.

The depths of the grooves 36a through 36d are about 200 μm through 350 μm. The widths of the grooves 36a through 36d are about 1 μm through 150 μm, preferably about 30 μm. A method of forming the grooves 36a through 36d is similar to that described in Embodiment 12, preferably D-RIE or ASE.

Figure 31B:
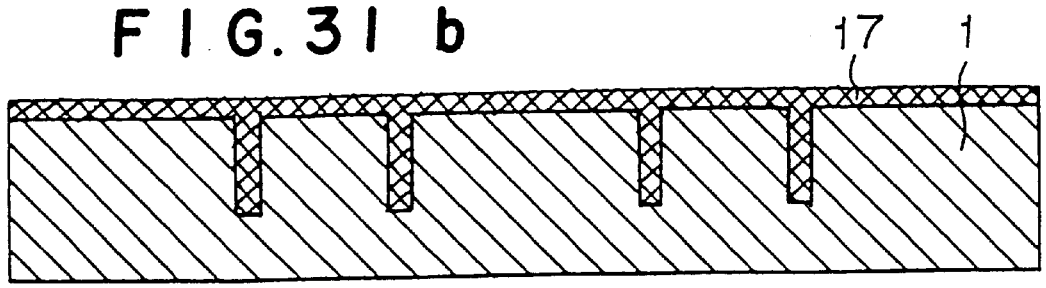

In the next, an insulating film 17 is formed on a surface of the base 1 as shown in FIG. 31b.

Figure 31C:
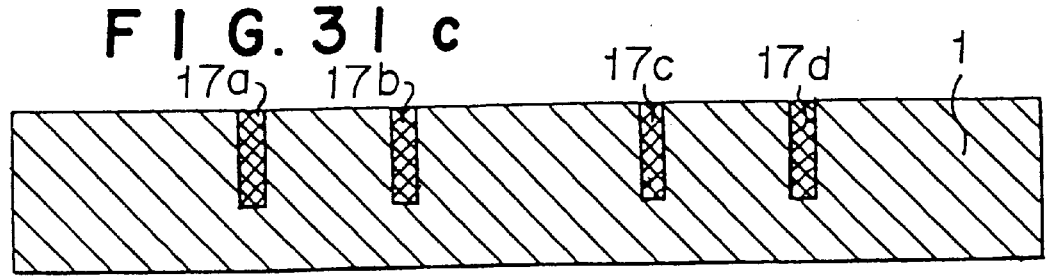
Figure 31D:
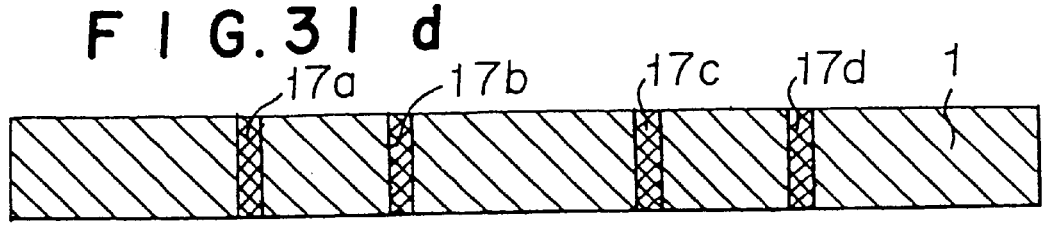

Thereafter, a part of the insulating film 17 formed on the surface of the base 1 excluding the grooves 36a through 36d is removed as shown in FIG. 31c. Thereafter, the back surface of the base 1 is abraded until the bottom of the grooves 36a through 36d and the insulating film 17 are exposed as shown in FIG. 31d. Instead of abrading, wet anisotropic etching can be conducted to expose the insulating film. However, in such a case, order of steps of producing is changed to a certain extent. By this step, the base 1 of a silicon substrate having a low resistance is divided into a plurality of blocks 1a through 1f at the insulating film 17 shown in FIG. 34 and these blocks are electrically insulated.

Figure 31E:
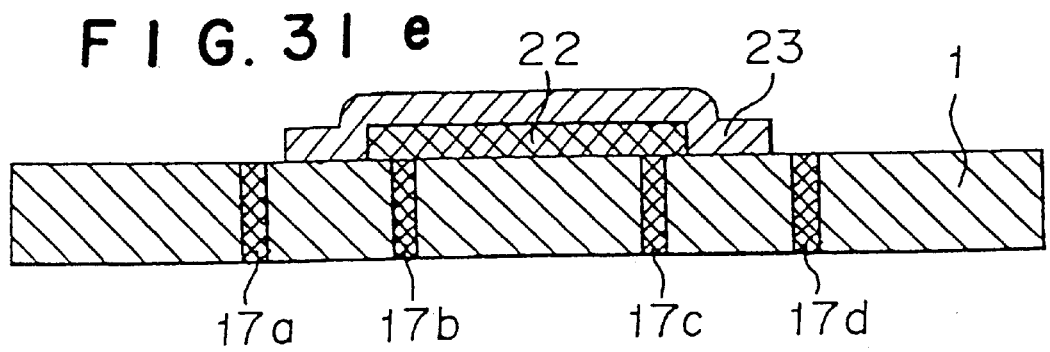
Figure 32:
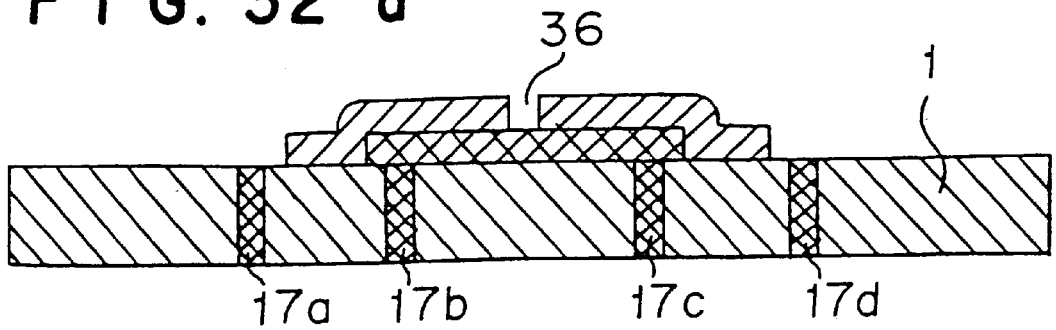
Figure 32:
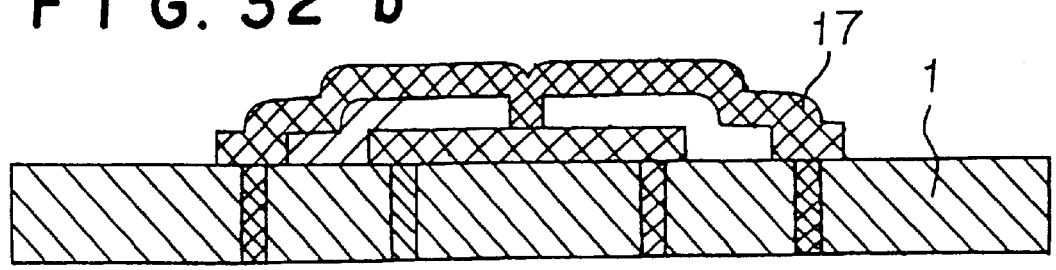
Figure 32:
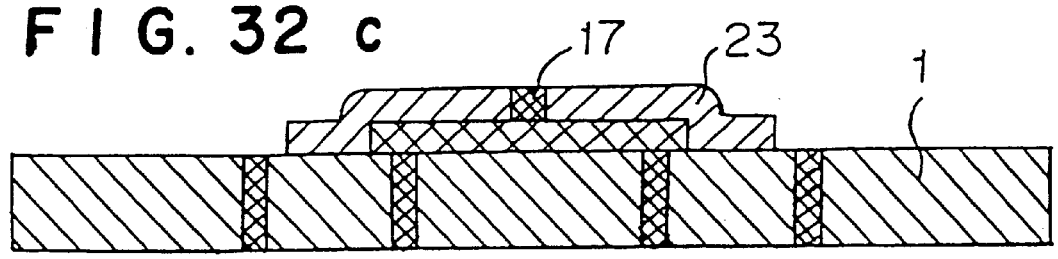
Figure 32:
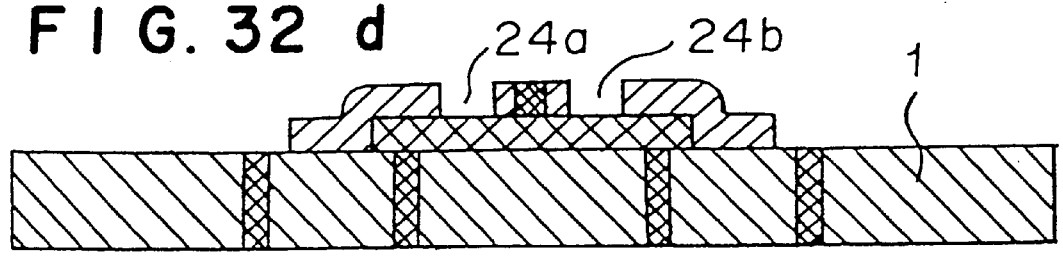
Figure 32:
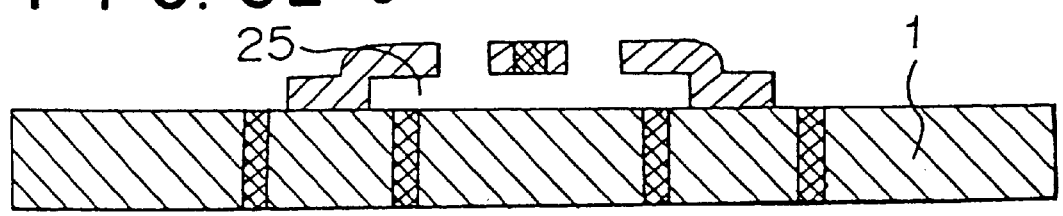
Figure 33:
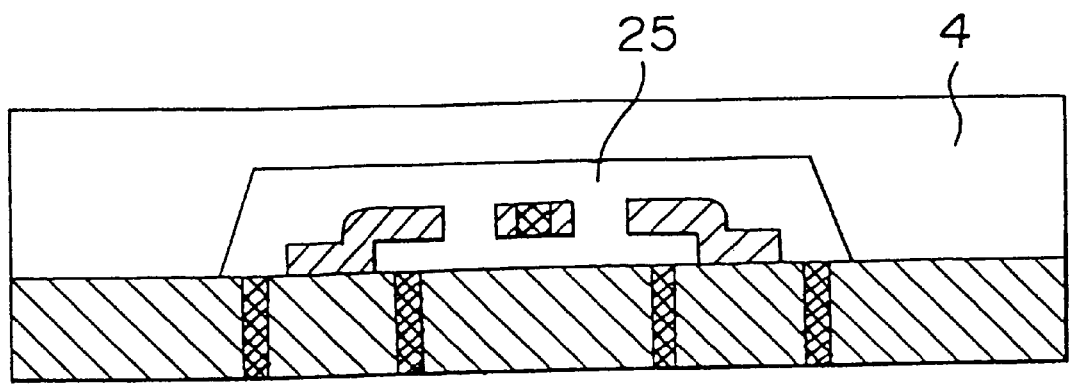
Figure 33:
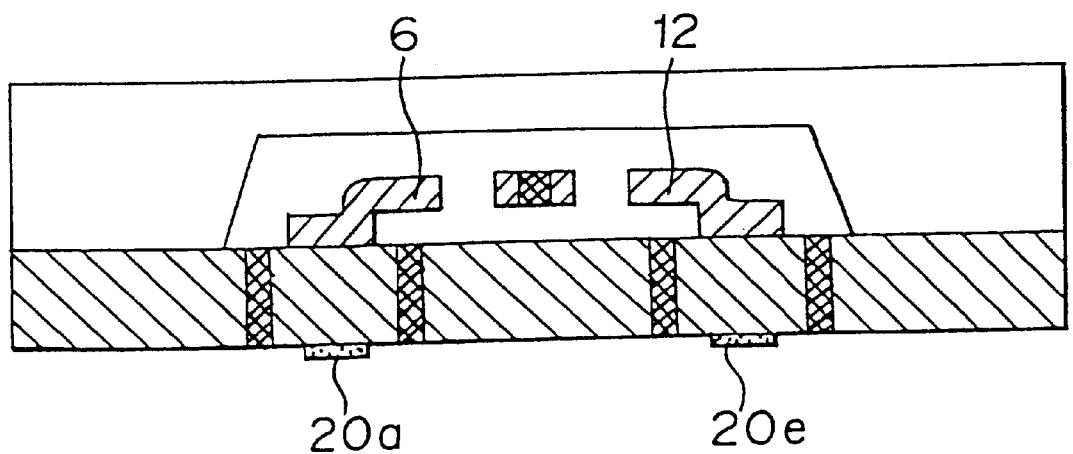

In the next, a sacrifice layer 22 and a structural film 23 are successively formed so as to be a predetermined shape as shown in FIG. 31e. For example, a phosphosilicate glass film (PSG film) obtained by low-pressure chemical vapor deposition (LPCVD) is suitable for the sacrifice layer 22, and a polysilicon film obtained by LPCVD is suitable for the structural film 23. In the polysilicon film, impurities are previously doped by means of diffusion, ion-implanting or the like.

In the next, a groove for insulating a movable electrode 11 from a movable electrode 13 is formed in the structural film 23 as shown in FIG. 32a, wherein the movable electrodes will be formed later. An insulating film 17 is formed to embed the groove 36 as shown in FIG. 32b. If necessary, a part of the insulating film 17 above the structural film 23 is removed as shown in FIG. 32c. As the insulating film 17 formed in the groove 36, a silicon nitride film obtained by means of LPCVD is desirable.

Thereafter, etchant supplying apertures 24a and 24b which penetrate the structural film 23 and reaches the sacrifice layer 22 are formed as shown in FIG. 32d. Only the sacrifice layer 22 is selectively removed through the etchant supplying apertures 24a and 24b to thereby form a gap 25 as shown in FIG. 32e. As described, when phosphosilicate glass (PSG) and polysilicon are respectively used for the sacrifice layer and the structural film, hydrogen fluoride (HF) is suitable for an etching liquid.

By this step, a control electrode 6, a terminal 82, a fixed electrode 5, a terminal 81, a control electrode 12, and a stopper 7b are formed so as to be electrically connected to regions 1a, 1b, 1c, 1d, 1e, and 1f in the base 1 of a silicon substrate having a low resistance, which regions are insulated each other.

Thereafter, a sealing substrate 4 made of pyrex glass or the like which has been previously machined is subjected to anode junction to prevent moisture and extraneous matters of the outside from invading as shown in FIG. 33a. At this time, by conducting the anode junction with application of a voltage between a frame 16, which is provided in the base 1 so as to electrically insulate the regions 1a through 1f, and the sealing substrate 4, it is possible to prevent influences of a high voltage from affecting various electrodes composing the semiconductor accelerometer switch.

Further, it is desirable to seal an inert gas in a gap 25 and the gap 25 is subjected to damping.

Finally, portions corresponding to the regions 1a through 1f on the back surface of the base 1 insulated each other are formed with portions for drawing out electrode 20*a* through 20*f* made of a metallic film such as Cr/Au as shown in FIG. 33*b*. Thus, it becomes possible to independently apply electric potentials to the control electrode 6, the terminal 82, the fixed electrode 5, the terminal 81 (stopper 7*a*), the control electrode 12, and the stopper 7*b* respectively from the portions for drawing out electrode 20*a*, 20*b*, 20*c*, 20*d*, 20*e*, and 20*f*.

By the method of producing the semiconductor accelerometer switch according to Embodiment 15, it becomes possible to produce the switch by processes of producing semiconductor without machining and minimize the size of the semiconductor accelerometer switch to be obtained. Further, since etching is conducted along with the thickness direction of the silicon substrate, parts of the fixed portion 2, the movable portion 3, and the frame 16 excluding the insulating film 17 can be simultaneously formed from a single silicon substrate.

Embodiment 16

Figure 35:
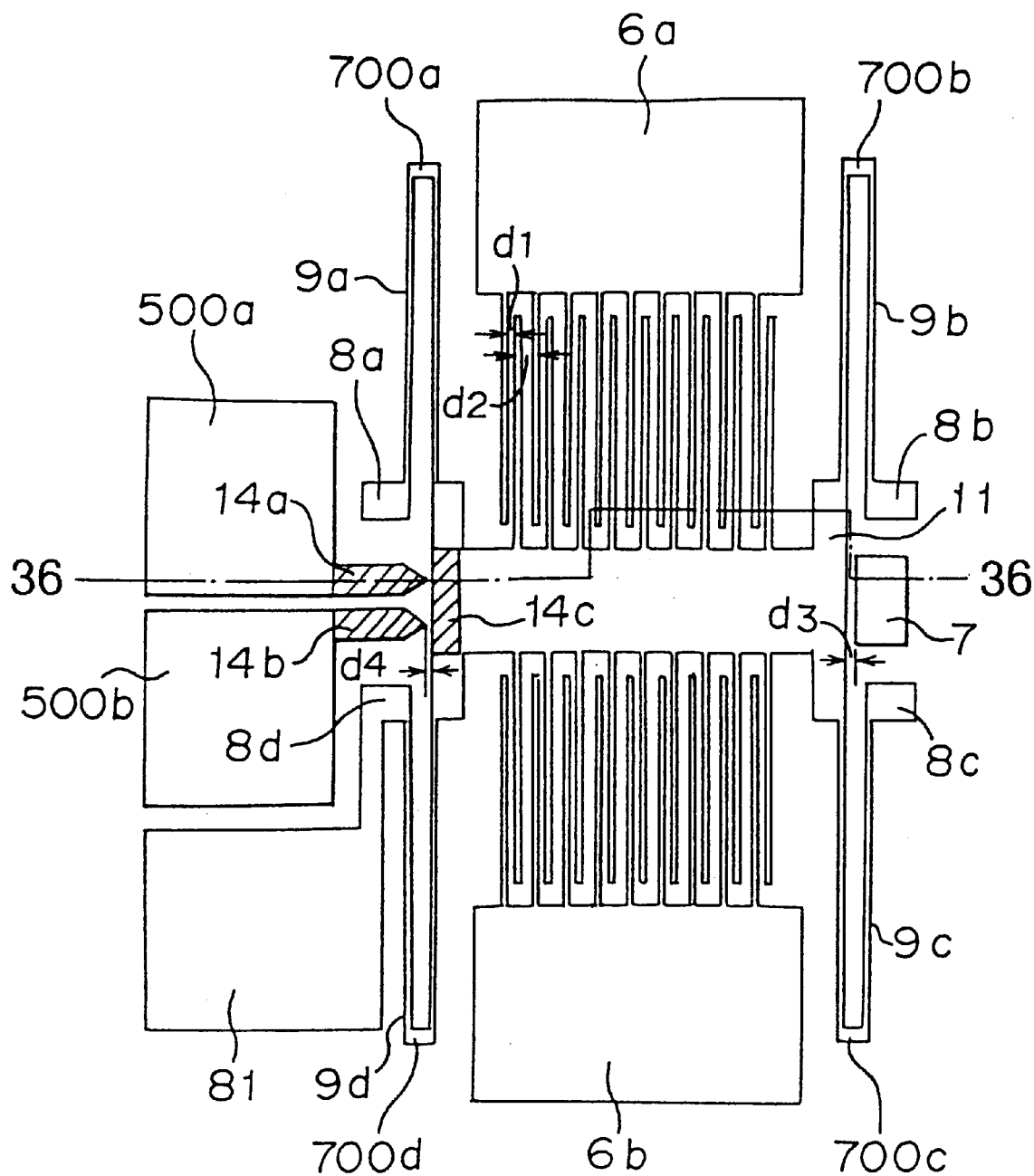
FIG. 35 is a partial plan view for schematically showing a semiconductor accelerometer switch of the present invention.
Figure 36:
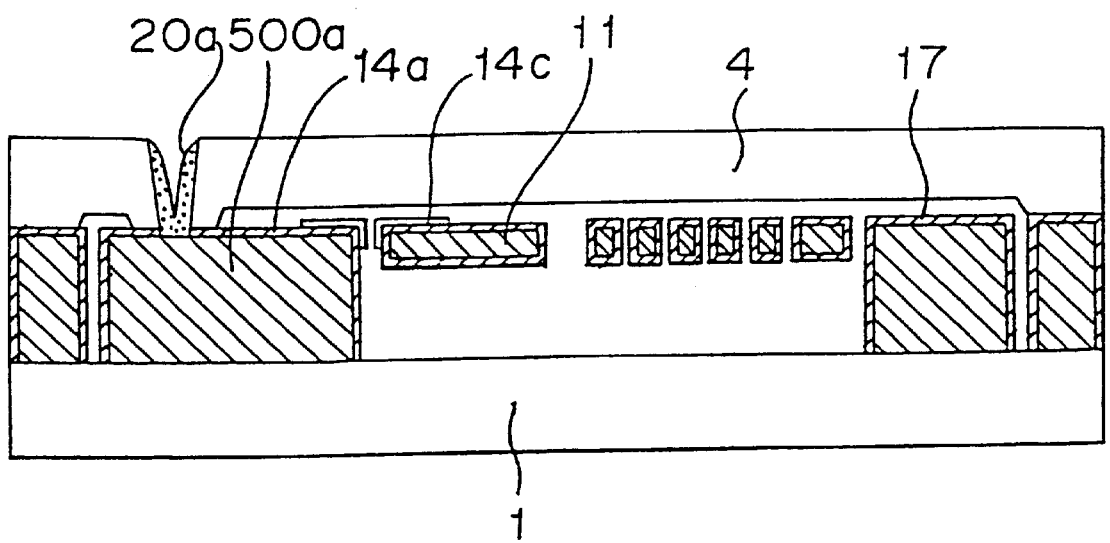
FIG. 36 is a side view in section for schematically showing a semiconductor accelerometer switch of the present invention.

FIG. 35 is a view for explaining important portions of a semiconductor accelerometer switch according to Embodiment 16 of the present invention. FIG. 36 is a cross-sectional view taken along a line F—F of FIG. 15. In the Figures, the same references as those shown in FIGS. 18 through 22 designate the same or the similar portions, wherein on surfaces of a fixed portion 2 and a movable portion 3, a thin insulating film 17 is formed.

Further, the insulating film 17 has an opening at which an electrode is necessary to be drawn out. A portion for drawing out electrode is formed in such an opening portion, whereby it is possible to electrically connect it to the outside. In FIG. 36, the portion for drawing out electrode 20*a* is provided in a part of a terminal 500*a*.

Numerical reference 11 designates a movable electrode corresponding to the first movable electrode. On a side of the movable electrode 11 facing a finlike control electrode 6*a*, a finlike electrode is formed, and the finlike electrodes are arranged to overlap each other. On a side surface of the movable electrode 11 facing a finlike electrode 6*b* a finlike electrode is formed, and these finlike electrodes are arranged to overlap each other.

The movable electrode 11 is supported by a base 1 through beams 9*a* through 9*d*, connecting members 700*a* through 700*d*, and supporting portions 8*a* through 8*d*. A terminal 81 is to apply an electric voltage to the movable electrode 11 through the supporting portion 8*d* and the connecting member 700*d*.

Numerical reference 7 designates a stopper for controlling displacement of the movable electrode 11. On surfaces of tip portions of the terminals 500*a* and 500*b* facing the movable electrode 11 are respectively provided with metallic films 14*a* and 14*b*, which metallic films are respectively connected to the terminals 500*a* and 500*b* through opening portions of the insulating film provided respectively on the terminals. Further, a metallic film 14*c* corresponding to the second movable electrode is formed on a surface of the movable electrode 11. When the metallic film 14*a* and 14*b* are in contact with the metallic film 14*c*, the metallic films 14*a* and 14*b* are electrically connected through the metallic film 14*c*. Accordingly, under such a state, the terminal 500*a* is connected to the terminal 500*b*.

Under a initial state, a voltage is not applied between the fixed electrodes 6*a*, 6*b* and the terminal 81. At this time, among d1 through d4, there is relationships of d1>d4 and d2>d3, whereby the terminal 500*a* is opened to the terminal 500*b*, namely these are not connected. When a voltage is applied between the fixed electrode 5*a*, 5*b* and the terminal 81, because there is a relationship of d1<d2, the beams 9*a* through 9*d* are bent and the movable electrode 11 is held in a state that the movable electrode 11 is displaced a little on the side of the terminals 500*a* and 500*b*. FIG. 35 shows a state that the movable electrode 11 is held in a condition that the movable electrode 11 is scarcely bent because of high rigidity of the beams 9*a* through 9*d*. At this time, the terminal 500*a* and the terminal 500*d* are opened.

When acceleration effecting on the semiconductor accelerometer switch exceeds a certain threshold, the some of inertia force and electrostatic attraction both effecting on the movable electrode 11 exceeds elastic force of the beams to bend the beams 9*a* through 9*d*; and the movable electrode 11 displaces on the side of the terminals 500*a* and 500*b* and stops in a state that the movable electrode 11 is in contact with the terminals 500*a* and 500*b*. At this time, the terminal 500*a* is shorted to the terminal 500*b*. Accordingly, by detecting a state of opening or shorting connection between the terminals 500*a* and 500*b*, it is possible to judge whether or not acceleration having a predetermined magnitude in a predetermined direction, namely a rightward direction in the Figure, effects on the semiconductor accelerometer switch.

According to the semiconductor accelerometer switch described in Embodiment 16, the movable portion is not estranged from a portion for joining the movable body because a structure of joining the movable body 30 by the insulating film embedding a groove 36 penetrating the movable body 30 is not adopted.

FIGS. 37*a* through 37*d* and FIGS. 38*a* through 38*c* are views for explaining a method of producing the semiconductor accelerometer switch, specifically that shown in FIG. 35. Hereinbelow, steps of forming various portions shown in FIG. 36 will be described.

Figure 37A:
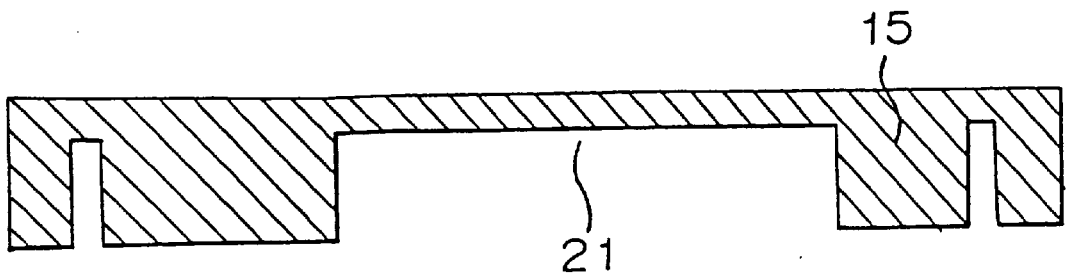

At first, from a back surface side of a silicon substrate 15, a portion corresponding to the movable portion 3 to be formed later is etched to thereby form a recessed portion 21 as shown in FIG. 37*a*. The depth of the recessed portion is, for example, about 50 μm through 200 μm. In this step, a method such as D-RIE and ASE is desirable.

Figure 37B:
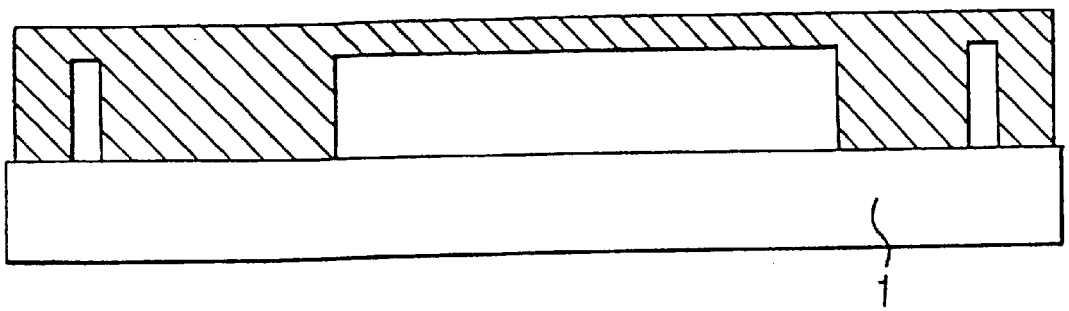
Figure 37C:
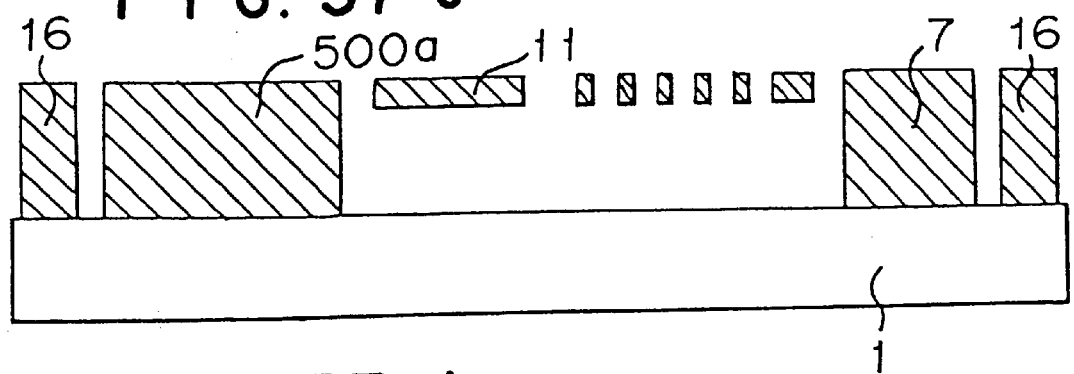

In the next, the surface formed with the recessed portion 21 in the silicon substrate 15 is joined to the base 1 as shown in FIG. 37*b*. As the base, it is preferable to use, for example, pyrex glass. Because the expansion coefficient of pyrex glass is substantially the same as that of silicon, there are advantages that an extremely stable junction is obtainable and it is possible to wholly join the base with the silicon substrate by anode junction subjected also to the silicon substrate. In the next, a fixed portion 2, a movable portion 3, and a frame 16 are simultaneously etched as shown in FIG. 37*c*. A method such as D-RIE and ASE is preferable also for this step.

Figure 37D:
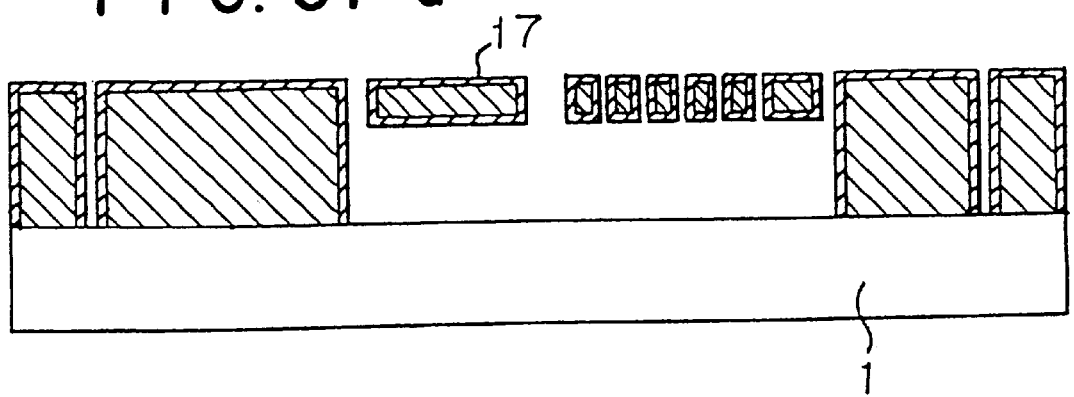
Figure 38:
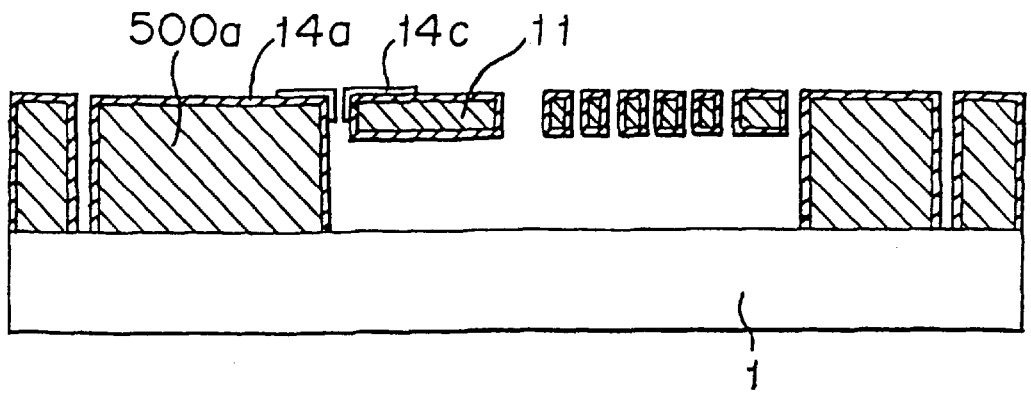
Figure 38:
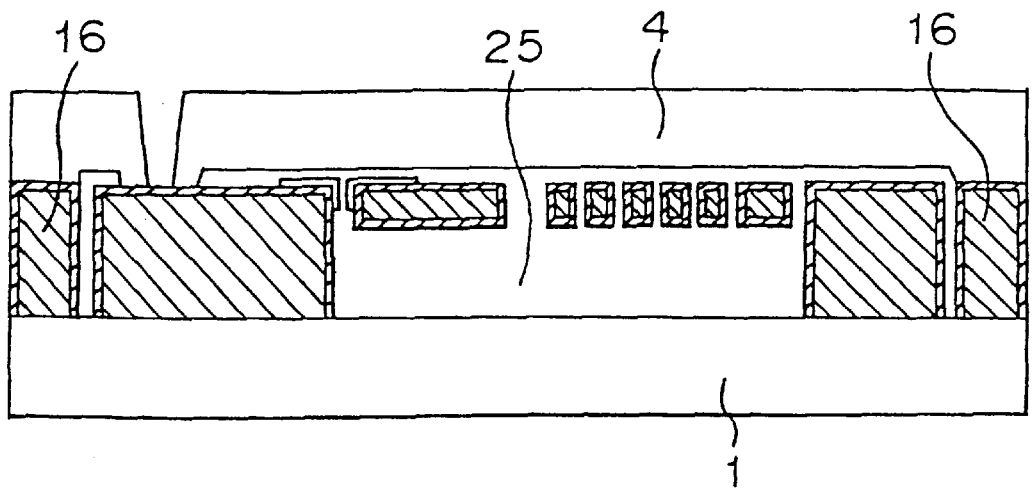
Figure 38:
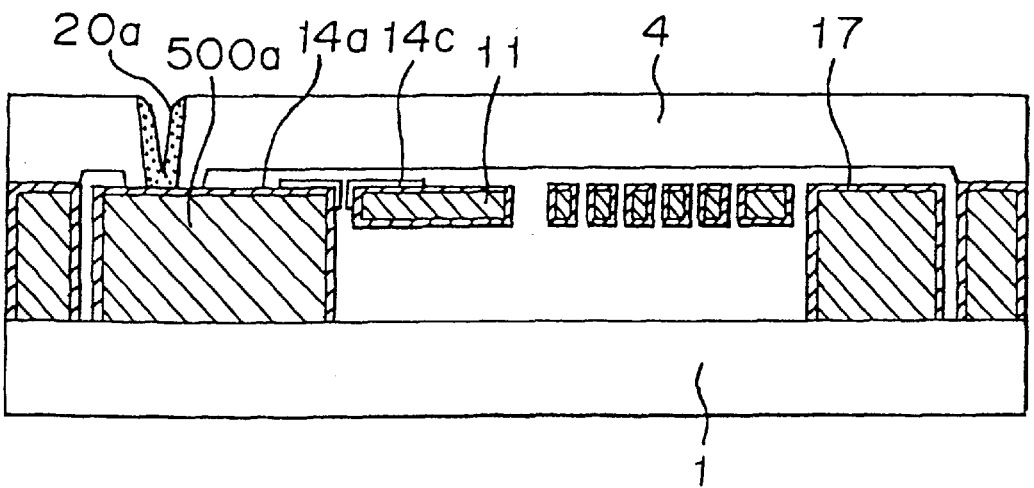
Figure 39A:
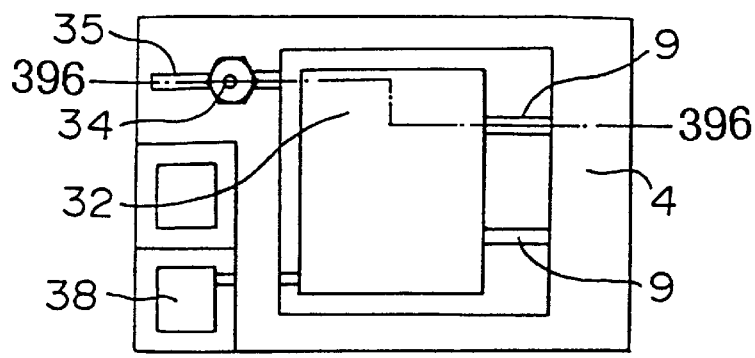
FIG. 39a is a plan view for schematically showing a structure of a conventional accelerometer switch.
Figure 39B:
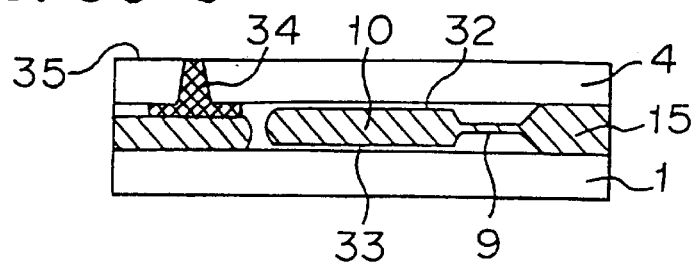
FIG. 39b is a side view in section for schematically showing a structure of a conventional accelerometer sensor.
Figure 40:
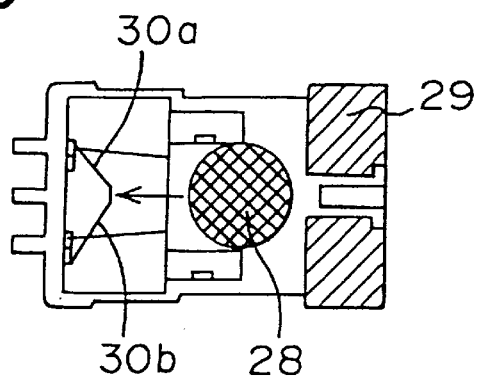
FIG. 40 is a cross-sectional view for schematically showing a structure of a conventional accelerometer switch.
Figure 41:
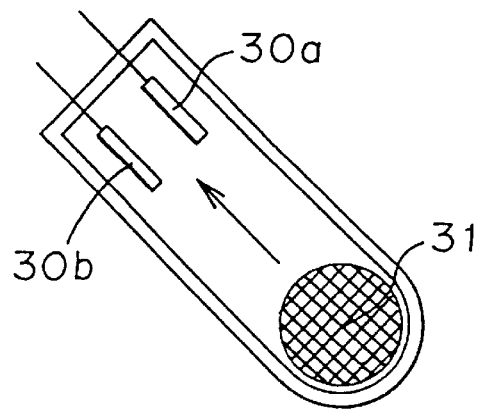
FIG. 41 is a cross-sectional view for schematically showing a structure of a conventional accelerometer switch.

In the next, an insulating film 17 is formed on surfaces of the fixed portion 2, the movable portion 3, the frame 16 and so on as shown in FIG. 37*d*. It is preferable to use an oxide film of about 500 Å through 1 μm obtained by plasma CVD for the insulating film 17. Further, metallic films 14*a*, 14*b*, and 14*c* are respectively formed in a tip portion of a terminal 500*a* facing a movable electrode 11, a tip potion of a terminal 500*b* facing the movable electrode 11, and a portion of the movable electrode 11 facing the tip portions of the terminals 500*a* and 500*b* as shown in FIG. 38*a*. It is preferable to use a metal having high malleability and high ductility such as gold, silver, copper, and platinum as the metallic films 14*a* through 14*c*.

The metallic film 14*c* is formed on the insulating film 17 to thereby insulate the metallic film 14*c* from the movable electrode 11. On the other hand, the metallic films 14*a* and 14*b* are formed on opening portions provided in the insulating film 17 to electrically connect the terminals 500a and 500b respectively.

In the next, the frame 16 of the silicon substrate is joined to a sealing substrate 4 as shown in FIG. 38b. As the sealing substrate 4, it is preferable to use, for example, pyrex glass. At this time, a gas, preferably an inert gas, is sealed in a gap 25, and the gap is subjected to damping. Finally, portions for drawing out electrode are formed by forming a metallic film such as Cr/Au in through holes in the sealing substrate 4 as shown in FIG. 38c.

According to the above method of producing the semiconductor accelerometer switch, it is possible to produce the switch by processes for producing semiconductor without machining and miniaturize the size of the semiconductor accelerometer switch to be obtained. Further, since steps of providing the insulating film on the whole surface of the fixed portion 2, the movable portion 3 and the frame 16, the step for forming the groove 36 penetrating the movable body becomes unnecessary.

The first and the second advantages of a semiconductor accelerometer switch according to the present invention is that it is possible to detect whether or not acceleration having a predetermined magnitude in a predetermined direction is effected by detecting displacement of a movable body and obtain a semiconductor accelerometer switch having general-purpose properties, stability, and high reliability because a threshold of acceleration to be detected is arbitrarily set.

The third advantage of a semiconductor accelerometer switch according to the present invention is that chattering between a second movable electrode and a fixed electrode can be prevented; a state that the second movable electrode is in contact with the fixed electrode can be maintained for a predetermined time period; and therefore an output signal for outputting this state can be output for a predetermined time period, whereby the semiconductor accelerometer switch having stability and high reliability is obtainable. Further, it is possible to simulate whether or not a normal output is obtainable by changing a state of contacting or non-contacting between the second movable electrode and the fixed electrode, whereby the semiconductor accelerometer switch which can easily detect failures is obtainable.

The fourth and the fifth advantages of a semiconductor accelerometer switch according to the present invention is that the magnitude of electrostatic attraction can be further increased.

The sixth advantage of a semiconductor accelerometer switch according to the present invention is that a threshold of acceleration to be detected can be arbitrarily set because a mass is provided in a middle of a beam.

The seventh advantage of a semiconductor accelerometer switch according to the present invention is that a mass is prevented from adhering to a stopper because a surface of the stopper contacting to the mass is made uneven.

The eighth advantage of a semiconductor accelerometer switch according to the present invention is that durability to failures is high because impact force occurring when a second movable electrode is in contact with a fixed electrode is relaxed.

The ninth advantage of a semiconductor accelerometer switch according to the present invention is that sensitivity is further high because a part of a beam is wound to increase elasticity of the beam.

The tenth advantage of a semiconductor accelerometer switch according to the present invention is that it is possible to prevent a mass from bending in the direction of the gravity because the mass is supported by at least two beams and make sensitivity further high because elasticity of the beam is increased by further reducing the width of the beam.

The eleventh advantage of a semiconductor accelerometer switch according to the present invention is that it is possible to detect whether or not acceleration having a predetermined magnitude in a predetermined direction is effected by detecting whether or not a second movable electrode is in contact with a first fixed terminal as a result of displacement of a movable body and arbitrarily set a threshold of acceleration to be detected by chaining the magnitude of voltage applied between a first control electrode and a first movable electrode, whereby the semiconductor accelerometer switch having general-purpose properties, stability, and high reliability is obtainable.

The twelfth advantage of a semiconductor accelerometer switch according to the present invention is that it is possible to detect whether or not acceleration having a predetermined magnitude in a predetermined direction is effected by detecting whether or not a second movable electrode is in contact with a second fixed electrode as a result of displacement of a movable body and to arbitrarily set a threshold of acceleration to be detected by chaining the magnitude of voltage applied between a first control electrode and a first movable electrode, whereby the semiconductor accelerometer switch having general-purpose properties, stability, and high reliability is obtainable.

The thirteenth advantage of a semiconductor accelerometer switch according to the present invention is that durability to failures is high because impact force occurs when a second movable electrode is in contact with a second fixed terminal is relaxed.

The fourteenth advantage of a semiconductor accelerometer switch according to the present invention is that operation of the semiconductor accelerometer switch can be simulated because the magnitude of electrostatic attraction is variable.

The fifteenth advantage of a semiconductor accelerometer switch according to the present invention is that it is possible to make the direction that a first movable electrode displaces always constant by electrostatic attraction because distances between each finlike first control electrode and corresponding finlike first movable electrode are ununiform.

The sixteenth advantage of a semiconductor accelerometer switch according to the present invention is that insulating properties of a fixed portion and a movable portion are high because a base is insulative.

The seventeenth advantage of a semiconductor accelerometer switch according to the present invention is that a voltage can be applied from a side of a base to a fixed portion and a movable portion because the base is a silicon substrate having a low resistance.

The eighteenth advantage of a semiconductor accelerometer switch according to the present invention is that acceleration in different directions can be detected because a plurality of movable bodies are arranged so that displacing directions of the movable bodies are different.

The nineteenth advantage of a semiconductor accelerometer switch according to the present invention is that acceleration having various thresholds is detectable because the magnitudes of voltages to be applied between first control electrodes of fixed portions and electrodes formed in movable bodies corresponding thereto are different.

The twentieth advantage of a semiconductor accelerometer switch according to the present invention is that it is possible to detect whether or not acceleration to be effected is larger than a predetermined magnitude and detect the magnitude of the detected acceleration because a capacitor-type accelerometer sensor is provided.

The twenty-first through the twenty-fourth advantages of a method of producing a semiconductor accelerometer switch is that it can be produced by processes of producing semiconductor without machining and miniaturize its size.

Obviously, numerous modifications and variations of the present invention are possible in light of the above teachings. It is therefore to be understood that within the scope of the appended claims, the invention may be practiced otherwise than as specifically described herein.

What is claimed is:

1. A semiconductor accelerometer switch comprising:

a base;

a fixed portion having a first control electrode fixed to said base; and a movable portion having a supporting portion fixed to said base and a movable body, supported by said supporting portion, said movable body including a first movable electrode, wherein said movable body is electrostatically attracted to said first control electrode when a voltage is applied between said first control electrode and said first movable electrode, and said movable body is displaced when an acceleration acts on said movable body of said semiconductor accelerometer switch.

2. The semiconductor accelerometer switch according to claim 1, wherein said fixed portion further includes a fixed electrode fixed to said base and opposite said first control electrode;

said movable body further includes a beam having a first end supported by said supporting portion and positioned between said first control electrode and said fixed electrode, a mass at a second end of said beam, said first movable electrode being located on a first side surface of said beam, and a second movable electrode located on a second side surface of said beam, opposite the first side surface; and said movable body is displaced so that said second movable electrode contacts said fixed electrode when an acceleration having a first magnitude and a first direction acts on said semiconductor accelerometer switch.

3. The semiconductor accelerometer switch according to claim 1, wherein said fixed portion further includes a second control electrode fixed to said base and located in a position opposite said first control electrode;

said movable body further includes a third movable electrode located in the second side surface of said beam; and a voltage is applied between said second control electrode and said third movable electrode.

4. The semiconductor accelerometer switch according to claim 1, wherein said first control electrode and said first movable electrode are respectively finlike electrodes; and said first control electrode and said first movable electrode overlap each other.

5. The semiconductor accelerometer switch according to claim 3, wherein said second control electrode and said third movable electrode are respectively a finlike electrodes; and said second control electrode and said third movable electrode overlap each other.

6. The semiconductor accelerometer switch according to claim 2, wherein said mass is located in a side of said beam.

7. The semiconductor accelerometer switch according to claim 2, further comprising a stopper for regulating displacement of said mass, wherein a surface of said stopper for contacting said mass is not planar.

8. The semiconductor accelerometer switch according to claim 2, wherein a metallic film having high malleability and high ductility is provided on at least one of a surface of said second movable electrode and a surface of said fixed electrode.

9. The semiconductor accelerometer switch according to claim 2, wherein a part of said beam has a meandering shape.

10. The semiconductor accelerometer switch according to claim 2, wherein said mass is supported by at least two beams.

11. The semiconductor accelerometer switch according to claim 1, wherein said first control electrode is a finlike electrode;

said fixed portion further includes a first fixed terminal fixed to said base;

said movable body further includes a beam, one end of which is supported by said supporting portion, a finlike first movable electrode supported by said beam, a second movable electrode, and an insulating film located between said finlike first movable electrode and said second movable electrode;

said finlike first movable electrode and said finlike first control electrode overlap each other; and said movable body is displaced and said second movable electrode is in contact with said first fixed terminal when an acceleration having a second magnitude and a direction acts on said semiconductor accelerometer switch.

12. The semiconductor accelerometer switch according to claim 11, wherein the electrostatic attraction is variable.

13. The semiconductor accelerometer switch according to claim 11, wherein distances between fins of said finlike first control electrode and fins of said finlike first movable electrode are nonuniform.

14. The semiconductor accelerometer switch according to claim 1, wherein said base is an insulating material.

15. The semiconductor accelerometer switch according to claim 1, wherein said base is a silicon substrate having a low resistance.

16. The semiconductor accelerometer switch according to claim 1, including at least a second movable body wherein said movable bodies are arranged to be displaced in different directions.

17. A semiconductor accelerometer switch comprising:

a plurality of said semiconductor accelerometer switches according to claim 1, wherein said plurality of semiconductor accelerometer switches are arranged so that displacing directions of movable bodies thereof are the same; and the magnitudes of voltages applied between said first control electrode in said fixed portion and said first movable electrode in each of said movable bodies are different.

18. A semiconductor accelerometer switch according to claim 1, further comprising:

a capacitor-type accelerometer sensor having movable electrodes displaced in response to acceleration effected on said semiconductor accelerometer switch, wherein said capacitor-type accelerometer sensor detects electrostatic capacitance changing upon displacement of said movable electrodes and also detects the magnitude of the acceleration by the change of the detected electrostatic capacitance.

* * * * *